(12) United States Patent
Bruemmer et al.

(10) Patent No.: US 7,974,738 B2
(45) Date of Patent: Jul. 5, 2011

(54) ROBOTICS VIRTUAL RAIL SYSTEM AND METHOD

(75) Inventors: David J. Bruemmer, Idaho Falls, ID (US); Douglas A. Few, Idaho Falls, ID (US); Miles C. Walton, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 158 days.

(21) Appl. No.: 11/428,621

(22) Filed: Jul. 5, 2006

(65) Prior Publication Data

US 2008/0009964 A1 Jan. 10, 2008

(51) Int. Cl.
G05B 19/23 (2006.01)
B25J 5/02 (2006.01)
G05B 19/18 (2006.01)
G06F 19/00 (2011.01)

(52) U.S. Cl. ... 700/255; 700/245; 700/253; 318/568.12; 318/568.18; 901/1

(58) Field of Classification Search .................. 701/23, 701/25, 26, 27, 300, 301; 318/568.12, 568.18; 700/245, 250, 253, 255; 356/4.01, 5.01; 342/70, 71; 901/1, 50
See application file for complete search history.

(56) References Cited

U.S. PATENT DOCUMENTS

| 4,570,217 A | 2/1986 | Allen et al. |
| 4,613,942 A | 9/1986 | Chen |
| 4,786,847 A | 11/1988 | Daggett et al. |
| 4,846,576 A | 7/1989 | Maruyama et al. |
| 4,870,561 A | 9/1989 | Love et al. |
| 4,967,862 A * | 11/1990 | Pong et al. .................... 180/19.3 |
| 5,111,401 A | 5/1992 | Everett et al. |
| 5,247,608 A | 9/1993 | Flemming et al. |
| 5,286,973 A | 2/1994 | Wenstrom et al. |
| 5,347,459 A | 9/1994 | Greenspan et al. |
| 5,371,854 A | 12/1994 | Kramer |

(Continued)

FOREIGN PATENT DOCUMENTS

WO  WO 00/06084  2/2000

OTHER PUBLICATIONS

Bruemmer et al., "Autonomous Robot System for Sensor Characterization" 10th International Conference on Robotics and Remote Systems for Hazardous Environments, Mar. 1, 2004, pp. 1-6.*

(Continued)

*Primary Examiner* — Thomas G Black
*Assistant Examiner* — Christine Behncke
(74) *Attorney, Agent, or Firm* — TraskBritt

(57) ABSTRACT

A virtual track or rail system and method is described for execution by a robot. A user, through a user interface, generates a desired path comprised of at least one segment representative of the virtual track for the robot. Start and end points are assigned to the desired path and velocities are also associated with each of the at least one segment of the desired path. A waypoint file is generated including positions along the virtual track representing the desired path with the positions beginning from the start point to the end point including the velocities of each of the at least one segment. The waypoint file is sent to the robot for traversing along the virtual track.

22 Claims, 39 Drawing Sheets

U.S. PATENT DOCUMENTS

| | | | |
|---|---|---|---|
| 5,509,090 A | 4/1996 | Maruyama et al. | |
| 5,511,147 A | 4/1996 | Abdel-Malek | |
| 5,521,843 A | 5/1996 | Hashima et al. | |
| 5,561,742 A | 10/1996 | Terada et al. | |
| 5,586,199 A | 12/1996 | Kanda et al. | |
| 5,590,062 A | 12/1996 | Nagamitsu et al. | |
| 5,617,335 A | 4/1997 | Hashima et al. | |
| 5,675,229 A | 10/1997 | Thorne | |
| 5,684,531 A | 11/1997 | Li et al. | |
| 5,684,695 A | 11/1997 | Bauer | |
| 5,705,906 A | 1/1998 | Tanabe et al. | |
| 5,721,691 A | 2/1998 | Wuller et al. | |
| 5,838,562 A | 11/1998 | Gudat et al. | |
| 5,867,800 A | 2/1999 | Leif | |
| 5,870,494 A | 2/1999 | Kanda et al. | |
| 5,913,919 A | 6/1999 | Bauer et al. | |
| 5,936,240 A | 8/1999 | Dudar et al. | |
| 5,937,143 A | 8/1999 | Watanabe et al. | |
| 5,949,683 A | 9/1999 | Akami et al. | |
| 6,055,042 A | 4/2000 | Sarangapani | |
| 6,061,709 A | 5/2000 | Bronte | |
| 6,078,255 A | 6/2000 | Dividock et al. | |
| 6,157,864 A | 12/2000 | Schwenke et al. | |
| 6,160,371 A | 12/2000 | Tachikawa | |
| 6,163,252 A | 12/2000 | Nishiwaki | |
| 6,167,328 A * | 12/2000 | Takaoka et al. | 700/264 |
| 6,205,380 B1 | 3/2001 | Bauer et al. | |
| 6,212,574 B1 | 4/2001 | O'Rourke et al. | |
| 6,314,341 B1 | 11/2001 | Kanayama | |
| 6,332,102 B1 | 12/2001 | Nakajima et al. | |
| 6,476,354 B1 | 11/2002 | Jank et al. | |
| 6,496,755 B2 | 12/2002 | Wallach et al. | |
| 6,516,236 B1 | 2/2003 | Brown et al. | |
| 6,522,288 B1 | 2/2003 | Paradie et al. | |
| 6,535,793 B2 | 3/2003 | Allard | |
| 6,581,048 B1 | 6/2003 | Werbos | |
| 6,598,169 B1 | 7/2003 | Warwick et al. | |
| 6,618,767 B1 | 9/2003 | Slaughter et al. | |
| 6,681,150 B1 | 1/2004 | Haga et al. | |
| 6,697,147 B2 | 2/2004 | Ko et al. | |
| 6,721,462 B2 | 4/2004 | Okabayashi et al. | |
| 6,760,645 B2 | 7/2004 | Kaplan et al. | |
| 6,760,648 B2 | 7/2004 | Sakamoto et al. | |
| 6,768,944 B2 | 7/2004 | Breed et al. | |
| 6,785,590 B2 | 8/2004 | Kasuga et al. | |
| 6,804,580 B1 | 10/2004 | Stoddard et al. | |
| 6,809,490 B2 | 10/2004 | Jones et al. | |
| 6,816,753 B2 | 11/2004 | Sakamoto | |
| 6,836,701 B2 | 12/2004 | McKee | |
| 6,845,297 B2 | 1/2005 | Allard | |
| 6,865,429 B1 | 3/2005 | Schneider et al. | |
| 6,883,201 B2 | 4/2005 | Jones et al. | |
| 6,889,118 B2 | 5/2005 | Murray, IV et al. | |
| 6,917,893 B2 | 7/2005 | Dietsch et al. | |
| 6,922,632 B2 | 7/2005 | Foxlin | |
| 6,925,357 B2 | 8/2005 | Wang et al. | |
| 6,941,543 B1 | 9/2005 | Brown et al. | |
| 6,974,082 B2 | 12/2005 | Mackey | |
| 7,024,278 B2 | 4/2006 | Chiappetta et al. | |
| 7,069,113 B2 | 6/2006 | Matsuoka et al. | |
| 7,069,124 B1 | 6/2006 | Whittaker et al. | |
| 7,085,637 B2 | 8/2006 | Breed et al. | |
| 7,151,848 B1 | 12/2006 | Watanabe et al. | |
| 7,162,056 B2 | 1/2007 | Burl et al. | |
| 7,164,971 B2 | 1/2007 | Ferla et al. | |
| 7,170,252 B2 | 1/2007 | Maeki | |
| 7,211,980 B1 | 5/2007 | Bruemmer et al. | |
| 7,343,222 B2 | 3/2008 | Solomon | |
| 7,429,843 B2 | 9/2008 | Jones et al. | |
| 7,450,127 B2 * | 11/2008 | Hong et al. | 345/474 |
| 2002/0091466 A1 | 7/2002 | Song et al. | |
| 2002/0120362 A1 | 8/2002 | Lathan et al. | |
| 2002/0137557 A1 | 9/2002 | Ishii et al. | |
| 2003/0033050 A1* | 2/2003 | Yutkowitz | 700/189 |
| 2003/0055654 A1 | 2/2003 | Oudeyer | |
| 2003/0101151 A1 | 5/2003 | Holland | |
| 2003/0144774 A1 | 7/2003 | Trissel et al. | |
| 2003/0171846 A1 | 9/2003 | Murray, IV et al. | |
| 2003/0191559 A1 | 10/2003 | Chatsinchai et al. | |
| 2003/0216834 A1* | 11/2003 | Allard | 700/245 |
| 2004/0019406 A1 | 1/2004 | Wang et al. | |
| 2004/0066500 A1 | 4/2004 | Gokturk et al. | |
| 2004/0073360 A1 | 4/2004 | Foxlin | |
| 2004/0133316 A1 | 7/2004 | Dean | |
| 2004/0138959 A1 | 7/2004 | Hlavac et al. | |
| 2004/0158355 A1 | 8/2004 | Holmqvist et al. | |
| 2004/0167670 A1 | 8/2004 | Goncalves et al. | |
| 2004/0168148 A1 | 8/2004 | Goncalves et al. | |
| 2004/0170302 A1 | 9/2004 | Museth et al. | |
| 2004/0175680 A1 | 9/2004 | Hlavac et al. | |
| 2004/0189702 A1 | 9/2004 | Hlavac et al. | |
| 2004/0193321 A1 | 9/2004 | Anfindsen et al. | |
| 2004/0199290 A1 | 10/2004 | Stoddard et al. | |
| 2004/0210847 A1 | 10/2004 | Berson et al. | |
| 2005/0004723 A1* | 1/2005 | Duggan et al. | 701/24 |
| 2005/0007603 A1 | 1/2005 | Arieli et al. | |
| 2005/0021186 A1 | 1/2005 | Murray, IV et al. | |
| 2005/0149231 A1* | 7/2005 | Pretlove et al. | 700/264 |
| 2005/0182518 A1 | 8/2005 | Karlsson | |
| 2005/0197739 A1 | 9/2005 | Noda et al. | |
| 2005/0204438 A1 | 9/2005 | Wang et al. | |
| 2005/0234592 A1 | 10/2005 | McGee et al. | |
| 2005/0234679 A1 | 10/2005 | Karlsson | |
| 2006/0015215 A1 | 1/2006 | Howard et al. | |
| 2006/0031429 A1 | 2/2006 | Ayyagari | |
| 2006/0095160 A1 | 5/2006 | Orita et al. | |
| 2006/0117324 A1 | 6/2006 | Alsafadi et al. | |
| 2006/0178777 A1 | 8/2006 | Park et al. | |
| 2006/0241827 A1 | 10/2006 | Fukuchi et al. | |
| 2007/0093940 A1 | 4/2007 | Ng-Thow-Hing et al. | |
| 2007/0143345 A1 | 6/2007 | Jones et al. | |
| 2007/0156286 A1 | 7/2007 | Yamauchi | |
| 2007/0197877 A1 | 8/2007 | Decorte et al. | |
| 2007/0198145 A1 | 8/2007 | Norris et al. | |
| 2007/0208442 A1 | 9/2007 | Perrone | |
| 2007/0260394 A1 | 11/2007 | Dean | |
| 2007/0271002 A1 | 11/2007 | Hoskinson et al. | |
| 2008/0009965 A1 | 1/2008 | Bruemmer et al. | |
| 2008/0009967 A1 | 1/2008 | Bruemmer | |
| 2008/0049217 A1 | 2/2008 | Cappelletti | |
| 2008/0071423 A1 | 3/2008 | Murray, IV et al. | |
| 2008/0294288 A1 | 11/2008 | Yamauchi | |
| 2009/0043439 A1* | 2/2009 | Barfoot et al. | 701/25 |

OTHER PUBLICATIONS

Yamauchi, Brian, "The Wayfarer modular navigation payload for intelligent robot infrastructure," iRobot Research Group, Burlington, MA, May 2005, 12 pages.

Fernandez-Madrigal et al., "Adaptable Web Interfaces for Networked Robots," University of Malaga, Spain. Aug. 2005, 6 pages.

Thrun, Learning Occupancy Grids with Forward Models, 2001, IEEE, pp. 1676-1681, vol. 3.

Thompson, Colleen, "Robots as Team Members? Why, yes, and the Idaho lab is finding them to be as effective as bomb-sniffing dogs," Innovation: America's Journal of Technology Commercialization, Jun.-Jul. 2007, pp. 20-21.

Bruemmer et al., "Shared Understanding for Collaborative Control," IEEE Transactions on Systems, Man, and Cybernetics-Part A: Systems and Humans, vol. 35, No. 4, Jul. 2005.

Bualat et al., "Developing an Autonomy Infusion Infrastructure for Robotic Exploration," 2004 IEEE Aerospace Conference Proceedings, Jun. 2004, pp. 849-860.

Fernandez-Madrigal et al., "Adaptable Web Interfaces for Networked Robots," University of Malaga, Spain. date unknown, 6 pages.

Laschi et al., "Adaptable Semi-Autonomy in Personal Robots," IEEE International Workshop on Robot and Human Interactive Communication, 2001, pp. 152-157.

Piaggio et al., "ETHNOS-II, A Programming Environment for Distributed Multiple Robotic Systems," IEEE Mar. 1999, pp. 1-10.

Teng et al., "A HAL for Component-based Embedded Operating Systems," IEEE Proceedings of the 29th Annual International Computer Software and Applications Conference, 2005, 2 pages.

Volpe et al., "The CLARAty Architecture for Robotic Autonomy," Jet Propulsion Laboratory, California Institute of Technology, Pasadena, California, IEEE, Feb. 2001, pp. 1-121 to 1-132.

Yamauchi, Brian, "The Wayfarer modular navigation payload for intelligent robot infrastructure," iRobot Research Group, Burlington, MA, date unknown, 12 pages.

Yoo et al., "Introduction to Hardware Abstraction Layers for SoC," IEEE Proceedings of the Design, Automation and Test in Europe conference and Exhibition, 2003, 2 pages.

Barber et al., "A Communication Protocol Supporting Dynamic Autonomy Agreements in Multi-agent Systems," 2001, Internet, p. 1-18.

Idaho National Laboratory, Dynamic Autonomy Collaborative Cognitive Workspace, 2002, Internet, p. 1-3.

Idaho National Laboratory, Dynamic Autonomy Real-Time Human-Robot Interaction Issues, Internet, 2002.

Idaho National Laboratory, Teleoperation, 2002, Internet, p. 1-2.

Jennings et al., Cooperative Robot Localization with Vision-Based Mapping, 1998, Internet, p. 1-7.

Baptista et al., "An experimental testbed for position and force control of robotic manipulators," 1998, IEEE, p. 222-227.

Baptista et al., "An open architecture for position and force control of robotic manipulators," 1998, IEEE, p. 471-474, vol. 2.

Buttazzo et al., "Robot control in hard real-time environment," 1997, IEEE, p. 152-159.

Iberall et al., "Control philosophy and simulation of a robotic hand as a model for prosthetic hands," 1993, IEEE, p. 824-831.

Idasiak et al., "A predictive real-time software for robotic application," 1995, IEEE, p. 3994-3999 vol. 5.

Montano et al., "Active sensing using proximity sensors for object recognition and localization," 1991, IEEE, p. 49-54.

Munich et al., "ERSP: A Software Platform and Architecture for the Service Robotics Industry," IEEE, Aug. 2-6, 2005, pp. 460-467.

PCT International Search Report and Written Opinion of the International Searching Authority for PCT/US09/36685, dated Nov. 2, 2009, 9 pages.

* cited by examiner

270

Cognitive Glue:
blends & orchestrates asynchronous firings from
reactive & deliberate behaviors below GoTo: guarded motion, obstacle avoidance, get-unstuck
reactive & deliberate path plan waypoint navigation
272

Human detection & pursuit: 274
occupancy change detection, laser tracking, visual tracking,
path planning, obstacle avoidance 276
Exploration / Reconnaissance (map building)

278
Leader / Follower

280
Search & Identify

*FIG. 9*

| Autonomy Mode | Defines Task Goals | Supervises Direction | Motivates Motion | Prevents Collision |
|---|---|---|---|---|
| Teleoperation mode 293 | Operator | Operator | Operator | Operator |
| Safe Mode 294 | Operator | Operator | Operator | Robot |
| Shared Mode 295 | Operator | Operator | Robot | Robot |
| Collaborative Tasking Mode 296 | Operator | Robot | Robot | Robot |
| Autonomous Mode 297 | Robot | Robot | Robot | Robot |

ROBOTICS VIRTUAL RAIL SYSTEM AND METHOD

CONTRACTUAL ORIGIN OF THE INVENTION

This invention was made with government support under Contract Number DE-AC07-05-ID14517 awarded by the United States Department of Energy. The government has certain rights in the invention.

BACKGROUND OF THE INVENTION

1. Field of the Invention

The present invention relates to robot systems and, more particularly, to configuring a robot to follow a defined path.

2. State of the Art

Historically, robot behaviors have been created for specific tasks and applications. These behaviors have generally been reinvented time and again for different robots and different applications. There has been no sustained attempt to provide a kernel of basic robot competence and decision making that can be used to bootstrap development across many different applications.

Some architectures have been proposed that provide a generic application programming interface (API) for querying various sensors and commanding various actuators; however, many of these architectures have been limited to raw inputs and outputs rather than provide the intelligence and behavior to a robot. As a result, the behavior functionality created for one robot may not be easily ported to new robots. Other architectures have been proposed to allow limited behaviors to port across different robot platforms, but these have generally been limited to specific low-level control systems.

The problem with robots today is that they are not very bright. Current robot "intelligence" is really just a grab-bag of programmed behaviors to keep mobile robots from doing stupid things, like getting stuck in corners or running into obstacles. The promise of wireless robots is that they can be sent into remote situations that are too difficult or dangerous for humans. The reality is that today's robots generally lack the ability to make any decisions on their own and rely on continuous guidance by human operators watching live video from on-board cameras.

Most commercial robots operate on a master/slave principle. A human operator completely controls the movement of the robot from a remote location using robot-based sensors such as video and Global Positioning System (GPS). This setup often requires more than one operator per robot to navigate around obstacles and achieve a goal. As a result, very skilled operators may be necessary to reliably direct the robot. Furthermore, the intense concentration needed for controlling the robot can detract from achieving mission goals.

Although it has been recognized that there is a need for adjustable autonomy, robot architectures currently do not exist that provide a foundation of autonomy levels upon which to build intelligent robotic capabilities. Furthermore, robot architectures do not currently exist that provide a foundation of generic robot attributes for porting to a variety of robot platforms.

Therefore, there is a need for a generic scalable robot architecture that provides a framework that is easily portable to a variety of robot platforms and is configured to not only provide hardware abstractions but also provide abstractions for generic robot attributes and robot behaviors.

In addition, there is a need for a robot intelligence kernel that provides a framework of dynamic autonomy that is easily portable to a variety of robot platforms and is configured to control a robot at a variety of interaction levels and across a diverse range of robot behaviors.

BRIEF SUMMARY OF THE INVENTION

A virtual track or rail system and method for execution by a robot is provided. Robot programming instructions are generated allowing a robot to trace or follow the virtual track arrangement. In one embodiment of the present invention, a method for implementing a virtual track for a robot is provided. A user generates a desired path comprised of at least one segment representative of the virtual track for the robot. Start and end points are assigned to the desired path and velocities are also associated with each of the at least one segment of the desired path. A waypoint file is generated and includes positions along the virtual track as represented by the desired path with the positions for execution from the start point to the end point, according to the velocities of each of the at least one segment. The waypoint file is sent to the robot for traversing along the virtual track.

In another embodiment of the present invention, a system for generating robot programming instructions for implementing a virtual track is provided. The system includes a graphical user interface configured to generate a desired path comprised of at least one segment representative of the virtual track for a robot. The system further includes a path plan process configured to assign start and end points to the desired path and to associate velocities with each of the at least one segment of the desired path. The path plan process is further configured to generate a waypoint file including positions along the virtual track as represented by the desired path with the positions for execution by the robot from the start point to the end point according to the velocities of each of the at least one segment.

In a further embodiment of the present invention, computer-readable medium having computer-executable instruction thereon for implementing a virtual track for a robot is provided. The computer-executable instructions perform a method for implementing a virtual track for a robot. A user generates a desired path comprised of at least one segment representative of the virtual track for the robot. Start and end points are assigned to the desired path and velocities are also associated with each of the at least one segment of the desired path. A waypoint file is generated and includes positions along the virtual track as represented by the desired path with the positions for execution from the start point to the end point according to the velocities of each of the at least one segment. The waypoint file is sent to the robot for traversing along the virtual track.

BRIEF DESCRIPTION OF THE DRAWINGS

In the drawings, which illustrate what is currently considered to be the best mode for carrying out the invention:

FIG. 9 illustrates representative cognitive conduct components that may be available on robot platforms;

DETAILED DESCRIPTION OF THE INVENTION

The present invention provides methods and apparatuses for a robot intelligence kernel that provides a framework of dynamic autonomy that is easily portable to a variety of robot platforms and is configured to control a robot at a variety of interaction levels and across a diverse range of robot behaviors.

In the following description, circuits and functions may be shown in block diagram form in order not to obscure the present invention in unnecessary detail. Conversely, specific circuit implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Furthermore, in this description of the invention, reference is made to the accompanying drawings, which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Headings are included herein to aid in locating certain sections of detailed description. These headings should not be considered to limit the scope of the concepts described under any specific heading. Furthermore, concepts described in any specific heading are generally applicable in other sections throughout the entire specification.

1. Hardware Environment

Figure 1:
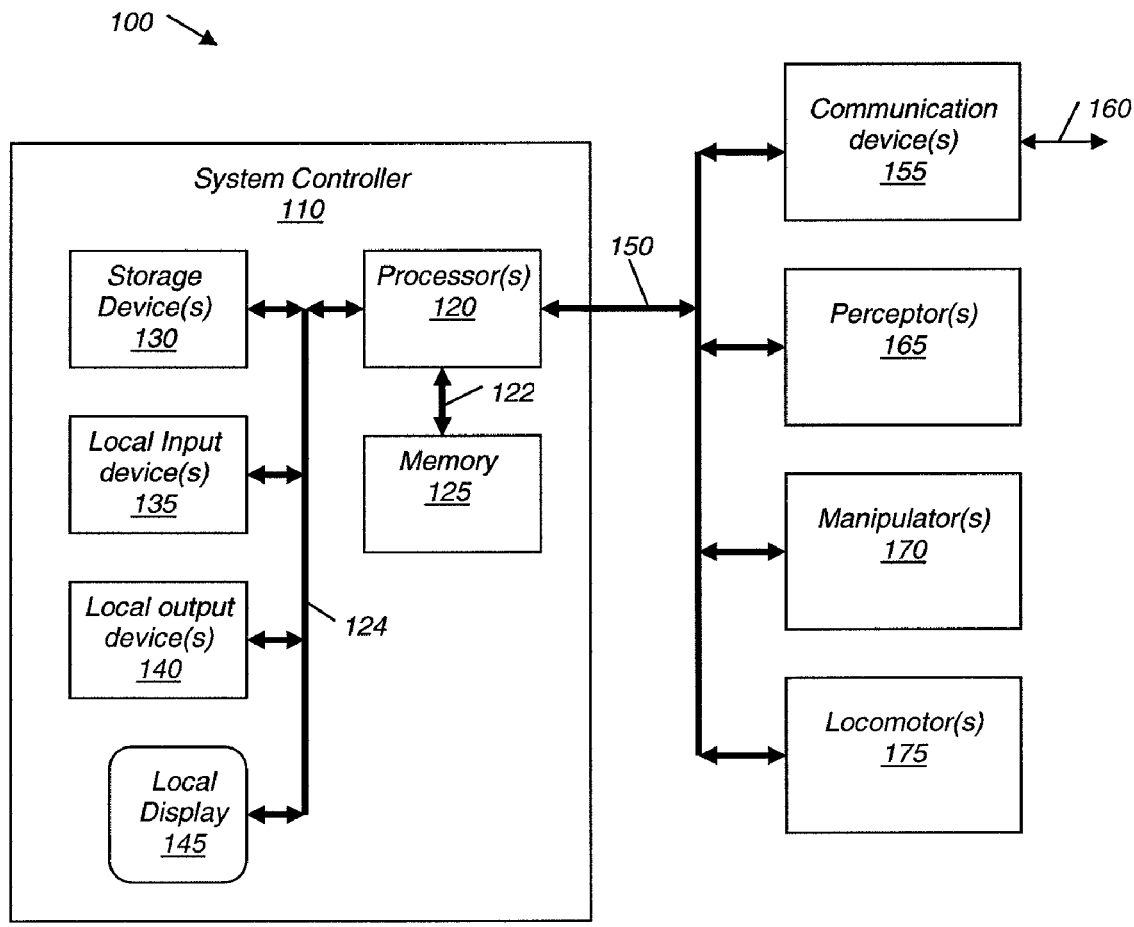
FIG. 1 illustrates a representative robot platform embodiment of the present invention.

FIG. 1 illustrates a representative robot platform 100 (which may also be referred to herein as a robot system) including the present invention. A robot platform 100 may include a system controller 110 including a system bus 150 for operable coupling to one or more communication devices 155 operably coupled to one or more communication channels 160, one or more perceptors 165, one or more manipulators 170, and one or more locomotors 175.

The system controller 110 may include a processor 120 operably coupled to other system devices by internal buses (122, 124). By way of example and not limitation, the processor 120 may be coupled to a memory 125 through a memory bus 122. The system controller 110 may also include an internal bus 124 for coupling the processor 120 to various other devices, such as storage devices 130, local input devices 135, local output devices 140, and local displays 145.

Local output devices 140 may be devices such as speakers, status lights, and the like. Local input devices 135 may be devices such as keyboards, mice, joysticks, switches, and the like.

Local displays 145 may be as simple as light-emitting diodes indicating status of functions of interest on the robot platform 100, or may be as complex as a high resolution display terminal.

The communication channels 160 may be adaptable to both wired and wireless communication, as well as supporting various communication protocols. By way of example and not limitation, the communication channels 160 may be configured as a serial or parallel communication channel, such as, for example, USB, IEEE-1394, 802.11a/b/g, cellular telephone, and other wired and wireless communication protocols.

The perceptors 165 may include inertial sensors, thermal sensors, tactile sensors, compasses, range sensors, sonar, Global Positioning System (GPS), Ground Penetrating Radar (GPR), lasers for object detection and range sensing, imaging devices, and the like. Furthermore, those of ordinary skill in the art will understand that many of these sensors may include a generator and a sensor to combine sensor inputs into meaningful, actionable perceptions. For example, sonar perceptors and GPR may generate sound waves or sub-sonic waves and sense reflected waves. Similarly, perceptors including lasers may include sensors configured for detecting reflected waves from the lasers for determining interruptions or phase shifts in the laser beam.

Imaging devices may be any suitable device for capturing images, such as, for example, an infrared imager, a video camera, a still camera, a digital camera, a Complementary Metal Oxide Semiconductor (CMOS) imaging device, a charge coupled device (CCD) imager, and the like. In addition, the imaging device may include optical devices for modifying the image to be captured, such as, for example, lenses, collimators, filters, and mirrors. For adjusting the direction at which the imaging device is oriented, a robot platform 100 may also include pan and tilt mechanisms coupled to the imaging device. Furthermore, a robot platform 100 may include a single imaging device or multiple imaging devices.

The manipulators 170 may include vacuum devices, magnetic pickup devices, arm manipulators, scoops, grippers, camera pan and tilt manipulators, and the like.

The locomotors 175 may include one or more wheels, tracks, legs, rollers, propellers, and the like. For providing the locomotive power and steering capabilities, the locomotors 175 may be driven by motors, actuators, levers, relays and the like. Furthermore, perceptors 165 may be configured in conjunction with the locomotors 175, such as, for example, odometers and pedometers.

Figure 2:
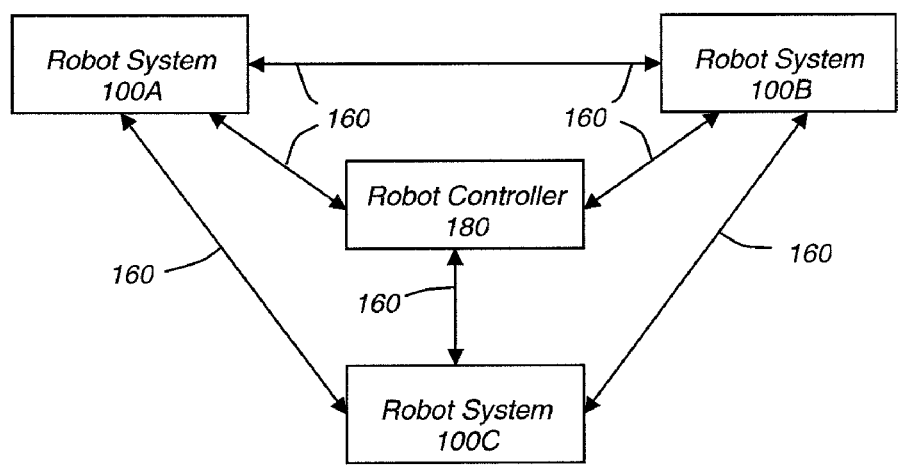
FIG. 2 illustrates a representative robot control environment including a plurality of robot platforms and a robot controller.

FIG. 2 illustrates a representative robot control environment including a plurality of robot platforms (100A, 100B, and 100C) and a robot controller 180. The robot controller 180 may be a remote computer executing a software interface from which an operator may control one or more robot platforms (100A, 100B, and 100C) individually or in cooperation. The robot controller 180 may communicate with the robot platforms (100A, 100B, and 100C), and the robot platforms (100A, 100B, and 100C) may communicate with each other, across the communication channels 160. While FIG. 2 illustrates one robot controller 180 and three robot platforms (100A, 100B, and 100C) those of ordinary skill in the art will recognize that a robot control environment may include one or more robot platforms 100 and one or more robot controllers 180. In addition, the robot controller 180 may be a version of a robot platform 100.

Software processes illustrated herein are intended to illustrate representative processes that may be performed by the robot platform 100 or robot controller 180. Unless specified otherwise, the order in which the processes are described is not intended to be construed as a limitation. Furthermore, the processes may be implemented in any suitable hardware, software, firmware, or combinations thereof. By way of example, software processes may be stored on the storage device 130, transferred to the memory 125 for execution, and executed by the processor 120.

When executed as firmware or software, the instructions for performing the processes may be stored on a computer readable medium (i.e., storage device 130). A computer readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

2. Generic Robot Abstraction Architecture

Conventionally, robot architectures have been defined for individual robots and generally must be rewritten or modified to work with different sensor suites and robot platforms. This means that adapting the behavior functionality created for one robot platform to a different robot platform is problematic. Furthermore, even architectures that propose a hardware abstraction layer to create a framework for accepting various hardware components still may not create a robot abstraction layer wherein the abstractions presented for high level behavioral programming are in terms of actionable components or generic robot attributes rather than the hardware present on the robot.

A notable aspect of the present invention is that it collates the sensor data issued from hardware or other robotic architectures into actionable information in the form of generic precepts. Embodiments of the present invention may include a generic robot architecture (GRA), which comprises an extensible, low-level framework, which can be applied across a variety of different robot hardware platforms, perceptor suites, and low-level proprietary control application programming interfaces (APIs). By way of example, some of these APIs may be Mobility, Aria, Aware, Player, etc.

Figure 3:
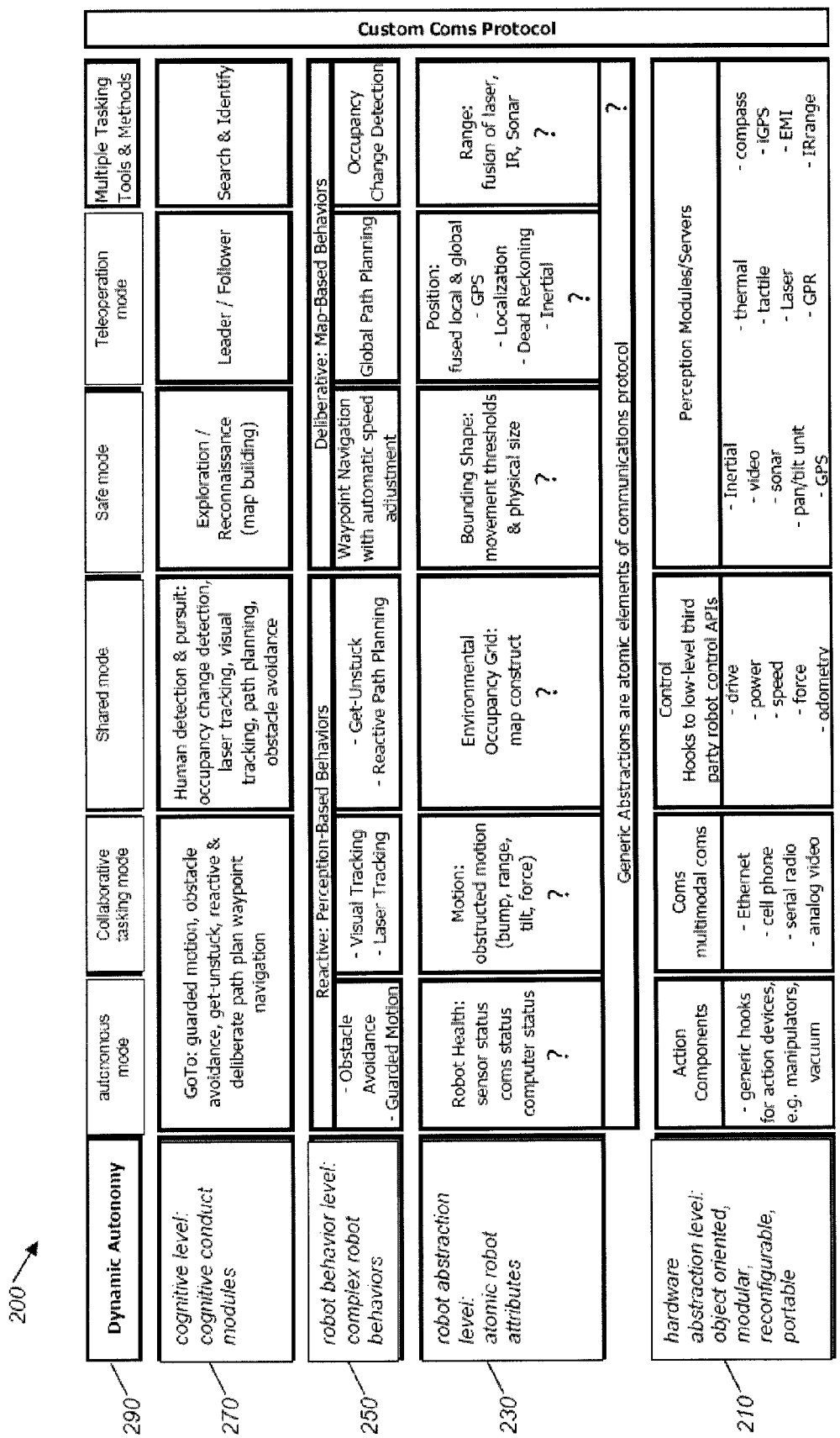
FIG. 3 is a software architecture diagram illustrating significant components of embodiments of the present invention.

FIG. 3 is a software architecture diagram 200 illustrating significant components of the GRA as a multi-level abstraction. Within the GRA, various levels of abstraction are available for use in developing robot behavior at different levels of dynamic autonomy 290. The object oriented structure of the GRA may be thought of as including two basic levels. As is conventional in object oriented class structures, each subsequent level inherits all of the functionality of the higher levels.

At the lower level, the GRA includes a hardware abstraction level, which provides for portable, object oriented access to low level hardware perception and control modules that may be present on a robot. The hardware abstraction level is reserved for hardware specific classes and includes, for example, implementations for the actual robot geometry and sensor placement on each robot type.

Above the hardware abstraction level, the GRA includes a robot abstraction level, which provides atomic elements (i.e., building blocks) of generic robot attributes and develops a membrane between the low level hardware abstractions and controls. This membrane is based on generic robot attributes, or actionable components, which include robot functions, robot perceptions, and robot status. Each generic robot attribute may utilize a variety of hardware abstractions, and possibly other robot attributes, to accomplish its individual function.

The robot abstraction level may include implementations that are generic to given proprietary low level APIs. Examples of functions in this class level include the interface calls for a variety of atomic level robot behaviors such as, for example, controlling motion and reading sonar data.

The GRA enables substantially seamless porting of behavioral intelligence to new hardware platforms and control APIs by defining generic robot attributes and actionable components to provide the membrane and translation between behavioral intelligence and the hardware. Once a definition for a robot in terms of platform geometries, sensors, and API calls has been specified, behavior and intelligence may be ported in a substantially seamless manner for future development. In addition, the object oriented structure enables straightforward extension of the architecture for defining new robot platforms as well as defining low-level abstractions for new perceptors, motivators, communications channels, and manipulators.

The GRA includes an interpreter such that existing and new robot behaviors port in a manner that is transparent to both the operator and the behavior developer. This interpreter may be used to translate commands and queries back and forth between the operator and robot with a common interface, which can then be used to create perceptual abstractions and behaviors. When the "common language" supported by the GRA is used by robot developers, it enables developed behaviors and functionality to be interchangeable across multiple robots. In addition to creating a framework for developing new robot capabilities, the GRA interpreter may be used to translate existing robot capabilities into the common language so that the behavior can then be used on other robots. The GRA is portable across a variety of platforms and proprietary low level APIs. This is done by creating a standard method for commanding and querying robot functionality that exists on top of any particular robot manufacturer's control API. Moreover, unlike systems where behavior stems from sensor data, the GRA facilitates a consistent or predictable behavior output regardless of robot size or type by categorizing robot and sensor data into perceptual abstractions from which behaviors can be built.

The Generic Robot Architecture also includes a scripting structure for orchestrating the launch of the different servers and executables that may be used for running the GRA on a particular robot platform. Note that since these servers and executables (e.g., laser server, camera server, and base platform application) will differ from robot to robot, the scripting structure includes the ability to easily specify and coordinate the launch of the files that may be needed for specific applications. In addition, the scripting structure enables automatic launching of the system at boot time so that the robot is able to exhibit functionality without any operator involvement (i.e., no need for a remote shell login).

The Generic Robot Architecture may access configuration files created for each defined robot type. For example, the configuration files may specify what sensors, actuators, and API are being used on a particular robot. Use of the scripting structure together with the configuration enables easy reconfiguration of the behaviors and functionality of the robot without having to modify source code (i.e., for example, recompile the C/C++ code).

The GRA keeps track of which capabilities are available (e.g., sensors, actuators, mapping systems, communications) on the specific embodiment and uses virtual and stub functions within the class hierarchy to ensure that commands and queries pertaining to capabilities that an individual robot does not have do not cause data access errors. For example, in a case where a specific capability, such as a manipulator, does not exist, the GRA returns special values indicating to the high-level behavioral control code that the command cannot be completed or that the capability does not exist. This makes it much easier to port seamlessly between different robot types by allowing the behavior code to adapt automatically to different robot configurations.

The above discussion of GRA capabilities has focused on the robot-oriented aspects of the GRA. However, the robot-oriented class structure is only one of many class structures included in the GRA. For example, the GRA also includes multi-tiered class structures for communication, range-sensing, cameras, and mapping. Each one of these class structures is set up to provide a level of functional modularity and allow different sensors and algorithms to be used interchangeably. By way of example and not limitation, without changing the behavioral code built on the GRA at the robot behavior level, it may be possible to swap various mapping and localization systems or cameras and yet achieve the same functionality simply by including the proper class modules at the hardware abstraction level and possibly at the robot abstraction level. Additional capabilities and features of each of the levels of the GRA are discussed below.

2.1. Hardware Abstraction Level

Figure 4:
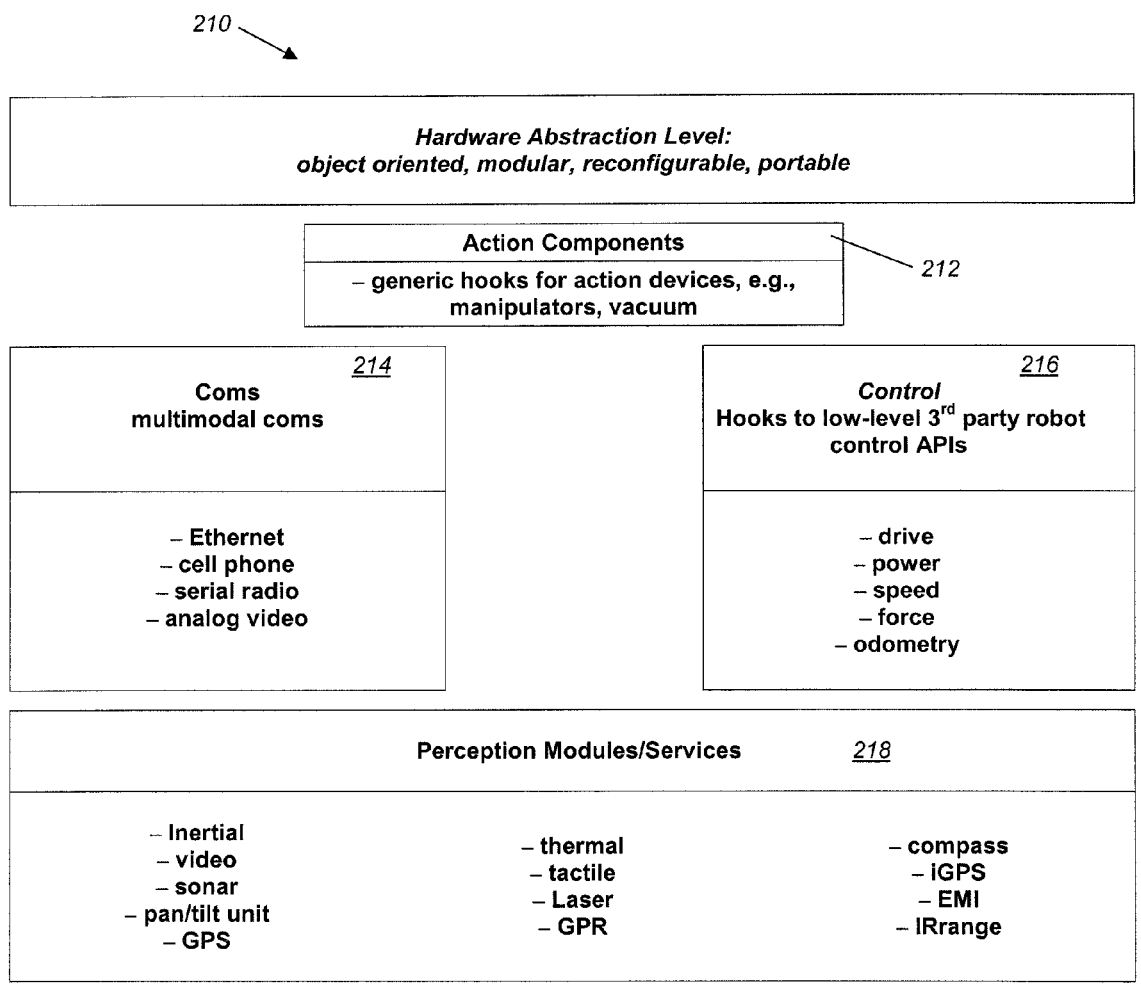
FIG. 4 illustrates representative hardware abstractions of hardware modules that may be available on robot platforms.

FIG. 4 illustrates the hardware abstraction level 210, which includes representative hardware abstractions of hardware modules that may be available on a robot platform. These hardware abstractions create an object oriented interface between the software and hardware that is modular, reconfigurable, and portable across robot platforms. As a result, a software component can create a substantially generic hook to a wide variety of hardware that may perform a similar function. It will be readily apparent to those of ordinary skill in the art that the modules shown in FIG. 4 are a representative, rather than comprehensive example of hardware abstractions. Some of these hardware abstractions include; action abstractions 212 (also referred to as manipulation abstractions) for defining and controlling manipulation type devices on the robot, communication abstractions 214 for defining and controlling communication media and protocols, control abstractions 216 (also referred to as locomotion abstractions) for defining and controlling motion associated with various types of locomotion hardware, and perception abstractions 218 for defining and controlling a variety of hardware modules configured for perception of the robot's surroundings and pose (i.e., position and orientation).

2.1.1. Manipulation Abstractions

Action device abstractions 212 may include, for example, vacuum devices, magnetic pickup devices, arm manipulators, scoops, grippers, camera pan and tilt manipulators, and the like.

2.1.2. Communication Abstractions

The communication abstractions present substantially common communications interfaces to a variety of communication protocols and physical interfaces. The communication channels 160 may be adaptable to both wired and wireless communication, as well as supporting various communication protocols. By way of example and not limitation, the communication abstractions may be configured to support serial and parallel communication channels, such as, for example, USB, IEEE-1394, 802.11 a/b/g, cellular telephone, and other wired and wireless communication protocols.

2.1.3. Locomotion Abstractions

Locomotion abstractions 216 may be based on robot motion, not necessarily on specific hardware components. For example and not limitation, motion control abstractions may include drive, steering, power, speed, force, odometry, and the like. Thus, the motion abstractions can be tailored to individual third party drive controls at the hardware abstraction level and effectively abstracted away from other architectural components. In this manner, support for motion control of a new robot platform may comprise simply supplying the APIs, which control the actual motors, actuators and the like, into the locomotion abstraction framework.

2.1.4. Perception Abstractions

The perception abstractions 218 may include abstractions for a variety of perceptive hardware useful for robots, such as, for example, inertial measurements, imaging devices, sonar measurements, camera pan/tilt abstractions, GPS and iGPS abstractions, thermal sensors, infrared sensors, tactile sensors, laser control and perception abstractions, GPR, compass measurements, EMI measurements, and range abstractions.

2.2. Robot Abstraction Level

Figure 5:
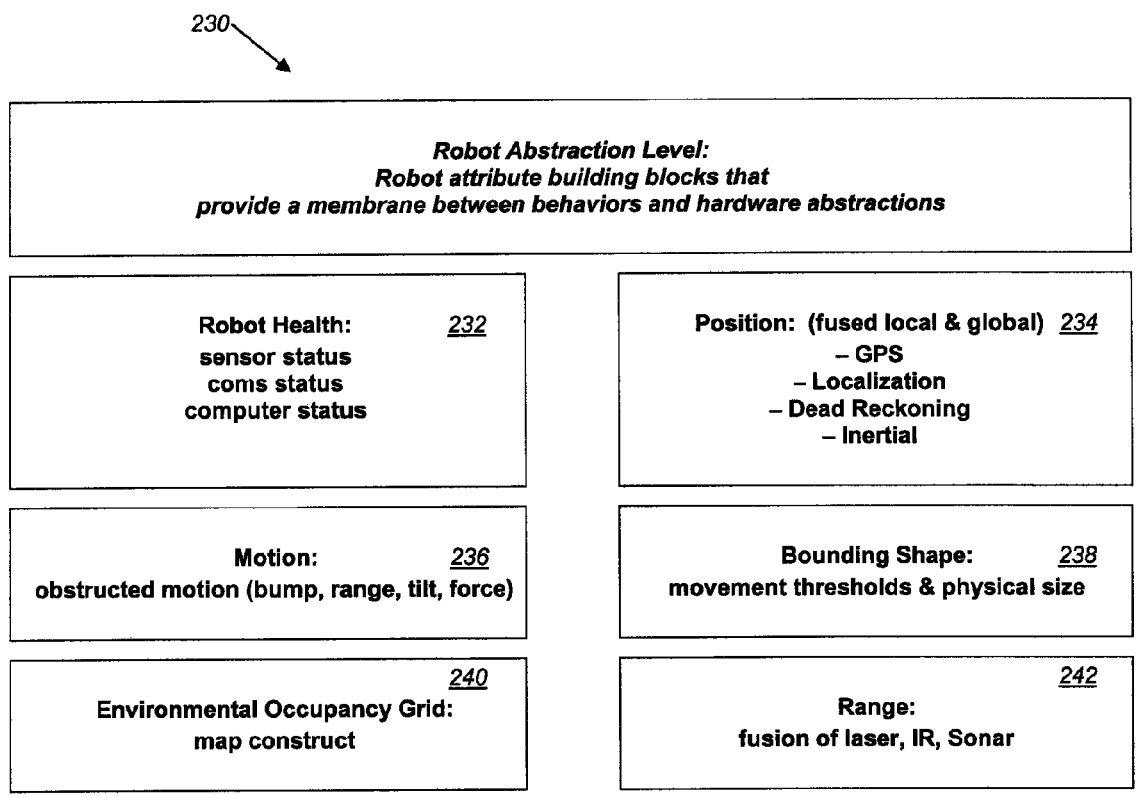
FIG. 5 illustrates a robot abstraction level including robot attributes that may be available on robot platforms.

While the hardware abstraction level 210 focuses on a software model for a wide variety of hardware that may be useful on robots, the robot abstraction level 230 (as illustrated in FIGS. 3 and 5) focuses on generic robot attributes. The generic robot attributes enable building blocks for defining robot behaviors at the robot behavior level and provide a membrane for separating the definition of robot behaviors from the low level hardware abstractions. Thus, each robot attribute may utilize one or more hardware abstractions to define its attribute. These robot attributes may be thought of as actionable abstractions. In other words, a given actionable abstraction may fuse multiple hardware abstractions that provide similar information into a data set for a specific robot attribute. For example and not limitation, the generic robot attribute of "range" may fuse range data from hardware abstractions of an IR sensor and a laser sensor to present a single coherent structure for the range attribute. In this way, the GRA presents robot attributes as building blocks of interest for creating robot behaviors such that, the robot behavior can use the attribute to develop a resulting behavior (e.g., stop, slow down, turn right, turn left, etc.).

Furthermore, a robot attribute may combine information from dissimilar hardware abstractions. By way of example and not limitation, the position attributes may fuse information from a wide array of hardware abstractions, such as: perception modules like video, compass, GPS, laser, and sonar; along with control modules like drive, speed, and odometry. Similarly, a motion attribute may include information from position, inertial, range, and obstruction abstractions.

This abstraction of robot attributes frees the developer from dealing with individual hardware elements. In addition, each robot attribute can adapt to the amount, and type of information it incorporates into the abstraction based on what hardware abstractions may be available on the robot platform.

The robot attributes, as illustrated in FIG. 5, are defined at a relatively low level of atomic elements that include attributes of interest for a robot's perception, status, and control. Some of these robot attributes include; robot health 232, robot position 234, robot motion 236, robot bounding shape 238, environmental occupancy grid 240, and range 242. It will be readily apparent to those of ordinary skill in the art that the modules shown in FIG. 5 are a representative, rather than comprehensive, example of robot attributes. Note that the term "robot attributes" is used somewhat loosely, given that robot attributes may include physical attributes such as robot health 232 and bounding shape 238 as well as how the robot perceives its environment, such as the environmental occupancy grid 240 and range attributes 242.

2.2.1. Robot Health

The robot health abstractions 232 may include, for example, general object models for determining the status and presence of various sensors and hardware modules, determining the status and presence of various communication modules, and determining the status of on board computer components.

2.2.2. Robot Bounding Shape

The robot bounding shape 238 abstractions may include, for example, definitions of the physical size and boundaries of the robot and definitions of various thresholds for movement that define a safety zone or event horizon, as is explained more fully below.

2.2.3. Robot Motion

The robot motion abstractions 236 may include abstractions for defining robot motion and orientation attributes such as, for example, obstructed motion, velocity, linear and angular accelerations, forces, and bump into obstacle, and orientation attributes such as roll, yaw and pitch.

2.2.4. Range

The range attributes 242 may include, for example, determination of range to obstacles from lasers, sonar, infrared, and fused combinations thereof.

Figure 6:
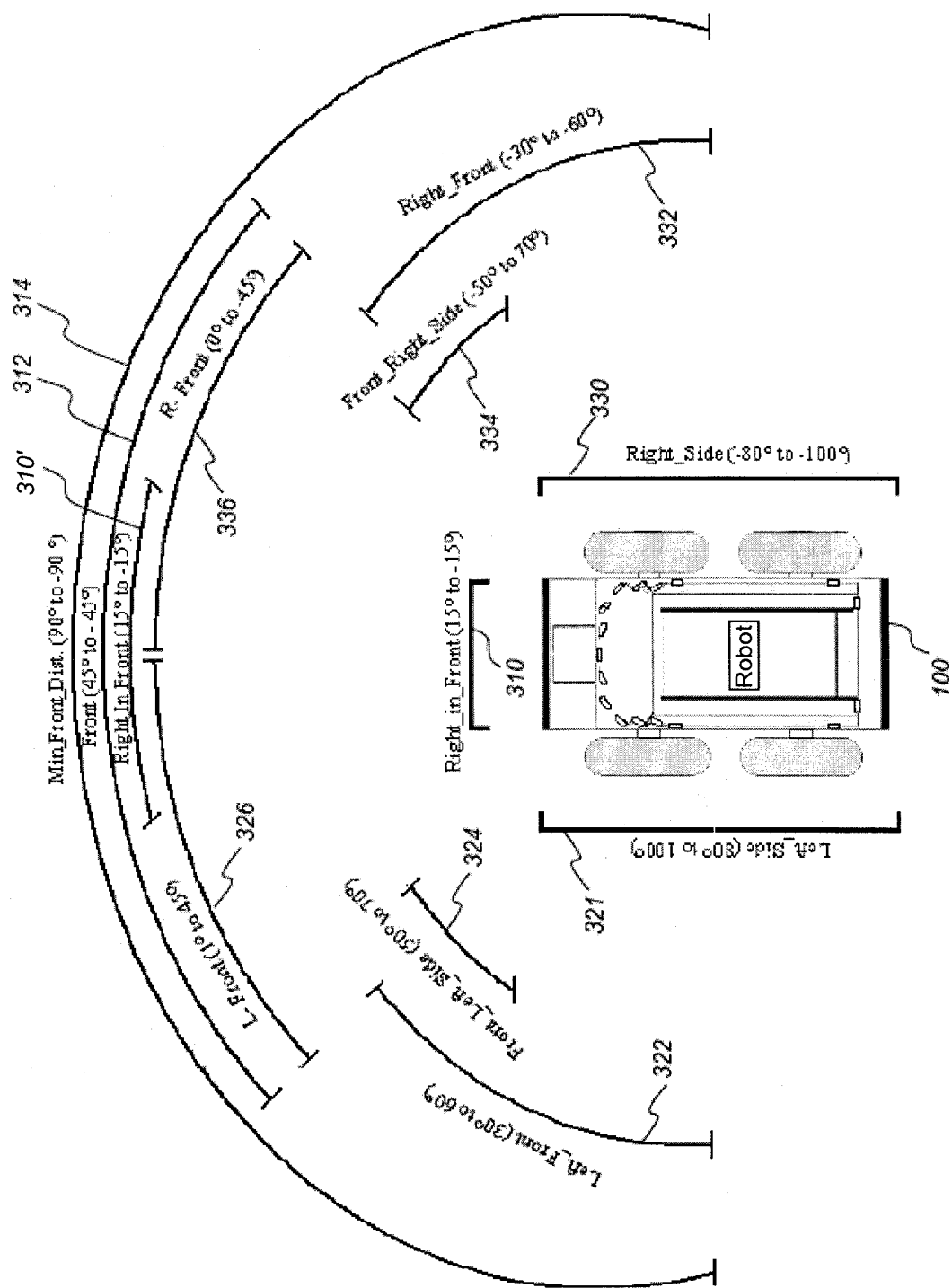
FIG. 6 illustrates a representative embodiment of how a range abstraction may be organized.

In more detail, FIG. 6 illustrates a representative embodiment of how a range abstraction may be organized. A variety of coordinate systems may be in use by the robot and an operator. By way of example, a local coordinate system may be defined by an operator relative to a space of interest (e.g., a building) or a world coordinate system defined by sensors such as a GPS unit, an iGPS unit, a compass, an altimeter, and the like. A robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation.

The range measurements for the representative embodiment illustrated in FIG. 6 are organized in a cylindrical coordinate system relative to the robot. The angles may be partitioned into regions covering the front, left, right and back of the robot and given names such as, for example, those used in FIG. 6.

Thus, regions in front may be defined and named as:

Right_In_Front (310 and 310), representing an angle between −15° and 15°;

Front 312, representing an angle between −45° and 45°; and

Min_Front_Dist 314, representing an angle between −90° and 90°.

Similarly, regions to the left side may be defined as:

Left_Side 321, representing an angle between 100° and 80°;

Left_Front 322, representing an angle between 60° and 30°;

Front_Left_Side 324, representing an angle between 70° and 50°; and

L_Front 326, representing an angle between 45° and 1°.

For the right side, regions may be defined as:

Right_Side 330, representing an angle between −100° and −80°;

Right_Front 332, representing an angle between −60° and −30°;

Front_Right_Side 334, representing an angle between −70° and −50°; and

R_Front 336, representing an angle between −45° and 0°.

While not shown, those of ordinary skill in the art will recognize that with the exception of the Left_Side 321 and Right_Side 330 regions, embodiments may include regions in the back, which are a minor image of those in the front wherein the "Front" portion of the name is replaced with "Rear."

Furthermore, the range attributes define a range to the closest object within that range. However, the abstraction of regions relative to the robot, as used in the range abstraction may also be useful for many other robot attributes and robot behaviors that may require directional readings, such as, for example, defining robot position, robot motion, camera positioning, an occupancy grid map, and the like.

In practice, the range attributes may be combined to define a more specific direction. For example, directly forward motion may be defined as a geometrically adjusted combination of Right_In_Front 310, L_Front 326, R_Front 336, Front_Left_Side 324, and Front_Right_Side 334.

2.2.5. Robot Position and Environmental Occupancy Grid Maps

Returning to FIG. 5, the robot abstractions may include robot position attributes 234. Mobile robots may operate effectively only if they, or their operators, know where they are. Conventional robots may rely on real-time video and global positioning systems (GPS) as well as existing maps and floor plans to determine their location. However, GPS may not be reliable indoors and video images may be obscured by smoke or dust, or break up because of poor communications. Maps and floor plans may not be current and often are not readily available, particularly in the chaotic aftermath of natural, accidental or terrorist events. Consequently, real-world conditions on the ground often make conventional robots that rely on a priori maps ineffective.

Accurate positioning knowledge enables the creation of high-resolution maps and accurate path following, which may be needed for high-level deliberative behavior, such as systematically searching or patrolling an area.

Embodiments of the present invention may utilize various mapping or localization techniques including positioning systems such as indoor GPS, outdoor GPS, differential GPS, theodolite systems, wheel-encoder information, and the like.

To make robots more autonomous, embodiments of the present invention may fuse the mapping and localization information to build 3D maps on-the-fly that let robots understand their current position and an estimate of their surroundings. Using existing information, map details may be enhanced as the robot moves through the environment. Ultimately, a complete map containing rooms, hallways, doorways, obstacles and targets may be available for use by the robot and its human operator. These maps also may be shared with other robots or human first responders.

With the on-board mapping and positioning algorithm that accepts input from a variety of range sensors, the robot may make substantially seamless transitions between indoor and outdoor operations without regard for GPS and video dropouts that occur during these transitions. Furthermore, embodiments of the present invention provide enhanced fault tolerance because they do not require off-board computing or reliance on potentially inaccurate or non-existent a priori maps.

Embodiments of the present invention may use localization methods by sampling range readings from scanning lasers and ultrasonic sensors and by reasoning probabilistically about where the robot is within its internal model of the world. The robot localization problem may be divided into two sub-tasks: global position estimation and local position tracking. Global position estimation is the ability to determine the robot's position in an *a priori* or previously learned map, given no information other than that the robot is somewhere in the region represented by the map. Once a robot's position has been found in the map, local tracking is the problem of keeping track of the robot's position over time and movement.

The robot's state space may be enhanced by localizaton methods such as Monte Carlo techniques and Markovian probability grid approaches for position estimation, as are well known by those of ordinary skill in the art. Many of these techniques provide efficient and substantially accurate mobile robot localization.

With a substantially accurate position for the robot determined, local tracking can maintain the robot's position over time and movement using dead-reckoning, additional global positioning estimation, or combinations thereof. Dead-reckoning is a method of navigation by keeping track of how far you have gone in any particular direction. For example, dead reckoning would determine that a robot has moved a distance of about five meters at an angle from the current pose of about 37 degrees if the robot moves four meters forward, turns 90 degrees to the right, and moves forward three meters. Dead-reckoning can lead to navigation errors if the distance traveled in a given direction, or the angle through which a robot turns, is interpreted incorrectly. This can happen, for example, if one or more of the wheels on the robot spin in place when the robot encounters an obstacle.

Therefore, dead reckoning accuracy may be bolstered by sensor information from the environment, new global positioning estimates, or combinations thereof. With some form of a map, the robot can use range measurements to map features to enhance the accuracy of a pose estimate. Furthermore, the accuracy of a pose estimate may be enhanced by new range measurements (e.g., laser scans) into a map that may be growing in size and accuracy. In Simultaneous Localization and Mapping (SLAM), information from the robot's encoders and laser sensors may be represented as a network of probabilistic constraints linking the successive positions (poses) of the robot. The encoders may relate one robot pose to the next via dead-reckoning. To give further constraints between robot poses, the laser scans may be matched with dead-reckoning, including constraints for when a robot returns to a previously visited area.

Figure 7:
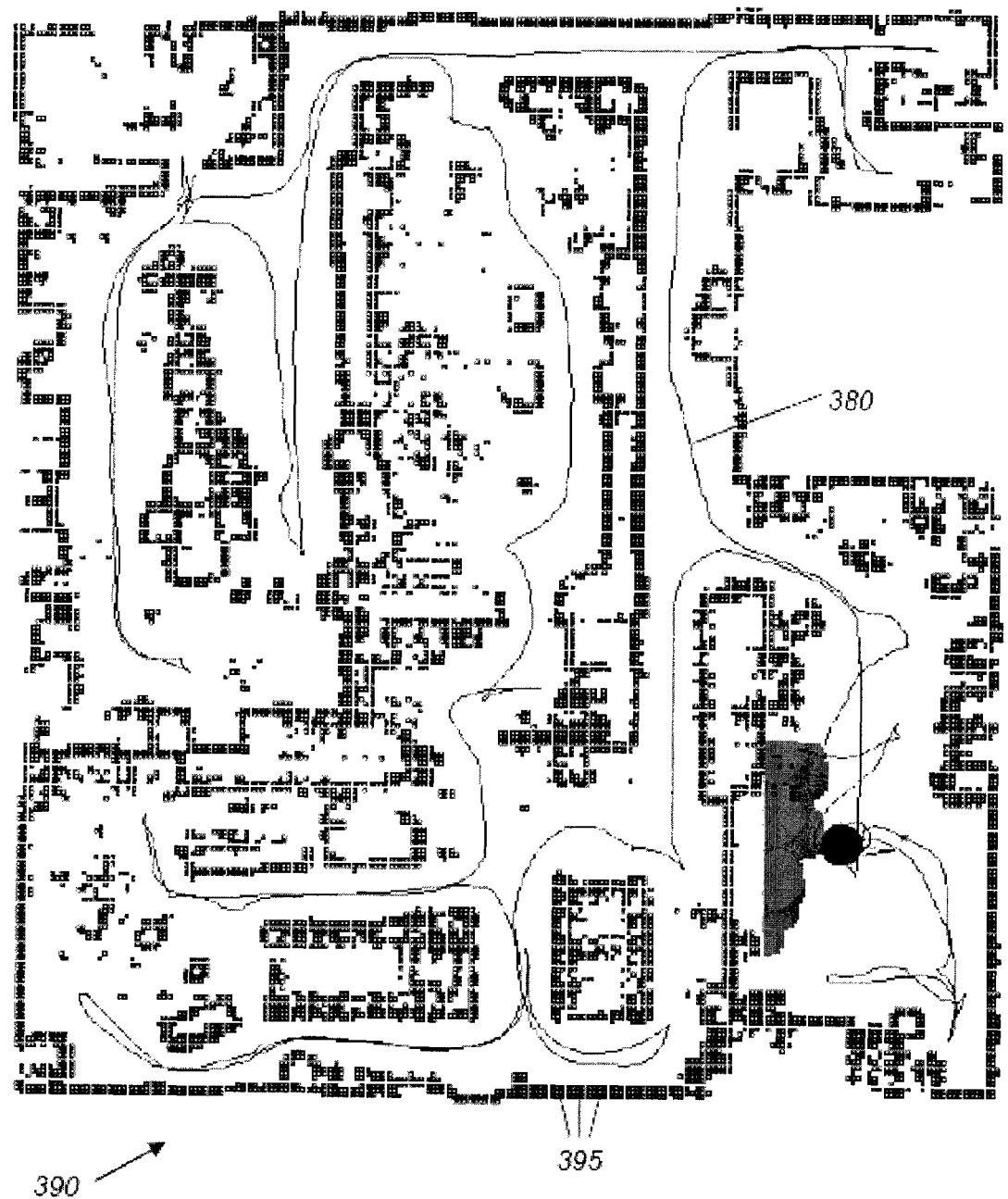
FIG. 7 illustrates an occupancy grid map that may be developed by embodiments of the present invention.

The robot abstractions may include environmental occupancy grid attributes 240. One form of map that may be useful from both the robot's perspective and an operator's perspective is an occupancy grid. An environmental occupancy grid, formed by an occupancy grid abstraction 240 (FIG. 5) is illustrated in FIG. 7. In forming an occupancy grid, a robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation. Furthermore, occupancy grids may be translated to other coordinate systems for use by an operator.

An occupancy grid map 390 may be developed by dividing the environment into a discrete grid of occupancy cells 395 and assigning a probability to each grid indicating whether the grid is occupied by an object. Initially, the occupancy grid may be set so that every occupancy cell is set to an initial probability. As the robot scans the environment, range data developed from the scans may be used to update the occupancy grid. For example, based on range data, the robot may detect an object at a specific orientation and range away from the robot. This range data may be converted to a different coordinate system (e.g., local or world Cartesian coordinates). As a result of this detection, the robot may increase the probability that the particular occupancy cell is occupied and decrease the probability that occupancy cells between the robot and the detected object are occupied. As the robot moves through its environment, new horizons may be exposed to the robot's sensors, which enable the occupancy grid to be expanded and enhanced. To enhance map building and localization even further, multiple robots may explore an environment and cooperatively communicate their map information to each other or a robot controller to cooperatively build a map of the area.

An example occupancy grid map 390, as it might be presented to an operator, is illustrated in FIG. 7. The grid cells 395 can be seen as small squares on this occupancy grid 390. A robot path 380 is shown to illustrate how the robot may have moved through the environment in constructing the occupancy grid 390. Of course, those of ordinary skill in the art will recognize that, depending on the application and expected environment, the occupancy grid 390 may be defined in any suitable coordinate system and may vary in resolution (i.e., size of each occupancy cell). In addition, the occupancy grid 390 may include a dynamic resolution such that the resolution may start out quite coarse while the robot discovers the environment, then evolve to a finer resolution as the robot becomes more familiar with its surroundings.

3. Robotic Intelligence Kernel

A robot platform 100 may include a robot intelligence kernel (may also be referred to herein as intelligence kernel), which coalesces hardware components for sensing, motion, manipulation, and actions with software components for perception, communication, behavior, and world modeling into a single cognitive behavior kernel that provides intrinsic intelligence for a wide variety of unmanned robot platforms. The intelligence kernel architecture may be configured to support multiple levels of robot autonomy that may be dynamically modified depending on operating conditions and operator wishes.

The robot intelligence kernel (RIK) may be used for developing a variety of intelligent robotic capabilities. By way of example and not limitation, some of these capabilities including visual pursuit, intruder detection and neutralization, security applications, urban reconnaissance, search and rescue, remote contamination survey, and countermine operations.

Referring back to the software architecture diagram of FIG. 3, the RIK comprises a multi-level abstraction including a robot behavior level 250 and a cognitive level 270. The RIK may also include the robot abstraction level 230 and the hardware abstraction level 210 discussed above.

Above the robot abstraction level 230, the RIK includes the robot behavior level 250, which defines specific complex behaviors that a robot, or a robot operator, may want to accomplish. Each complex robot behavior may utilize a variety of robot attributes, and in some cases a variety of hardware abstractions, to perform the specific robot behavior.

Above the robot behavior level 250, the RIK includes the cognitive level 270, which provides cognitive conduct modules to blend and orchestrate the asynchronous events from the complex robot behaviors and generic robot behaviors into combinations of functions exhibiting cognitive behaviors, wherein high level decision making may be performed by the robot, the operator, or combinations of the robot and the operator.

Some embodiments of the RIK may include, at the lowest level, the hardware abstraction level 210, which provides for portable, object oriented access to low level hardware perception and control modules that may be present on a robot. These hardware abstractions have been discussed above in the discussion of the GRA.

Some embodiments of the RIK may include, above the hardware abstraction level 210, the robot abstraction level 230 including generic robot abstractions, which provide atomic elements (i.e., building blocks) of generic robot attributes and develop a membrane between the low level hardware abstractions and control based on generic robot functions. Each generic robot abstraction may utilize a variety of hardware abstractions to accomplish its individual function. These generic robot abstractions have been discussed above in the discussion of the GRA.

3.1. Robot Behaviors

While the robot abstraction level 230 focuses on generic robot attributes, higher levels of the RIK may focus on; relatively complex robot behaviors at the robot behavior level 250, or on robot intelligence and operator collaboration at the cognitive level 270.

The robot behavior level 250 includes generic robot classes comprising functionality common to supporting behavior across most robot types. For example, the robot behavior level includes utility functions (e.g., Calculate angle to goal) and data structures that apply across substantially all robot types (e.g., waypoint lists). At the same time, the robot behavior level defines the abstractions to be free from implementation specifics such that the robot behaviors are substantially generic to all robots.

Figure 8:
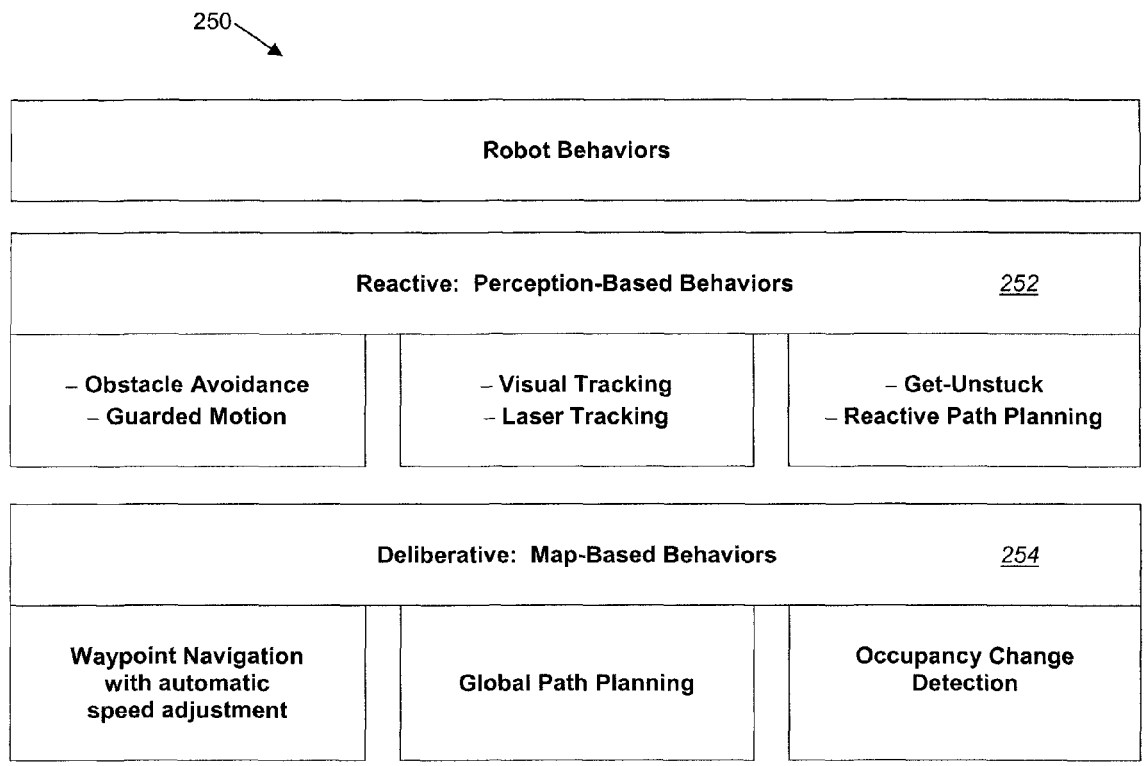
FIG. 8 illustrates representative robot behavioral components that may be available on robot platforms.

The robot behavior level 250, as illustrated in FIG. 8, may be loosely separated into reactive behaviors 252 and deliberative behaviors 254. Of course, it will be readily apparent to those of ordinary skill in the art that the modules shown in FIG. 8 are a representative, rather than comprehensive, example of robot behaviors.

The reactive behaviors 252 may be characterized as behaviors wherein the robot reacts to its perception of the environment based on robot attributes, hardware abstractions, or combinations thereof. Some of these reactive behaviors may include autonomous navigation, obstacle avoidance, guarded motion, visual tracking, laser tracking, get-unstuck behavior, and reactive planning. As examples, and not limitations, details regarding some of these behaviors are discussed in the section below regarding application specific behaviors.

In contrast, deliberative behaviors 254 may be characterized as behaviors wherein the robot may need to make decisions on how to proceed based on the results of the reactive behaviors, information from the robot attributes and hardware abstractions, or combinations thereof. Some of these deliberative behaviors may include waypoint navigation with automatic speed adjustment, global path planning, and occupancy change detection. As examples, and not limitations, details regarding some of these behaviors are discussed in the section below regarding application specific behaviors.

3.2. Cognitive Conduct

Figures 10A, 10B:
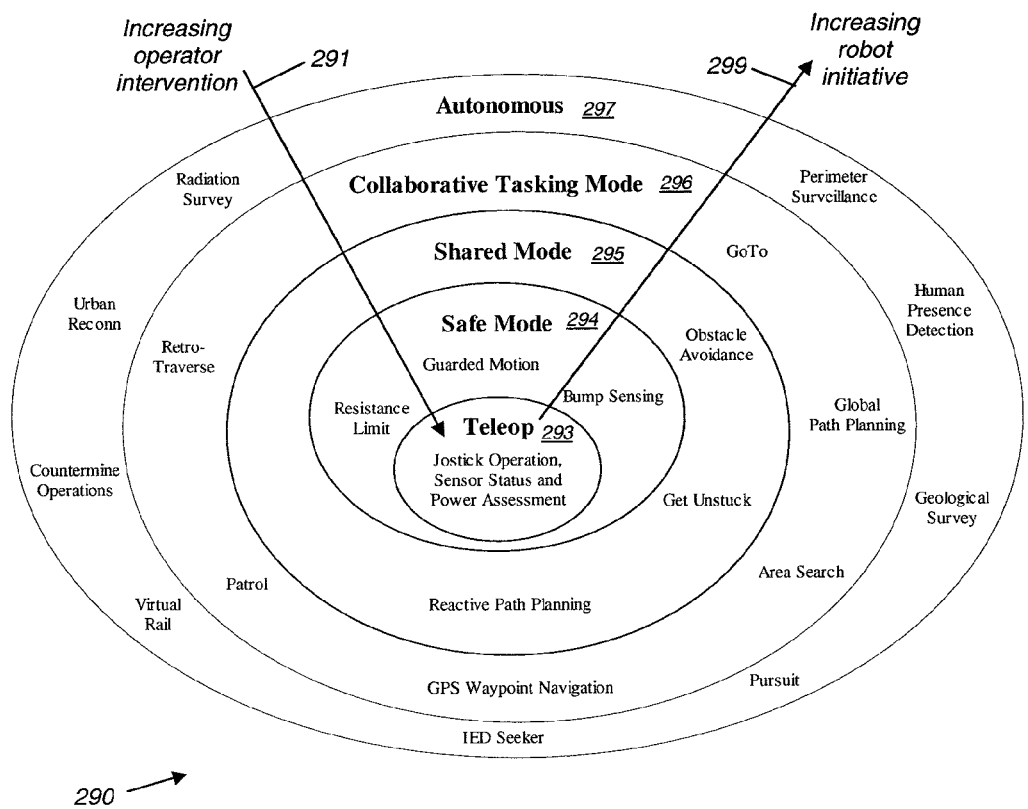
FIG. 10A illustrates how tasks may be allocated between an operator and a robot according to embodiments of the present invention.
FIG. 10B illustrates various cognitive conduct, robot behaviors, robot attributes, and hardware abstractions that may be available at different levels of robot autonomy.

The cognitive conduct level 270, as illustrated in FIG. 9, represents the highest level of abstraction, wherein significant robot intelligence may be built in to cognitive conduct modules, as well as significant operator-robot collaboration to perform complex tasks requiring enhanced robot initiative 299 (FIG. 10B). Cognitive conduct modules blend and orchestrate asynchronous firings from the reactive behaviors 252, deliberative behaviors 254, and robot attributes 230 into intelligent robot conduct. Cognitive conduct modules may include conduct such as GoTo 272, wherein the operator may simply give a coordinate for the robot to go to and the robot takes the initiative to plan a path and get to the specified location. This GoTo conduct 272 may include a combination of robot behaviors 250, robot attributes 230, and hardware abstractions 210, such as, for example, obstacle avoidance, get-unstuck, reactive path planning, deliberative path planning, and waypoint navigation.

Another representative cognitive conduct module is human detection and pursuit 274, wherein the robot may react to changes in the environment and pursue those changes. This human detection and pursuit conduct 274 may also include pursuit of other objects, such as, for example, another robot. The human detection and pursuit 274 conduct may include a combination of robot behaviors 250, robot attributes 230, and hardware abstractions 210, such as, for example, occupancy change detection, laser tracking, visual tracking, deliberative path planning, reactive path planning, and obstacle avoidance.

Other representative cognitive conduct modules include conducts such as exploration and reconnaissance conduct 276, combined with map building, leader/follower conduct 278, and search and identify conduct 280.

Of course, it will be readily apparent to those of ordinary skill in the art that the cognitive conduct modules shown in FIG. 9 are a representative, rather than a comprehensive example of robot conduct that may be implemented using embodiments of the present invention.

3.3. Timing and Behavior Adaptation

A notable aspect of the RIK is that the cognitive conduct level 270 and robot behaviors 250 generally operate from a perception of speed of motion in relationship to objects and obstacles. In other words, rather than being concerned with spatial horizons and the distance away from an object, the cognitive conduct 270 and robot behaviors 250 are largely concerned with temporal horizons and how soon the robot may encounter an object. This enables defining the cognitive conduct 270 and robot behaviors 250 in a relativistic sense wherein, for example, the modules interpret motion as an event horizon wherein the robot may only be concerned with obstacles inside the event horizon. For example, a robot behavior 250 is not necessarily concerned with an object that is 10 meters away. Rather, the robot behavior 250 may be concerned that it may reach the object in two seconds. Thus, the object may be within the event horizon when the object is 10 meters away and the robot is moving toward it at 5 meters/sec, whereas if the object is 10 meters away and the robot is moving at 2 meters/second, the object may not be within the event horizon.

This relativistic perception enables an adaptation to processing power and current task load. If the robot is very busy, for example processing video, it may need to reduce its frequency of processing each task. In other words, the amount of time to loop through all the cognitive conduct 270 and robot behaviors 250 may increase. However, with the RIK, the cognitive conduct 270 and robot behaviors 250 can adapt to this difference in frequency by modifying its behaviors. For example, if the time through a loop reduces from 200 Hz to 100 Hz, the behaviors and conducts will know about this change in loop frequency and may modify the way it makes a speed adjustment to avoid an object. For example, the robot may need a larger change in its speed of motion to account for the fact that the next opportunity to adjust the speed is twice more distant in the future at 100 Hz than it would be at 200 Hz. This becomes more apparent in the discussion below, regarding the guarded motion behavior.

To enable and control this temporal awareness, the RIK includes a global timing loop in which cognitive conduct 270 and robot behaviors 250 may operate. Using this global timing loop, each module can be made aware of information such as, for example, average time through a loop minimum and maximum time through a loop, and expected delay for next timing tick.

With this temporal awareness, the robot tends to modify its behavior by adjusting its motion, and motion of its manipulators, relative to its surroundings rather than adjusting its position relative to a distance to an object. Of course, with the wide array of perceptors, the robot is still very much aware of its pose and position relative to its environment and can modify its behavior based on this positional awareness. However, with the RIK, the temporal awareness is generally more influential on the cognitive conduct modules and robot behaviors than the positional awareness.

3.4. Dynamic Autonomy

To enhance the operator/robot tradeoff of control, the intelligence kernel provides a dynamic autonomy structure, which is a decomposition of autonomy levels, allowing methods for shared control to permeate all levels of the multi-level abstraction. Furthermore, the intelligence kernel creates an object-oriented software architecture, which may require little or no source code changes when ported to other platforms and low-level proprietary controllers.

The dynamic autonomy structure of the RIK provides a multi-level harmonization between human intervention and robot initiative 299 across robot behaviors. As capabilities and limitations change for both the human and the robot due to workload, operator expertise, communication dropout, and other factors, the RIK architecture enables shifts from one level of autonomy to another. Consequently, the ability of the robot to protect itself, make decisions, and accomplish tasks without human assistance may enable increased operator efficiency.

FIGS. 10A and 10B are depictions of a representative embodiment of a dynamic autonomy structure 290 illustrating different levels of interaction between operator intervention 291 and robot initiative 299. As referred to herein operator, or operator intervention 291, may include human operation via a remote computer in communication with the robot, remote operation by some other form of artificial intelligence operating on a remote computer in communication with the robot, or some combination thereof.

At the lowest level, referred to as teleoperation mode 293, the robot may operate completely under remote control and take no initiative to perform operations on its own. At the second level, referred to as safe mode 294, robot movement is dependent on manual control from a remote operator. However, in safe mode 294, the robot may be equipped with a level of initiative that prevents the operator from causing the robot to collide with obstacles. At the third level, referred to as shared mode 295, the robot can relieve the operator from the burden of direct control. For example, the robot may use reactive navigation to find a path based on the robot's perception of the environment. Shared mode 295 provides for a balanced allocation of roles and responsibilities. The robot accepts varying levels of operator intervention 291 and may support dialogue through the use of scripted suggestions (e.g., "Path blocked! Continue left or right?") and other text messages that may appear within a graphical interface. At the fourth level, referred to as collaborative tasking mode 296, a high level of collaborative tasking may be developed between the operator and the robot using a series of high-level tasks such as patrol, search region or follow path. In collaborative tasking mode 296, operator intervention 291 occurs on the tasking level, while the robot manages most decision-making and navigation. At the highest level, referred to as autonomous mode 297, a robot may behave in a substantially autonomous manner, needing nothing more than being enabled by an operator and perhaps given a very high level command such as, for example, "survey the area," or "search for humans."

FIG. 10A illustrates a representative embodiment of how tasks may be allocated between the operator and the robot. For example, teleoperation mode 293 may be configured such that the operator defines tasks, supervises direction, motivates motion, and prevents collision, in such a way that the robot takes no initiative and the operator maintains control. In safe mode 294, the operator may still define tasks, supervise direction, and motivate motion, while allowing the robot to take the initiative to prevent collisions. In shared mode 295, the operator may still define tasks and supervise direction, while allowing the robot to motivate motion and prevent collisions. In collaborative tasking mode 296, the robot may possess the initiative to prevent collisions, motivate motion, and supervise direction, while relinquishing operator intervention 291 to define task goals. In autonomous mode 297, the robot's initiative may prevent collisions, motivate motion, supervise direction, and define task goals. Of course, those of ordinary skill in the art will recognize that this allocation of tasks between the operator and the robot is a representative allocation. Many other tasks and behaviors, and allocation of those tasks and behaviors, are contemplated within the scope of the present invention.

FIG. 10B illustrates various cognitive conduct, robot behaviors, robot attributes, and hardware abstractions that may be available at different levels of robot autonomy. In general, moving from the teleoperation mode 293 toward the autonomous mode 297 represents an increase in the amount of robot initiative 299 and a decrease in the amount of operator intervention 291. Conversely, moving from the autonomous mode 297 toward the teleoperation mode 293 represents a decrease in the amount of robot initiative 299 and an increase in the amount of operator intervention 291. Of course, those of ordinary skill in the art will recognize that FIG. 10B is a representative sample of available conduct, behaviors, attributes, and hardware, as well as a representative allocation between autonomy levels. The RIK is configured such that many modules may operate across different levels of autonomy by modifying the amount of operator intervention 291, modifying the amount of robot initiative 299, or combinations thereof.

The autonomy levels are structured in the intelligence kernel such that each new level of autonomy is built on, and encompasses, the subsequent level. For example, a guarded motion mode processing (explained more fully below) may include the behavior and representational framework utilized by the teleoperation mode 293 processing, but also include additional levels of robot initiative 299 based on the various robot attributes (e.g., related to directional motion) created in response to the teleoperation mode 293. Shared mode 295 may include all of the functionality and direct control of safe mode 294, but also allows robot initiative 299 in response to the abstractions produced through the guarded motion mode processing (e.g., fused range abstractions created in response to the direction motion abstractions). In addition, the collaborative tasking mode 296 may initiate robot responses to the abstractions created in shared mode 295 processing such as recognition that a box canyon has been entered or that a communication link has been lost.

For a robotic system to gracefully accept a full spectrum of intervention possibilities, interaction issues cannot be handled merely as augmentations to a control system. Therefore, opportunities for operator intervention 291 and robot initiative 299 are incorporated as an integral part of the robot's intrinsic intelligence. Moreover, for autonomous capabilities to evolve, the RIK is configured such that a robot is able to recognize when help is needed from an operator, other robot, or combinations thereof and learn from these interactions.

As an example, in one representative embodiment, the robot includes a SONY® CCD camera that can pan, tilt and zoom to provide visual feedback to the operator in the teleoperation mode 293. The robot may also use this camera with increased robot initiative 299 to characterize the environment and even conduct object tracking.

In this embodiment, the RIK provides a graduated process for the robot to protect itself and the environment. To do so, the RIK may fuse a variety of range sensor information. A laser range finder may be mounted on the front, and sonar perceptors may be located around the mid-section of the robot. The robot also may include highly sensitive bump strips around its perimeter that register whether anything has been touched. To protect the top of the robot, especially the cameras and mission-specific sensors placed on top of the robot, infrared proximity sensors may be included to indicate when an object is less than a few inches from the robot. Additional infrared proximity sensors may be placed on the bottom of the robot and point ahead of the robot toward the ground in order to prevent the robot from traveling into open space (e.g., traveling off of a landing down a stairway). Together, these sensors provide a substantial field of protection around the robot and allow the operator to command the robot with increased confidence 50 that the robot can take initiative to protect itself or its environment.

However, avoiding obstacles may be insufficient. Many adverse environments may include forms of uneven terrain, such as rubble. The robot should be able to recognize and respond to these obstacles. Inertial sensors may be used to provide acceleration data in three dimensions. This inertial information may be fused with information from the wheel encoders giving velocity and acceleration of the wheels, and electrical current draw from the batteries, to produce a measure of "unexpected" resistance that may be encountered by the robot. As part of the dynamic autonomy, the operator may be able to choose to set a resistance limit that will automatically stop the robot once the specified threshold has been exceeded. The resistance limit may be useful not only for rough terrain, but also in situations when the operator needs to override the "safe motion" capabilities (based on the obstacle avoidance sensors) to do things like push chairs and boxes out of the way and push doors open.

In addition, the RIK enables operators to collaborate with mobile robots, by defining an appropriate level of discourse, including a shared vocabulary and a shared cognitive work space collaboratively constructed and updated on-the-fly through interaction with the real world. This cognitive work space could consist of terrain overlaid with semantic abstractions generated through autonomous recognition of environmental features with point-and-click operator validation and iconographic insertion of map entities. Real-time semantic maps constructed collaboratively by humans, ground robots and air vehicles could serve as the basis for a spectrum of mutual human-robot interactions including tasking, situation awareness, human-assisted perception and collaborative environmental "understanding." Thus, the RIK enables human-robot communication within the context of a mission based on shared semantic maps between the robotic system and the operator.

With reference to FIGS. 10A and 10B, additional details of the dynamic autonomy structure 290 and corresponding operation modes can be discussed.

3.4.1. Teleoperation Mode

In teleoperation mode 293, the operator has full, continuous control of the robot at a low level. The robot takes little or no initiative except, for example, to stop after a specified time if it recognizes that communications have failed. Because the robot takes little or no initiative in this mode, the dynamic autonomy implementation provides appropriate situation awareness to the operator using perceptual data fused from many different sensors. For example, a tilt sensor may provide data on whether the robot is in danger of overturning. Inertial effects and abnormal torque on the wheels (i.e., forces not associated with acceleration) are fused to produce a measure of resistance as when, for example, the robot is climbing over or pushing against an obstacle. Even in teleoperation mode 293, the operator may be able to choose to activate a resistance limit that permits the robot to respond to high resistance and bump sensors. Also, a specialized interface may provide the operator with abstracted auditory, graphical and textual representations of the environment and task.

Some representative behaviors and attributes that may be defined for teleoperation mode 293 include joystick operation, perceptor status, power assessment, and system status.

3.4.2. Safe Mode

In safe mode 294, the operator directs movements of the robot, but the robot takes initiative to protect itself. In doing so, this mode frees the operator to issue motion commands with less regard to protecting the robot, greatly accelerating the speed and confidence with which the operator can accomplish remote tasks. The robot may assess its own status and surrounding environment to decide whether commands are safe. For example, the robot possesses a substantial self-awareness of its position and will attempt to stop its motion before a collision, placing minimal limits on the operator. In addition, the robot may be configured to notify the operator of environmental features (e.g., box canyon, corner, and hallway), immediate obstacles, tilt, resistance, etc., and also continuously assesses the validity of its diverse sensor readings and communication capabilities. In safe mode 294, the robot may be configured to refuse to undertake a task if it does not have the ability (i.e., sufficient power or perceptual resources) to safely accomplish it.

Some representative behaviors and attributes that may be defined for safe mode 294 include guarded motion, resistance limits, and bump sensing.

3.4.3. Shared Mode

In shared mode 295, the robot may take the initiative to choose its own path, responds autonomously to the environment, and work to accomplish local objectives. This initiative is primarily reactive rather than deliberative. In terms of navigation, shared mode 295 may be configured such that the robot responds only to its local (e.g., a two second event horizon or a six meter radius), sensed environment. Although the robot may handle the low-level navigation and obstacle avoidance, the operator may supply intermittent input, often at the robot's request, to guide the robot in general directions. For example, a "Get-Unstuck" behavior enables the robot to autonomously extricate itself from highly cluttered areas that may be difficult for a remote operator to handle.

Some representative behaviors and attributes that may be defined for shared mode 295 include reactive planning, get-unstuck behavior, and obstacle avoidance.

3.4.4. Collaborative Tasking Mode

In collaborative tasking mode 296, the robot may perform tasks such as, for example, global path planning to select its own route, requiring no operator input except high-level tasking such as "follow that target" or "search this area" (perhaps specified by drawing a circle around a given area on the map created by the robot). For all these levels, the intelligence resides on the robot itself, such that off-board processing is unnecessary. To permit deployment within shielded structures, a customized communication protocol enables very low bandwidth communications to pass over a serial radio link only when needed. The system may use multiple and separate communications channels with the ability to reroute data when one or more connection is lost.

Some representative cognitive conduct and robot behaviors, and robot attributes that may be defined for collaborative tasking mode 296 include waypoint navigation, global path planning, go to behavior, retro-traverse behavior, area search behavior, and environment patrol.

3.4.5. Autonomous Mode

In autonomous mode 297, the robot may perform with minimal to no operator intervention 291. For behaviors in autonomous mode 297, the operator may simply give a command for the robot to perform. Other than reporting status to the operator, the robot may be free to plan paths, prioritize tasks, and carry out the command using deliberative behaviors defined by the robot's initiative.

Some representative behaviors and attributes that may be defined for autonomous mode 297 include pursuit behaviors, perimeter surveillance, urban reconnaissance, human presence detection, geological surveys, radiation surveys, virtual rail behavior, countermine operations, and seeking improvised explosive devices.

3.5. RIK Examples and Communication

Conventionally, robots have been designed as extensions of human mobility and senses. Most seek to keep the human in substantially complete control, allowing the operator, through input from video cameras and other on-board sensors, to guide the robot and view remote locations. In this conventional "master-slave" relationship, the operator provides the intelligence and the robot is a mere mobile platform to extend the operator's senses. The object is for the operator, perched, as it were, on the robot's back, to complete some desired tasks. As a result, conventional robot architectures may be limited by the need to maintain continuous, high-bandwidth communications links with their operators to supply clear, real-time video images and receive instructions.

Operators may find it difficult to visually navigate when conditions are smoky, dusty, poorly lit, completely dark or full of obstacles and when communications are lost because of distance or obstructions.

The Robot Intelligence Kernel enables a modification to the way humans and robots interact, from master-slave to a collaborative relationship in which the robot can assume varying degrees of autonomy. As the robot initiative 299 increases, the operator can turn his or her attention to the crucial tasks at hand (e.g., locating victims, hazards, dangerous materials; following suspects; measuring radiation and/or contaminant levels) without worrying about moment-to-moment navigation decisions or communications gaps.

The RIK places the intelligence required for high levels of autonomy within the robot. Unlike conventional designs, off-board processing is not necessary. Furthermore, the RIK includes low bandwidth communication protocols and can adapt to changing connectivity and bandwidth capabilities. By reducing or eliminating the need for high-bandwidth video feeds, the robot's real-world sensor information can be sent as compact data packets over low-bandwidth (<1 Kbs) communication links such as, for example, cell phone modems and long-range radio. The robot controller may then use these low bandwidth data packets to create a comprehensive graphical interface, similar to a computer game display, for monitoring and controlling the robot. Due to the low bandwidth needs enabled by the dynamic autonomy structure of the RIK, it may be possible to maintain communications between the robot and the operator over many miles and through thick concrete, canopy, and even the ground itself.

Figure 11:
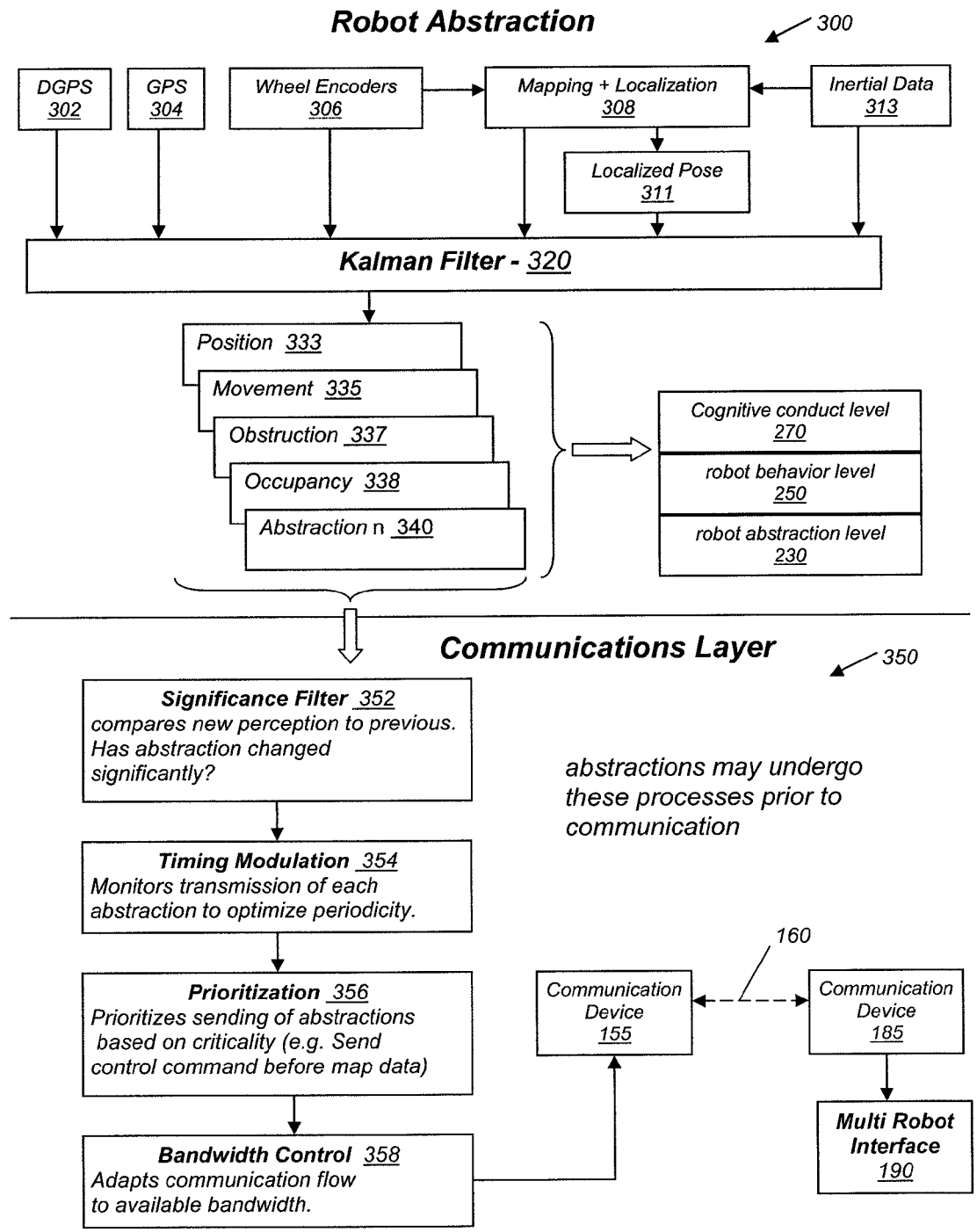
FIG. 11 illustrates a portion of representative processing that may occur in developing robot attributes and communicating those attributes.

FIG. 11 illustrates a representative embodiment of the RIK processing of robot abstractions 300 and communications layer 350 for communicating information about cognitive conduct, robot behaviors, robot attributes, and hardware abstractions to the robot controller or other robots. The upper portion 300 of FIG. 11 illustrates the robot abstractions, and hardware abstractions that may be fused to develop robot attributes. In the embodiment of FIG. 11, a differential GPS 302, a GPS 304, wheel encoders 306 and inertial data 313 comprise hardware abstractions that may be processed by a Kalman filter 320. The robot attributes for mapping and localization 308 and localized pose 311 may be developed by including information from, among other things, the wheel encoders 306 and inertial data 313. Furthermore, the localized pose 311 may be a function of the results from mapping and localization 308. As with the hardware abstractions, these robot attributes of mapping and localization 308 and localized pose 311 may be processed by a Kalman filter 320.

Kalman filters 320 are efficient recursive filters that can estimate the state of a dynamic system from a series of incomplete and noisy measurements. By way of example and not limitation, many of the perceptors used in the RIK include an emitter/sensor combination, such as, for example, an acoustic emitter and a microphone array as a sensor. These perceptors may exhibit different measurement characteristics depending on the relative pose of the emitter and target and how they interact with the environment. In addition, to one degree or another, the sensors may include noise characteristics relative to the measured values. In robotic applications, Kalman filters 320 may be used in many applications for improving the information available from perceptors. As one example of many applications, when tracking a target, information about the location, speed, and acceleration of the target may include significant corruption due to noise at any given instant of time. However, in dynamic systems that include movement, a Kalman filter 320 may exploit the dynamics of the target, which govern its time progression, to remove the effects of the noise and get a substantially accurate estimate of the target's dynamics. Thus, a Kalman filter 320 can use filtering to assist in estimating the target's location at the present time, as well as prediction to estimate a target's location at a future time.

As a result of the Kalman filtering, or after being processed by the Kalman filter 320, information from the hardware abstractions and robot attributes may be combined to develop other robot attributes. As examples, the robot attributes illustrated in FIG. 11 include position 333, movement 335, obstruction 337, occupancy 338, and other abstractions 340.

With the robot attributes developed, information from these robot attributes may be available for other modules within the RIK at the cognitive level 270, the robot behavior level 250, and the robot abstraction level 230.

In addition, information from these robot attributes may be processed by the RIK and communicated to the robot controller or other robots, as illustrated by the lower portion of FIG. 11. Processing information from the robot conduct, behavior, and attributes, as well as information from hardware abstractions serves to reduce the required bandwidth and latency such that the proper information may be communicated quickly and concisely. Processing steps performed by the RIK may include a significance filter 352, a timing module 354, prioritization 356, and bandwidth control 358.

The significance filter 352 may be used as a temporal filter to compare a time varying data stream from a given RIK module. By comparing current data to previous data, the current data may not need to be sent at all or may be compressed using conventional data compression techniques such as, for example, run length encoding and Huffman encoding. Another example would be imaging data, which may use data compression algorithms such as Joint Photographic Experts Group (JPEG) compression and Moving Picture Experts Group (MPEG) compression to significantly reduce the needed bandwidth to communicate the information.

The timing module 354 may be used to monitor information from each RIK module to optimize the periodicity at which it may be needed. Some information may require periodic updates at a faster rate than others. In other words, timing modulation may be used to customize the periodicity of transmissions of different types of information based on how important it may be to receive high frequency updates for that information. For example, it may be more important to notify an operator, or other robot, of the robot's position more often than it would be to update the occupancy grid map 390 (FIG. 7).

The prioritization 356 operation may be used to determine which information to send ahead of other information based on how important it may be to minimize latency from when data is available to when it is received by an operator or another robot. For example, it may be more important to reduce latency on control commands and control queries relative to map data. As another example, in some cognitive conduct modules where there may be significant collaboration between the robot and an operator, or in teleoperation mode where the operator is in control, it may be important to minimize the latency of video information so that the operator does not perceive a significant time delay between what the robot is perceiving and when it is presented to the operator.

These examples illustrate that for prioritization 356, as well as the significance filter 352, the timing modulation 354, and the bandwidth control 358, communication may be task dependent and autonomy mode dependent. As a result, information that may be a high priority in one autonomy mode may receive a lower priority in another autonomy mode.

The bandwidth control operation may be used to limit bandwidth based on the communication channel's bandwidth and how much of that bandwidth may be allocated to the robot. An example here might include progressive JPEG wherein a less detailed (i.e., coarser) version of an image may be transmitted if limited bandwidth is available. For video, an example may be to transmit at a lower frame rate.

After the communication processing is complete, the resultant information may be communicated to, or from, the robot controller, or another robot. For example, the information may be sent from the robot's communication device 155, across the communication link 160, to a communication device 185 on a robot controller, which includes a multi-robot interface 190.

Figure 12:
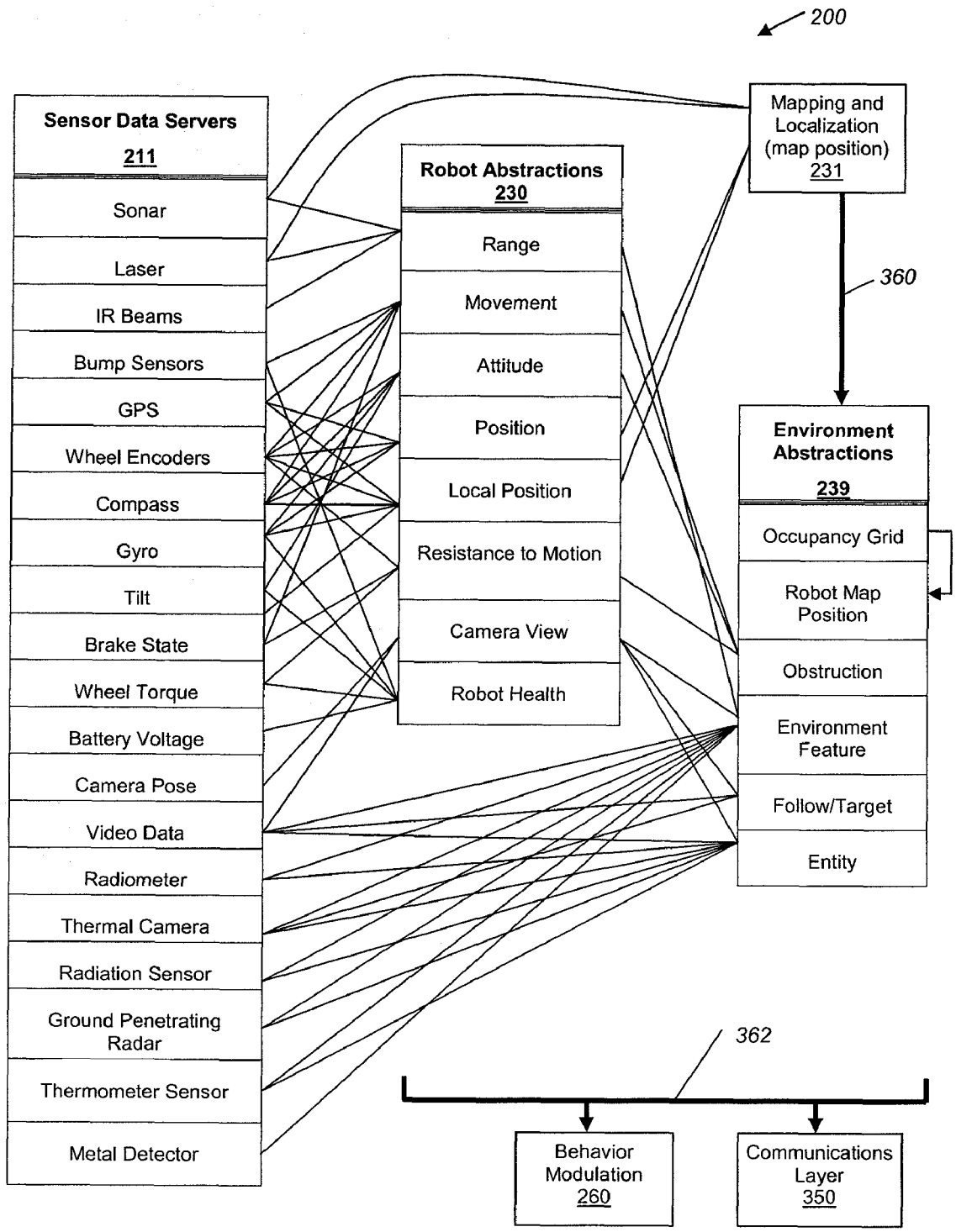
FIG. 12 illustrates a representative example of communication paths between various hardware abstraction, robot abstraction, and environment abstractions.
Figure 13:
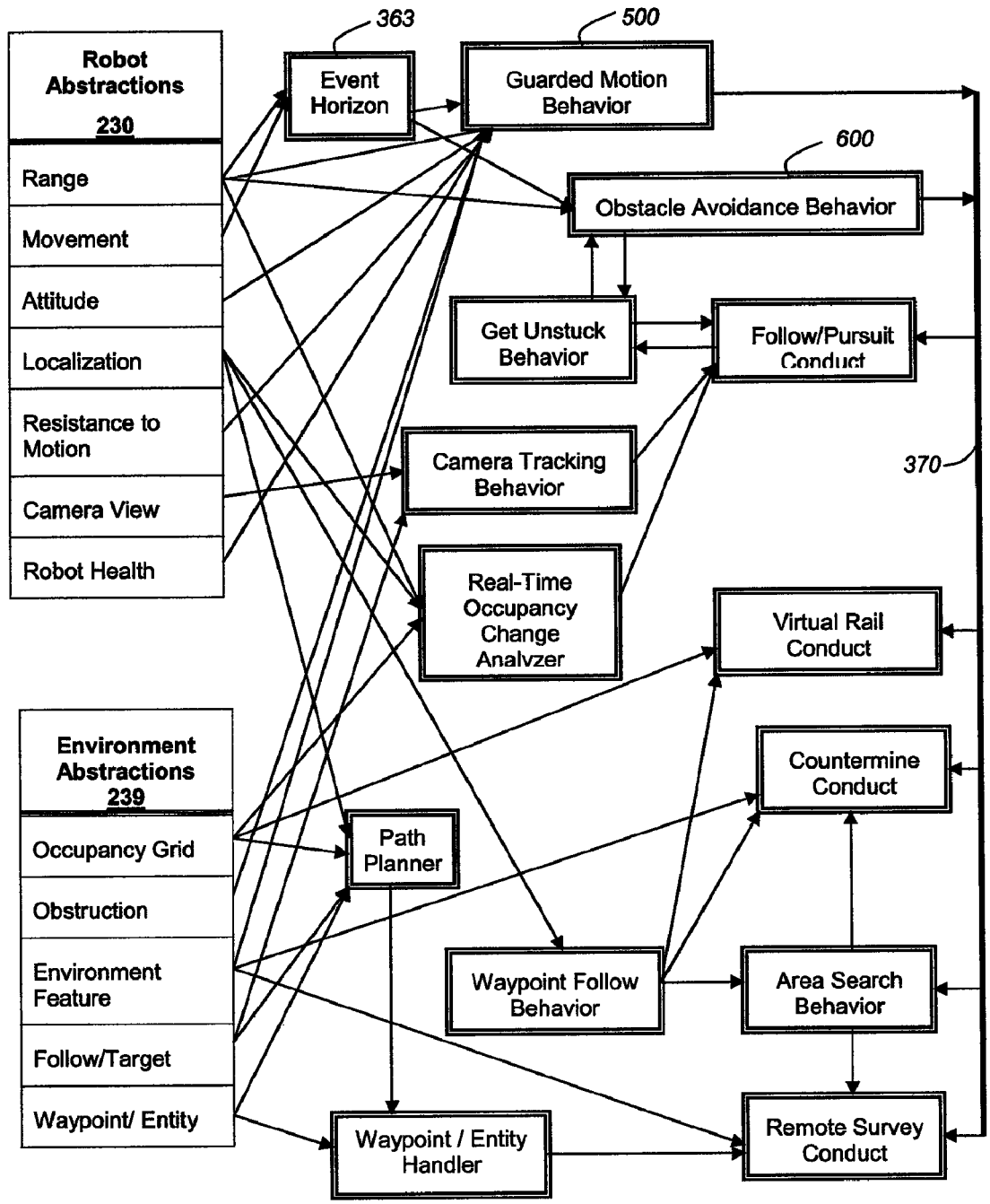
FIG. 13 illustrates a representative example of communication paths between robot abstractions, environment abstractions, robot behaviors, and robot conduct.

FIGS. 12 and 13 illustrate a more general interaction between hardware abstractions, robot abstractions, environment abstractions, robot behaviors, and robot conduct. FIG. 12 illustrates a diagram 200 of general communication between the hardware abstractions associated with sensor data servers 211 (also referred to as hardware abstractions), the robot abstractions 230 (also referred to as robot attributes), and environment abstractions 239. Those of ordinary skill in the art will recognize that FIG. 12 is intended to show general interactions between abstractions in a representative embodiment and is not intended to show every interaction possible within the GRA and RIK. Furthermore, it is not necessary to discuss every line between every module. Some example interactions are discussed to show general issues involved and describe some items from FIG. 12 that may not be readily apparent from simply examining the drawing. Generally, the robot abstractions 230 may receive and fuse information from a variety of sensor data servers 211. For example, in forming a general abstraction about the robot's current movement attributes, the movement abstraction may include information from bump sensors, GPS sensors, wheel encoders, compass sensors, gyroscopic sensors, tilt sensors, and the current brake state.

Some robot attributes 230, such as the mapping and localization attribute 231 may use information from a variety of hardware abstractions 210 as well as other robot attributes 230. The mapping and localization attribute 231 may use sonar and laser information from hardware abstractions 210 together with position information and local position information to assist in defining maps of the environment, and the position of the robot on those maps. Line 360 is bold to indicate that the mapping and localization attribute 231 may be used by any or all of the environment abstractions 239. For example, the occupancy grid abstraction uses information from the mapping and localization attribute 231 to build an occupancy grid as is explained, among other places, above with respect to FIG. 7. Additionally, the robot map position attribute may use the mapping and localization attribute 231 and the occupancy grid attribute to determine the robot's current position within the occupancy grid.

Bold line 362 indicates that any or all of the robot abstractions 230 and environment abstractions 239 may be used at higher levels of the RIK such as the communications layer 350, explained above with respect to FIG. 11, and the behavior modulation 260, explained below with respect to FIG. 13.

FIG. 13 illustrates general communication between the robot abstractions 230 and environment abstractions 239 with higher level robot behaviors and cognitive conduct. As with FIG. 12, those of ordinary skill in the art will recognize that FIG. 13 is intended to show general interactions between abstractions, behaviors, and conduct in a representative embodiment and is not intended to show every interaction possible within the GRA and RIK. Furthermore, it is not necessary to discuss every line between every module. Some example interactions are discussed to show general issues involved and describe some items from FIG. 13 that may not be readily apparent from simply examining the drawing.

As an example, the event horizon attribute 363 may utilize and fuse information from robot abstraction level 230 such as range and movement. Information from the event horizon attribute 363 may be used by behaviors, such as, for example, the guarded motion behavior 500 and the obstacle avoidance behavior 600. Bold line 370 illustrates that the guarded motion behavior 500 and the obstacle avoidance behavior 600 may be used by a variety of other robot behaviors and cognitive conduct, such as, for example, follow/pursuit conduct, virtual rail conduct, countermine conduct, area search behavior, and remote survey conduct.

4. Representative Behaviors and Conduct

The descriptions in this section illustrate representative embodiments of robot behaviors and cognitive conduct that may be included in embodiments of the present invention. Of course, those of ordinary skill in the art will recognize these robot behaviors and cognitive conduct are illustrative embodiments and are not intended to be a complete list or complete description of the robot behaviors and cognitive conduct that may be implemented in embodiments of the present invention.

In general, in the flow diagrams illustrated herein, T indicates an angular velocity of either the robot or a manipulator and V indicates a linear velocity. Also, generally, T and V are indicated as a percentage of a predetermined maximum. Thus V=20% indicates 20% of the presently specified maximum velocity (which may be modified depending on the situation) of the robot or manipulator. Similarly, T=20% indicates 20% of the presently specified maximum angular velocity of the robot or manipulator. It will be understood that the presently specified maximums may be modified over time depending on the situations encountered. In addition, those of ordinary skill in the art will recognize that the values of linear and angular velocities used for the robot behaviors and cognitive conduct described herein are representative of a specific embodiment. While this specific embodiment may be useful in a wide variety of robot platform configurations, other linear and angular velocities are contemplated within the scope of the present invention.

Furthermore, those of ordinary skill in the art will recognize that the use of velocities, rather than absolute directions, is enabled largely by the temporal awareness of the robot behaviors and cognitive conduct in combination with the global timing loop. This gives the robot behaviors and cognitive conduct an opportunity to adjust velocities on each timing loop, enabling smoother accelerations and decelerations. Furthermore, the temporal awareness creates a behavior of constantly moving toward a target in a relative sense, rather than attempting to move toward an absolute spatial point.

4.1. Autonomous Navigation

Autonomous navigation may be a significant component for many mobile autonomous robot applications. Using autonomous navigation, a robot may effectively handle the task of traversing varied terrain while responding to positive and negative obstacles, uneven terrain, and other hazards. Embodiments of the present invention enable the basic intelligence necessary to allow a broad range of robotic vehicles to navigate effectively both indoors and outdoors.

Many proposed autonomous navigation systems simply provide GPS waypoint navigation. However, GPS can be jammed and may be unavailable indoors or under forest canopy. A more autonomous navigation system includes the intrinsic intelligence to handle navigation even when external assistance (including GPS and communications) has been lost. Embodiments of the present invention include a portable, domain-general autonomous navigation system, which blends the responsiveness of reactive, sensor based control with the cognitive approach found through waypoint following and path planning. Through its use of the perceptual abstractions within the robot attributes of the GRA, the autonomous navigation system can be used with a diverse range of available sensors (e.g., range, inertial, attitude, bump) and available positioning systems (e.g., GPS, laser, RF, etc.).

The autonomous navigation capability may scale automatically to different operational speeds, may be configured easily for different perceptor suites and may be easily parameterized to be portable across different robot geometries and locomotion devices. Two notable aspects of autonomous navigation are a guarded motion behavior wherein the robot may gracefully adjust its speed and direction near obstacles without needing to come to a full stop and an obstacle avoidance behavior wherein the robot may successfully navigate around known obstacles in its environment. Guarded motion and obstacle avoidance may work in synergy to create an autonomous navigation capability that adapts to the robot's currently perceived environment. Moreover, the behavior structure that governs autonomous navigation allows the entire assembly of behaviors to be used not only for obstacles but for other aspects of the environment, which require careful maneuvering such as landmine detection.

The robot's obstacle avoidance and navigation behaviors are derived from a number of robot attributes that enable the robot to avoid collisions and find paths through dense obstacles. The reactive behaviors may be configured as nested decision trees comprising rules which "fire" based on combinations of these perceptual abstractions.

The first level of behaviors, which may be referred to as action primitives, provide the basic capabilities important to most robot activity. The behavior framework enables these primitives to be coupled and orchestrated to produce more complex navigational behaviors. In other words, combining action primitives may involve switching from one behavior to another, subsuming the outputs of another behavior or layering multiple behaviors. For example, when encountering a dense field of obstacles that constrain motion in several directions, the standard confluence of obstacle avoidance behaviors may give way to the high level navigational behavior "Get-Unstuck," as is explained more fully below. This behavior involves rules which, when activated in response to combinations of perceptual abstractions, switch between several lower level behaviors including "Turn-till-head-is-clear" and "Backout."

4.1.1. Guarded Motion Behavior

Figure 14:
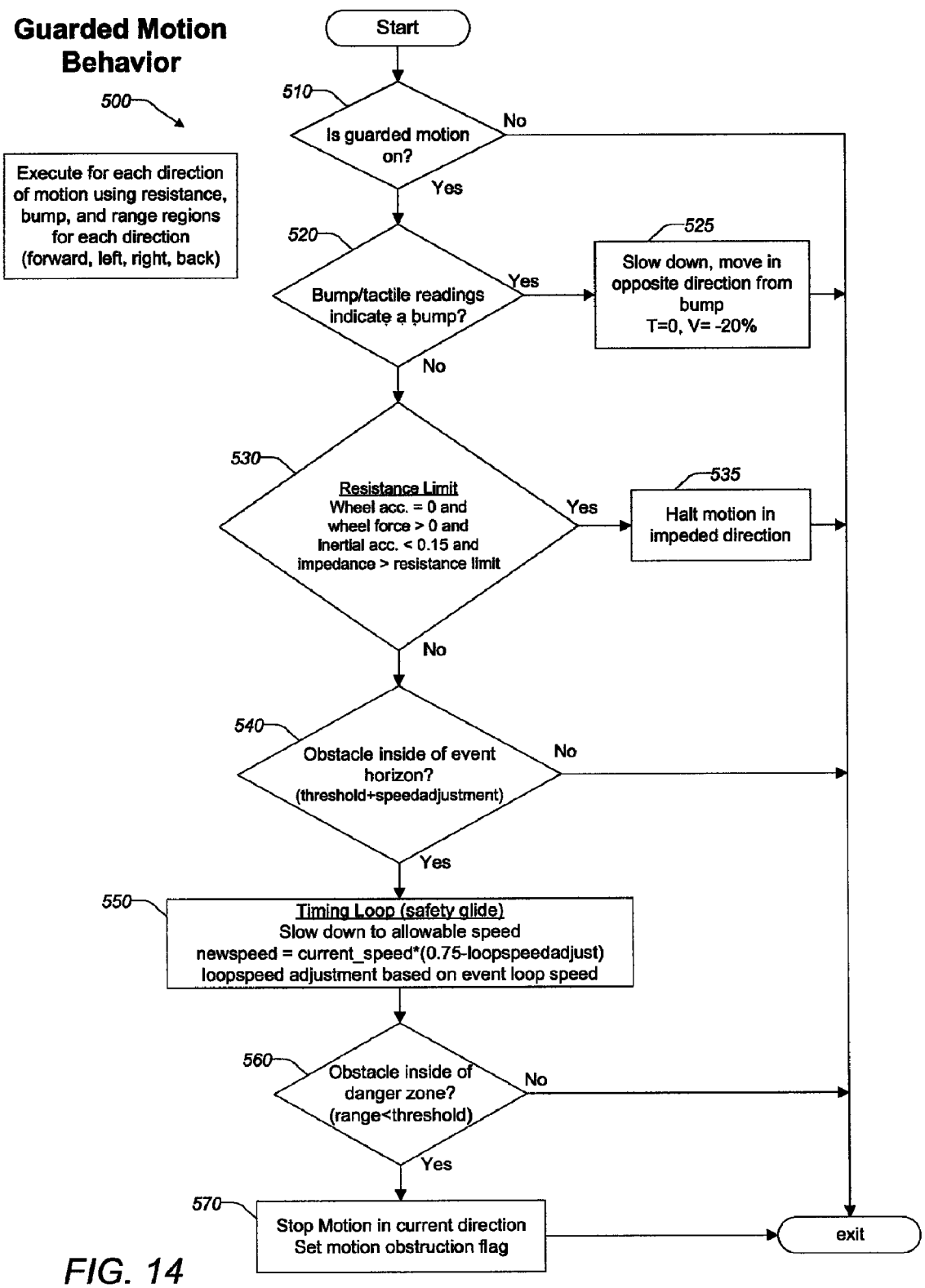
FIG. 14 is a software flow diagram illustrating components of an algorithm for performing a guarded motion behavior.

FIG. 14 is a software flow diagram illustrating components of an algorithm for the guarded motion behavior 500 according to embodiments of the present invention. Guarded motion may fuse information from a variety of robot attributes and hardware abstractions, such as, for example, motion attributes, range attributes, and bump abstractions. The guarded motion behavior 500 uses these attributes and abstractions in each direction (i.e., front, left, right, and back) around the robot to determine the distance to obstacles in all directions around the robot.

The need for guarded motion has been well documented in the literature regarding unmanned ground vehicles. A goal of guarded motion is for the robot to be able to drive at high speeds, either in response to the operator or software directed control through one of the other robot behaviors or cognitive conduct modules, while maintaining a safe distance between the vehicle and obstacles in its path. The conventional approach usually involves calculating this safe distance as a product of the robot's speed. However, this means that the deceleration and the distance from the obstacle at which the robot will actually stop may vary based on the low-level controller responsiveness of the low-level locomotor controls and the physical attributes of the robot itself (e.g., wheels, weight, etc.). This variation in stopping speed and distance may contribute to confusion on the part of the operator who may perceive inconsistency in the behavior of the robot.

The guarded motion behavior according to embodiments of the present invention enables the robot to come to a stop at a substantially precise, specified distance from an obstacle regardless of the robot's initial speed, its physical characteristics, and the responsiveness of the low-level locomotor control schema. As a result, the robot can take initiative to avoid collisions in a safe and consistent manner.

In general, the guarded motion behavior uses range sensing (e.g., from laser, sonar, infrared, or combinations thereof) of nearby obstacles to scale down its speed using an event horizon calculation. The event horizon determines the maximum speed the robot can safely travel and still come to a stop, if needed, at a specified distance from the obstacle. By scaling down the speed by many small increments, perhaps hundreds of times per second, it is possible to ensure that regardless of the commanded translational or rotational velocity, guarded motion will stop the robot at substantially the same distance from an obstacle. As an example, if the robot is being driven near an obstacle rather than directly towards it, guarded motion will not stop the robot, but may slow its speed according to the event horizon calculation. This improves the operator's ability to traverse cluttered areas and limits the potential for operators to be frustrated by robot initiative.

The guarded motion algorithm is generally described for one direction, however, in actuality it is executed for each direction. In addition, it should be emphasized that the process shown in FIG. 14 operates within the RIK framework of the global timing loop. Therefore, the guarded motion behavior 500 is re-entered, and executes again, for each timing loop.

To begin, decision block 510 determines if guarded motion is enabled. If not, control transitions to the end of the guarded motion behavior.

If guarded motion is enabled, control transfers to decision block 520 to test whether sensors indicate that the robot may have bumped into an obstacle. The robot may include tactile type sensors that detect contact with obstacles. If these sensors are present, their hardware abstractions may be queried to determine if they sense any contact. If a bump is sensed, it is too late to perform guarded motion. As a result, operation block 525 causes the robot to move in a direction opposite to the bump at a reduced speed that is 20% of a predefined maximum speed without turning, and then exits. This motion is indicated in operation block 525 as no turn (i.e., T=0) and a speed in the opposite direction (i.e., V=−20%).

If no bump is detected, control transfers to decision block 530 where a resistance limit determination is performed. This resistance limit measures impedance to motion that may be incongruous with normal unimpeded motion. In this representative embodiment, the resistance limit evaluates true if the wheel acceleration equals zero, the force on the wheels is greater than zero, the robot has an inertial acceleration that is less than 0.15, and the resulting impedance to motion is greater than a predefined resistance limit. If this resistance limit evaluation is true, operation block 535 halts motion in the impeded direction, then exits. Of course, those of ordinary skill in the art will recognize that this is a specific implementation for an embodiment with wheels and a specific inertial acceleration threshold. Other embodiments, within the scope of the present invention, may include different sensors and thresholds to determine if motion is being impeded in any given direction based on that embodiment's physical configuration and method of locomotion.

If motion is not being impeded, control transfers to decision block 540 to determine if any obstacles are within an event horizon. An event horizon is calculated as a predetermined temporal threshold plus a speed adjustment. In other words, obstacles inside of the event horizon are obstacles that the robot may collide with at the present speed and direction. Once again, this calculation is performed in all directions around the robot. As a result, even if an obstacle is not directly in the robot's current path, which may include translational and rotational movement, it may be close enough to create a potential for a collision. As a result, the event horizon calculation may be used to decide whether the robot's current rotational and translational velocity will allow the robot time to stop before encroaching the predetermined threshold distance. If there are no objects sensed within the event horizon, there is no need to modify the robot's current motion and the algorithm exits.

If an obstacle is sensed within the event horizon, operation block 550 begins a "safety glide" as part of the overall timing loop to reduce the robot's speed. As the robot's speed is reduced, the event horizon, proportional to that of the speed, is reduced. If the reduction is sufficient, the next time through the timing loop the obstacle may no longer be within the event horizon even though it may be closer to the robot. This combination of the event horizon and timing loop enables smooth deceleration because each loop iteration where the event horizon calculation exceeds the safety threshold, the speed of the robot (either translational, rotational, or both) may be curtailed by a small percentage. This enables a smooth slow down and also enables the robot to proceed at the fastest speed that is safe. The new speed may be determined as a combination of the current speed and a loop speed adjustment. For example and not limitation, New_speed=current_speed* (0.75−loop_speed_adjust). The loop_speed_adjust variable may be modified to compensate for how often the timing loop is executed and the desired maximum rate of deceleration. Of course, those of ordinary skill in the art will recognize that this is a specific implementation. While this implementation may encompass a large array of robot configurations, other embodiments within the scope of the present invention may include different scale factors for determining the new speed based on a robot's tasks, locomotion methods, physical attributes, and the like.

Next, decision block 560 determines whether an obstacle is within a danger zone. This may include a spatial measurement wherein the range to the obstacle in a given direction is less than a predetermined threshold. If not, there are likely no obstacles in the danger zone and the process exits.

If an obstacle is detected in the danger zone, operation block 570 stops motion in the current direction and sets a flag indicating a motion obstruction, which may be used by other attributes, behaviors or conduct.

As mentioned earlier, the guarded motion behavior 500 operates on a global timing loop. Consequently, the guarded motion behavior 500 will be re-entered and the process repeated on the next time tick of the global timing loop.

4.1.2. Obstacle Avoidance Behavior

Figure 15:
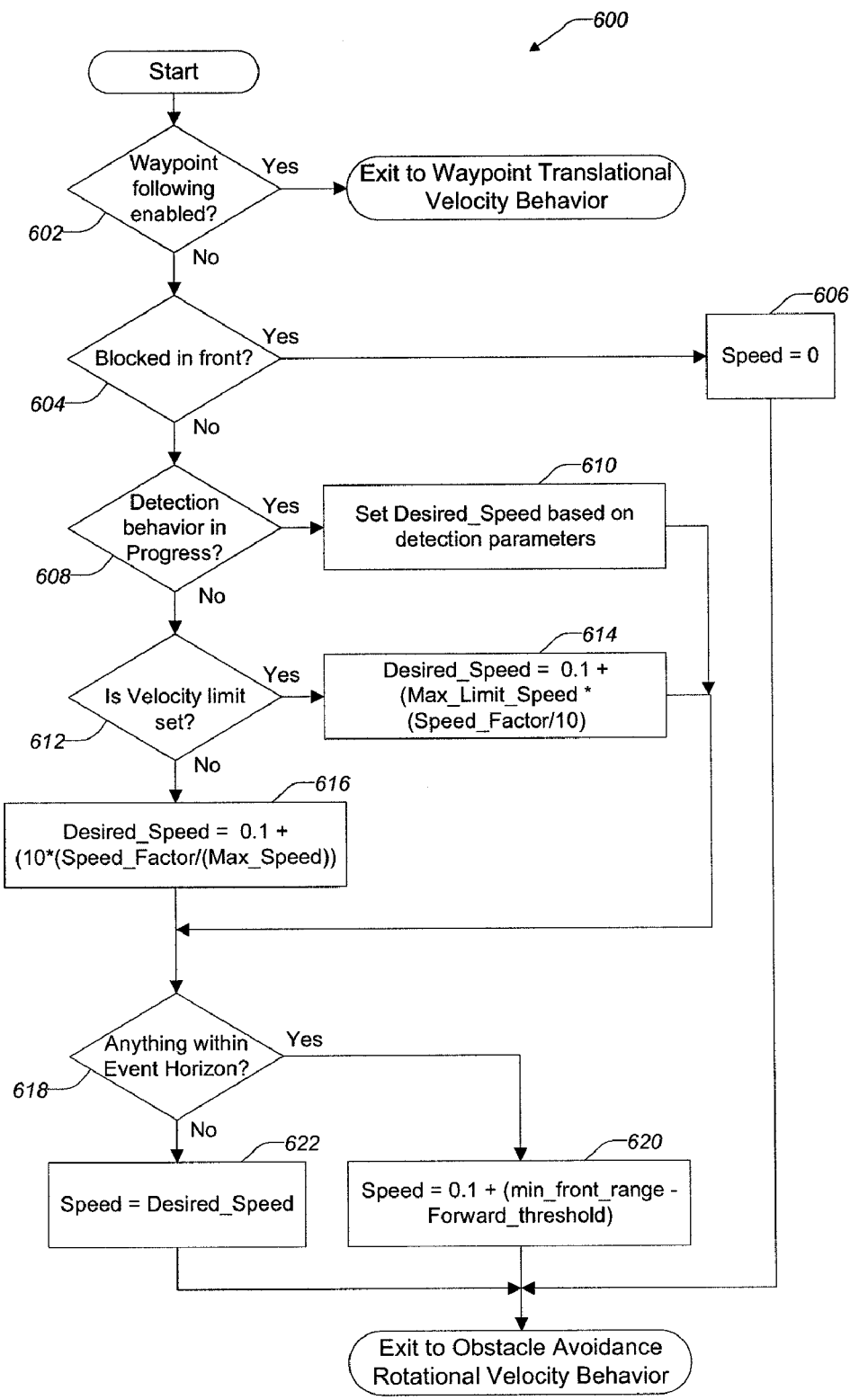
FIG. 15 is a software flow diagram illustrating components of an algorithm for performing translational portions of an obstacle avoidance behavior.
Figure 16:
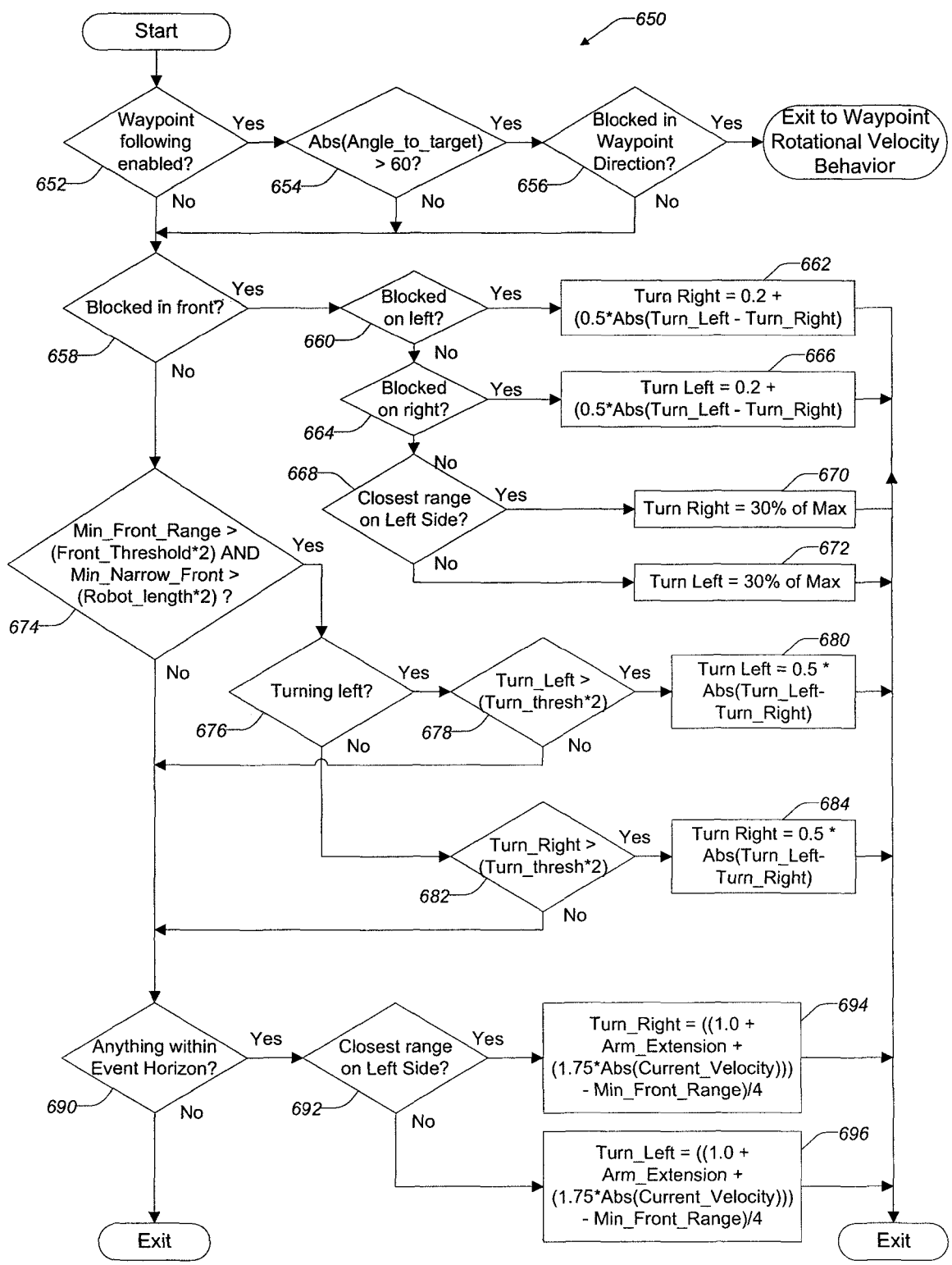
FIG. 16 is a software flow diagram illustrating components of an algorithm for performing rotational portions of the obstacle avoidance behavior.

FIG. 15 is a software flow diagram illustrating components of an algorithm for the obstacle avoidance behavior 600 that governs translational velocity of the robot according to embodiments of the present invention. Similarly, FIG. 16 is a software flow diagram illustrating components of an algorithm for the obstacle voidance behavior that governs rotational velocity 650 of the robot. Obstacle avoidance may fuse information from a variety of robot attributes and hardware abstractions, such as, for example, motion attributes, range attributes, and bump abstractions. In addition, the obstacle avoidance behavior may use information from other robot behaviors such as, for example, the guarded motion behavior and a get-unstuck behavior. The obstacle avoidance behavior uses these attributes, abstractions, and behaviors to determine a translational velocity and a rotational velocity for the robot such that it can safely avoid known obstacles.

In general, the obstacle avoidance behavior uses range sensing (e.g., from laser, sonar, infrared, or combinations thereof) of nearby obstacles to adapt its translational velocity and rotation velocity using the event horizon determinations explained earlier with respect to the guarded motion behavior. As stated earlier, the obstacle avoidance behavior works with the guarded motion behavior as building blocks for full autonomous navigation. In addition, it should be emphasized that the processes shown in FIGS. 15 and 16 operate within the RIK framework of the global timing loop. Therefore, the obstacle avoidance behavior is re-entered, and executes again, for each timing loop.

To begin the translational velocity portion of FIG. 15, decision block 602 determines if waypoint following is enabled. If so, control transfers out of the obstacle avoidance behavior to a waypoint following behavior, which is explained more fully below.

If waypoint following is not enabled, control transfers to decision block 604 to first test to see if the robot is blocked directly in front. If so, control transfers to operation block 606 to set the robot's translational speed to zero. Then, control transfers out of the translational velocity behavior and into the rotational velocity behavior so the robot can attempt to turn around the object. This test at decision block 604 checks for objects directly in front of the robot. To reiterate, the obstacle avoidance behavior, like most behaviors and conducts in the RIK, is temporally based. In other words, the robot is most aware of its velocity and whether objects are within an event horizon related to time until it may encounter an object. In the case of being blocked in front, the robot may not be able to gracefully slow down through the guarded motion behavior. Perhaps because the object simply appeared in front of the robot, without an opportunity to follow typical slow down procedures that may be used if an object is within an event horizon. For example, the object may be another robot or a human that has quickly moved in front of the robot so that the guarded motion behavior has not had an opportunity to be effective.

If nothing is blocking the robot in front, decision block 608 tests to see if a detection behavior is in progress. A detection behavior may be a behavior where the robot is using a sensor in an attempt to find something. For example, the countermine conduct is a detection behavior that is searching for landmines. In these types of detection behaviors, obstacle avoidance may want to approach much closer to objects, or may want to approach objects with a much slower speed to allow time for the detection function to operate. Thus, if a detection behavior is active, operation block 610 sets a desired speed variable based on detection parameters that may be important. By way of example and not limitation, in the case of the countermine conduct this desired speed may be set as: Desired_Speed=Max_passover_rate−(Scan_amplitude/Scan_Speed). In this countermine conduct example, the Max_passover_rate may indicate a maximum desired speed for passing over the landmine. This speed may be reduced by other factors. For example, the (Scan_amplitude/ Scan_Speed) term reduces the desired speed based on a factor of how fast the mine sensor sweeps an area. Thus, the Scan_ amplitude term defines a term of the extent of the scan sweep and the Scan_Speed defines the rate at which the scan happens. For example, with a large Scan_amplitude and a small Scan_Speed, the Desired_Speed will be reduced significantly relative to the Max_passover_rate to generate a slow speed for performing the scan. While countermine conduct is used as an example of a detection behavior, those of ordinary skill in the art will recognize that embodiments of the present invention may include a wide variety of detection behaviors, such as, for example, radiation detection, chemical detection, and the like.

If a detection behavior is not in progress, decision block 612 tests to see if a velocity limit is set. In some embodiments of the invention, it may be possible for the operator to set a velocity limit that the robot should not exceed, even if the robot believes it may be able to safely go faster. For example, if the operator is performing a detailed visual search, the robot may be performing autonomous navigation, while the operator is controlling a camera. The operator may wish to keep the robot going slow to have time to perform the visual search.

If a velocity limit is set, operation block 614 sets the desired speed variable relative to the velocity limit. The equation illustrated in operation block 614 is a representative equation that may be used. The 0.1 term is a term used to ensure that the robot continues to make very slow progress, which may be useful to many of the robot attributes, behaviors, and conduct. In this equation, the Speed_Factor term is a number from one to ten, which may be set by other software modules, for example the guarded motion behavior, to indicate a relative speed at which the robot should proceed. Thus, the desired speed is set as a fractional amount (between zero and one in 0.1 increments) of the Max_Limit_Speed.

If a velocity limit is not set, operation block 616 sets the desired speed variable relative to the maximum speed set for the robot (i.e., Max_Speed) with an equation similar to that for operation block 614 except Max_Speed is used rather than Max_Limit_Speed.

After the desired speed variable is set by operation block 610, 614, or 616, decision block 618 tests to see if anything is within the event horizon. This test may be based on the robot's physical dimensions, including protrusions from the robot such as an arm, relative to the robot's current speed. As an example using an arm extension, something inside the event horizon may be determined by the equation:

$$\text{Min\_Front\_Range} < 1.0 + \text{Arm\_Extension} + (1.75 * \text{Abs}(\text{Current\_Velocity}))$$

Where the Min_Front_Range indicates a range to an obstacle in front, 1.0 is a safety factor, Arm_Extension indicates the distance beyond the robot that the arm currently extends, and Current_Velocity indicates the robot's current translational velocity.

If there is something detected within the event horizon, operation block 620 sets the current speed based on the distance to the obstacle. Thus, the example equation in block 620 sets the speed based on the range to the object less a Forward_ Threshold set as a safety factor. With this speed, guarded motion has an opportunity to be effective and the speed may be reduced further on the next iteration of the timing loop if the object is still within the event horizon. After setting the speed, control transfers out of the translational velocity behavior, and into the rotational velocity behavior.

If there is nothing detected within the event horizon, operation block 622 sets the speed to the desired speed variable that was set previously by operation block 614, 616, or 618. After setting the speed, control transfers out of the translational velocity behavior, and into the rotational velocity behavior.

To begin the rotation velocity portion of FIG. 16, decision block 602 determines if waypoint following is enabled. If so, control transfers out of the obstacle avoidance behavior to a waypoint following behavior, which is explained more fully below.

If there is nothing detected within the event horizon, operation block 622 sets the robot's current speed to the desired speed variable that was set previously by operation block 614, 616, or 618. After setting the speed, control transfers out of the translational velocity behavior 600, and into the rotational velocity 650.

FIG. 16 illustrates a representative software flow diagram illustrating components of an algorithm for the obstacle voidance behavior that governs rotational velocity 650 of the robot. To begin the rotational velocity behavior of FIG. 16, decision block 652 determines if waypoint following is enabled. If so, control transfers to decision block 654 to determine if the angle to a target exceeds a predefined threshold. If so, decision block 656 determines if the robot is blocked in the waypoint direction. If so, the process exits to Waypoint Rotational Velocity Behavior.

At decision block 658, the process checks to see if the robot is blocked in front. If so, the process performs a series of checks to see where other obstacles may be to determine a desired rotational velocity and direction. This obstacle checking process begins with decision block 660 testing to see if the robot is blocked on the left side. If the robot is blocked on the left side, and also in front, operation block 662 sets a new value for a turn velocity to the right. In the representative embodiment illustrated in FIG. 16 a positive rotational velocity is defined as a turn to the left and a negative rotational velocity is defined as a turn to the right. Thus, generally, Turn_left is a positive value indicating a rotational velocity to the left and Turn_right is a negative value indicating a rotational velocity to the right. Thus, operation block 662 reduces the rotational velocity in the current direction by about one-half plus a small offset used to ensure that the rotational velocity does not reach zero. After setting the new rotation velocity, the process exits.

If the robot is not blocked on the left, decision block 664 tests to see if the robot is blocked on the right. If so, operation block 666 sets a new value for a turn velocity to the right similar to that velocity setting in operation block 662. In other words, set the rotational velocity to the left to about one-half plus a small offset used to ensure that the rotational velocity does not reach zero. After setting the new rotation velocity, the process exits.

If the robot is blocked in the front, but not on the left or right, the process then decides which way to turn to get around the blockage by checking to see whether the nearest obstacle in a measurable range is to the right or left and adjusting the rotational velocity to be away from the obstacle. Operation block 668 checks to see if the nearest obstacle is to the left. If so, operation block 670 sets the rotational velocity to the right (i.e., away from the obstacle) at a velocity of 30% of a maximum defined rotational velocity. If the nearest obstacle is not to the left, operation block 672 sets the rotational velocity to the left at a velocity of 30% of a maximum defined rotational velocity. After setting the new rotation velocity by either operation block 670 or 672, the process exits.

If the robot was not blocked in front, based on decision block 658, then decision block 674 performs a "threading the needle process." This starts with decision block 674 determining a range to obstacles that may still be in front of the robot but not directly blocking the robot. To do this, decision block 674 tests to see if Min_Front_Range is greater than two times a predefined threshold for the front direction, and to see if Min_Narrow_Front is greater than two times the robot's length. If both these tests are true, it may be relatively clear in front and the process decides to reduce the rotational velocity in the current direction to make the direction more straight ahead until the next global timing loop. Therefore, decision block 676 tests to see if the current rotational direction is left. If so, decision block 678 tests to see if the magnitude of the left rotational velocity is greater than twice a turn threshold. If so, operation block 680 reduces the rotational velocity in the left direction by one-half, and the process exits. If the current rotational direction is not left, decision block 682 tests to see if the magnitude of the right rotational velocity is greater than twice a turn threshold. If so, operation block 684 reduces the rotational velocity in the right direction by one-half, and the process exits.

If decision block 674, 678, or 682 evaluates false, decision block 690 tests to see if anything is currently within the event horizon.

This test may be based on the robot's physical dimensions, including protrusions from the robot such as an arm, relative to the robot's current speed. In addition, this test is likely the same as the event horizon described above for the translational velocity when discussing decision block 618 in FIG. 15. In other words, is the Minimum_Front_Range less that an Event_Range? Wherein the Event_Range=1.0+Arm_Extension+(1.75*Abs(Current_Velocity)).

If there is nothing within the event horizon (i.e., decision block 690 evaluates false), there is likely no need to change the current rotational velocity so the process exits. If there is something within the event horizon, but not within the threading the needle process or blocking the robot in front, the rotational velocity may be adjusted at a more gradual rate. Thus, if decision block 690 evaluates true, decision block 692 tests to see if the closest object is on the left side. If so, operation block 694 sets a new rotation velocity to the right. If the closest object is not on the left, operation block 696 sets a new rotation velocity to the left. The rotational velocity that is set in operation blocks 694 and 696 are similar except for direction. In this representative embodiment, the rotational velocity may be set as a function of the Event Range from the event horizon test of decision block 690. Thus, the rotational velocity may be set as:

(Event_Range−Min_Front_Range)/4.

After setting the rotational velocity in either operation block 694 or 696, the process exits.

As mentioned earlier, the obstacle avoidance behavior 600 operates on the global timing loop. Consequently, both the translational velocity and rotational velocity may be adjusted again on the next time tick of the global timing loop, allowing for relatively quick periodic adjustments to the velocities.

4.2. Get-Unstuck Behavior

Figure 17:
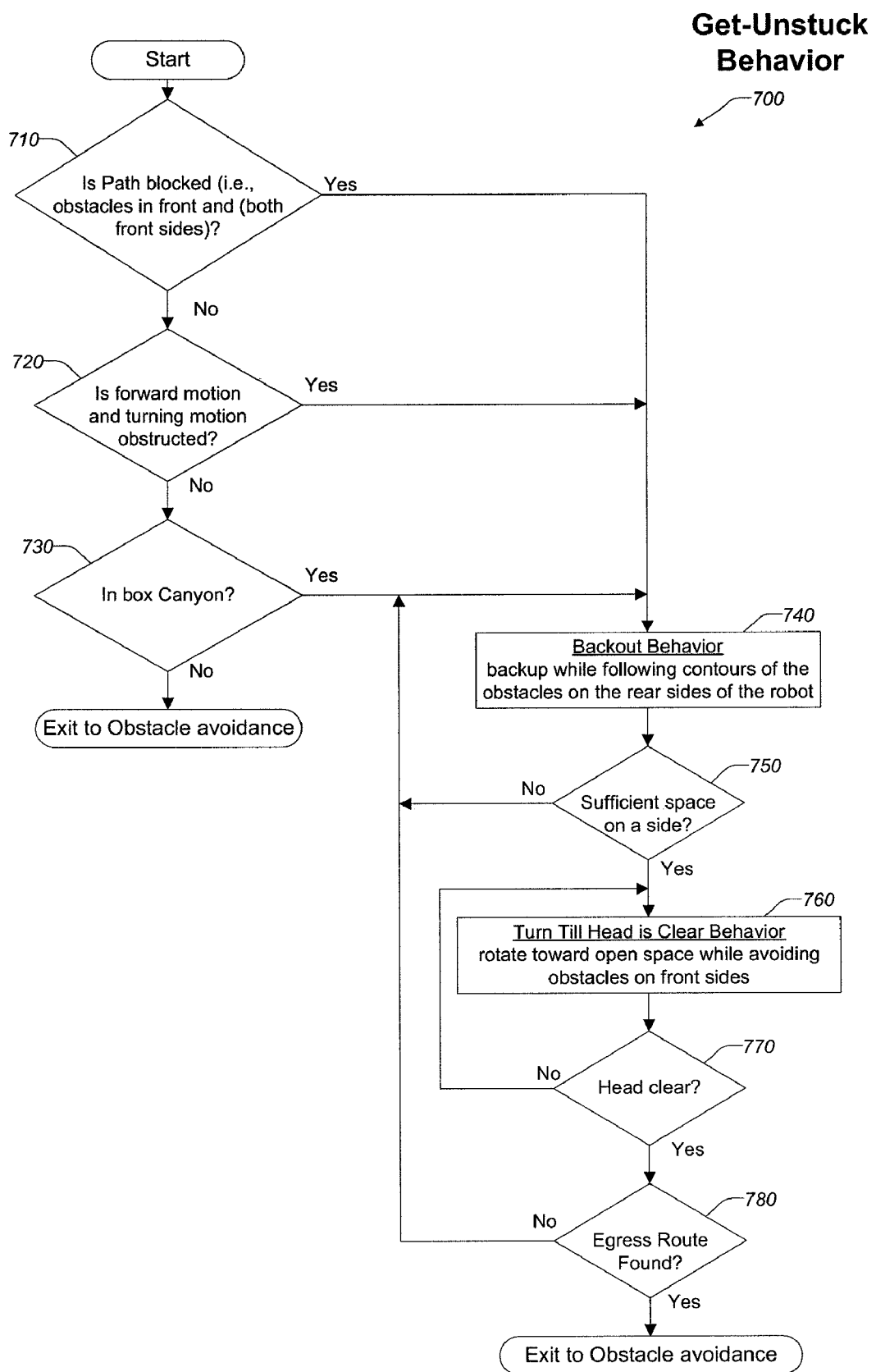
FIG. 17 is a software flow diagram illustrating components of an algorithm for performing a get-unstuck behavior.

A get-unstuck behavior 700, as illustrated in FIG. 17, includes significant robot initiative to extricate itself from the stuck position with little or no help from the operator. Sometimes, when a robot is operating under its own initiative, or even under operator control, the robot may get stuck and have difficulty getting free from that position. Often times, the operator may have limited understanding of the robot's position relative to the robot's understanding with its wide variety of perceptors. In general, the get-unstuck behavior 700 may use range sensing (e.g., from laser, sonar, infrared, or combinations thereof) to determine nearby obstacles and their position relative to the robot.

The get-unstuck behavior 700 begins at decision block 710 by determining if the current path is blocked. This blocked situation may be defined as an obstacle present in front, on the front-right side, and on the front-left side. If the path is blocked, control transfers to operation block 740, which is explained below. For an example, and using the range definitions defined above under the description of the range attribute, a blocked path may be defined by the Boolean equation:

```
Blocked =
((right_in_front < (robot->forward_thresh + 0.2)) ||
FRONT_BLOCKED) &&
(l_front < (robot->forward_thresh * 2)) &&
(r_front < (robot->forward_thresh * 2)) &&
(left_front < (robot->forward_thresh * 2)) &&
(right_front < (robot->forward_thresh * 2))
```

Wherein: (robot→forward_thresh) is a predetermined threshold parameter, that may be robot specific, to define a safety distance, or maneuverability distance, away from the robot.

If the path is not blocked, decision block 720 determines if forward motion and turning motion is obstructed. If motion is obstructed, control transfers to operation block 740, which is explained below. For an example, this motion obstruction may be determined by the Boolean equation:

```
Obstructed_motion =
(FR_LEFT_BLOCKED || R_RIGHT_BLOCKED) &&
(FR_RIGHT_BLOCKED || R_LEFT_BLOCKED) &&
FRONT_BLOCKED
```

If motion is not obstructed, decision block 730 determines if the robot is in a box canyon. If the robot is not in a box canyon, the get-unstuck behavior exits because it appears the robot is not in a stuck situation. If the robot is in a box canyon, control transfers to operation block 740. For an example, this box canyon situation may be defined by the Boolean equation:

```
Box_canyon =
(right_in_front < (robot->forward_thresh+.2)) &&
(right_front < (robot->forward_thresh * 2.0)) &&
(left_front < (robot->forward_thresh * 2.0)) &&
((right_side + left_side) < (robot->turn_thresh * 3.0)) &&
(BACK_BLOCKED=0)
```

Wherein: (robot→turn_thresh) is a predetermined threshold parameter, which may be robot specific, to define a maneuverability distance that enables the robot to turn around.

Once the determination has been made that the robot may be stuck, operation block 740 begins the process of attempting to get unstuck. Operation block 740 performs a back-out behavior. This back-out behavior causes the robot to backup from its present position while following the contours of obstacles near the rear sides of the robot. In general, the back-out behavior uses range sensing (e.g., from laser, sonar, infrared, or combinations thereof) of nearby obstacles near the rear sides to determine distance to the obstacles and provide assistance in following the contours of the obstacles. However, the back-out behavior may also include many robot attributes, including perception, position, bounding shape, and motion, to enable the robot to turn and back up while continuously responding to nearby obstacles. Using this fusion of attributes, the back-out behavior doesn't merely back the robot up, but rather allows the robot to closely follow the contours of whatever obstacles are around the robot.

For example movements, the robot may attempt to equalize the distance between obstacles on both sides, keep a substantially fixed distance from obstacles on the right side, or keep a substantially fixed distance between obstacles on the left side. As the back-out behavior progresses, decision block 750 determines if there is sufficient space on a side to perform a maneuver other than backing out. If there is not sufficient space, control transfers back to operation block 740 to continue the back-out behavior. If there is sufficient space on a side, control transfers to operation block 760. As an example, the sufficient space on a side decision may be defined by the Boolean equation:

```
Space_on_side = space_on_left || space_on_right, wherein:
Space_on_left =
(l_front > (robot->forward_thresh+.2)) &&
(turn_left > (robot->arm_length + robot->turn_thresh + .2)) &&
(turn_left >= turn_right)
Space_on_right =
(r_front > (robot->forward_thresh+.2)) &&
(turn_right > (robot->arm_length + robot->(turn_thresh + .2)) &&
(turn_right >= turn_left))
```

Once sufficient space has been perceived on the right or left, operation block 760 performs a turn-until-head-is-clear behavior. This behavior causes the robot to rotate in the sufficient space direction while avoiding obstacles on the front side. As the turn-until-head-is-clear behavior progresses, decision block 770 determines if, and when, the head is actually clear. If the head is not clear, control transfers back to the operation block 760 to continue the turn-until-head-is-clear behavior. If the head is clear, control transfers to operation block 760.

Once the head is clear, decision block 780 determines whether an acceptable egress route has been found. This egress route may be defined as an acceptable window of open space that exists for the robot to move forward. To avoid potential cyclical behavior, the acceptable window may be adjusted such that the robot does not head back toward the blocked path or box canyon. If an acceptable egress route has not been found, control transfers back to operation block 740 to attempt the back-out behavior again. If an acceptable egress route is found, the unstuck behavior exits. As a specific example, the window may be defined by the equation:

window=1.25 meters−(seconds-in-behavior/10.0); and
the egress route may be defined as true if the
window<(robot→forward_thresh*2.5).

As with the guarded motion behavior, the get-unstuck behavior 700 operates on a global timing loop. Consequently, the get-unstuck behavior 700 will be re-entered and the process repeated on the next time tick.

4.3. Real-Time Occupancy Change Analysis

Figure 18:
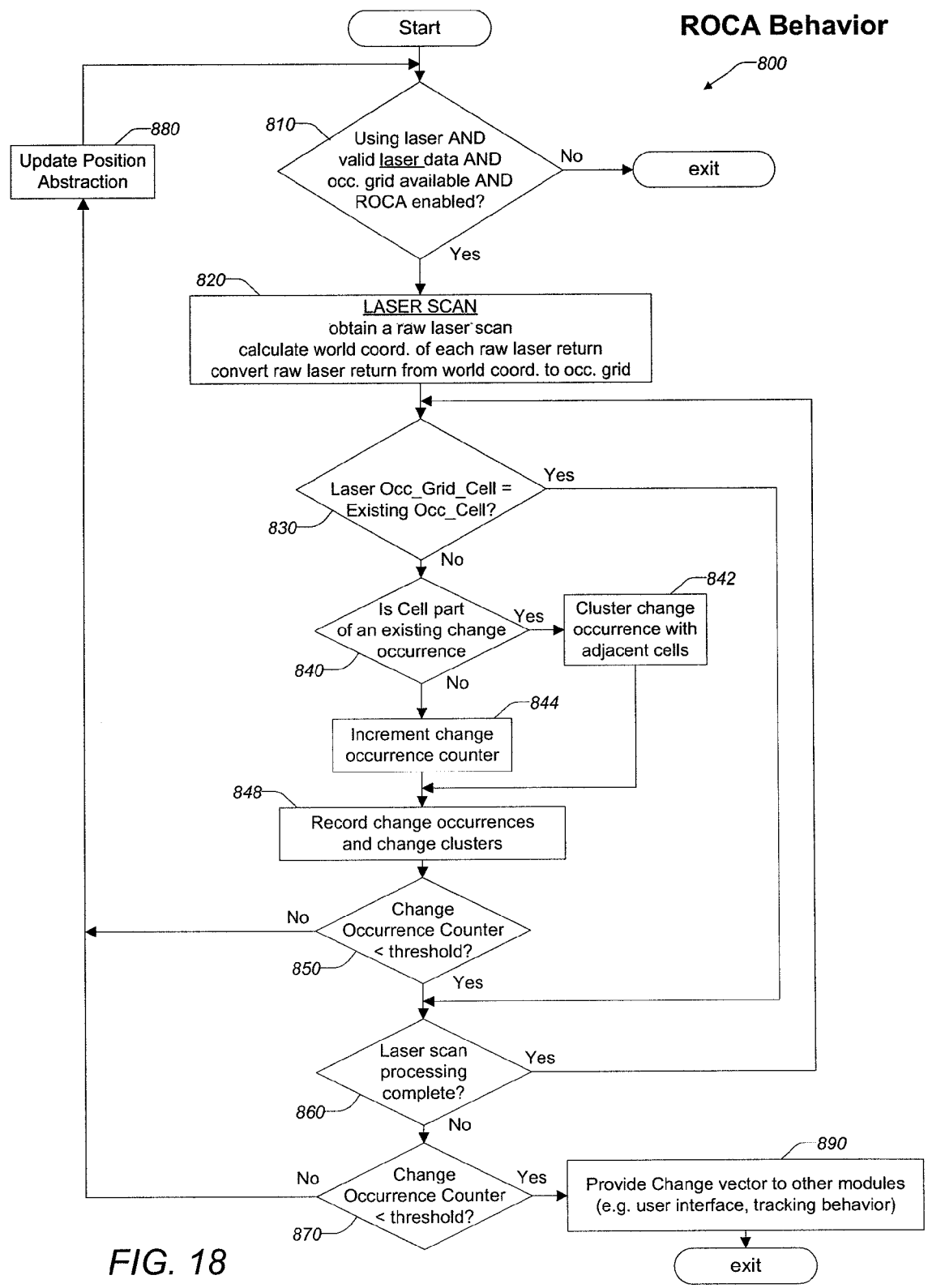
FIG. 18 is a software flow diagram illustrating components of an algorithm for performing a real-time occupancy change analysis behavior.

FIG. 18 is a software flow diagram illustrating representative components of an algorithm for performing a real-time occupancy change analysis behavior 800. Despite the much discussed potential for robots to play a critical role in security applications, the reality is that many human presence and motion tracking techniques require that the sensor used in tracking be stationary, removing the possibility for placement on a mobile robot platform. In addition, there is a need to determine substantially accurate positions for changes to recognized environmental features within a map. In other words, it may not be enough to know that something has moved or even the direction of movement. For effective change detection, a system should provide a substantially accurate position of the new location.

The Real-Time Occupancy Change Analyzer (ROCA) algorithm compares the state of the environment to its understanding of the world and reports to an operator, or supporting robotic sensor, the position of and the vector to any change in the environment. The ROCA robot behavior 800 includes laser-based tracking and positioning capability, which enables the robot to precisely locate and track static and mobile features of the environment using a change detection algorithm that continuously compares current laser scans to an occupancy grid map. Depending on the laser's range, the ROCA system may be used to detect changes up to 80 meters from the current position of the laser range finder. The occupancy grid may be given a priori by an operator, built on the fly by the robot as it moves through its environment, or built by a combination of robot and operator collaboration. Changes in the occupancy grid may be reported in near real-time to support a number of tracking capabilities, such as camera tracking or a robotic follow capability wherein one or more robots are sent to the map location of the most recent change. Yet another possible use for the ROCA behavior is for target acquisition.

A notable aspect of the ROCA behavior is that rather than only providing a vector to the detected change, it provides the actual X, Y position of the change. Furthermore, the ROCA behavior can operate "on-the-move" meaning that unlike most human presence detection systems, which must be stationary to work properly, it can detect changes in the features of the environment around it apart from of its own motion. This position identification and on-the-move capability enable tracking systems to predict future movement of the target and effectively search for a target even if it becomes occluded.

In general, once the robot has identified a change, the change may be processed by several algorithms to filter the change data to remove noise and cluster the possible changes. Of the clustered changes identified, the largest continuous cluster of detected changes (i.e., "hits") may be defined as locations of a change (e.g., possible intruder) within either the global coordinate space, as a vector from the current pose of the robot, other useful coordinate systems, or combinations thereof. This information then may be communicated to other robot attributes, robot behaviors, and cognitive conduct within the RIK as well as to other robots or an operator on a remote system.

As discussed earlier when discussing the range attribute, a variety of coordinate systems may be in use by the robot and an operator. By way of example, a local coordinate system may be defined by an operator relative to a space of interest (e.g., a building) or a world coordinate system defined by sensors such as a GPS unit, an iGPS unit, a compass, an altimeter, and the like. A robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation.

The software flow diagram shown in FIG. 18 includes representative components of an algorithm for performing the ROCA behavior 800. As stated earlier, the ROCA process 800 assumes that at least some form of occupancy grid has been established. However, due to the global timing loop execution model, details, probabilities, and new frontiers of the occupancy grid may be built in parallel with the ROCA process 800. The ROCA process 800 begins at decision block 810 by testing to determine if the robot includes lasers, the laser data is valid, an occupancy grid is available, and the ROCA process is enabled. If not, the ROCA process 800 ends.

If decision block 810 evaluates true, process block 820 performs a new laser scan, which includes obtaining a raw laser scan, calculating world coordinates for data included in the raw laser scan, and converting the world coordinates to the current occupancy grid. The raw laser scan includes an array of data points from one or more laser sweeps with range data to objects encountered by the laser scan at various points along the laser sweep. Using the present occupancy grid and present robot pose, the array of range data may be converted to an occupancy grid (referred to as laser-return occupancy grid) similar to the present occupancy grid map.

Next, decision block 830 tests to see if the current element of the array of range data shows an occupancy element that is the same as the occupancy element for the occupancy grid map. If so, control passes to decision block 860 at the bottom of the range data processing loop, which is discussed later.

If there is a difference between the laser-return occupancy cell and the corresponding cell for the occupancy grid map, decision block 840 tests the laser-return occupancy cell to see if it is part of an existing change occurrence. In other words, if this cell is adjacent to another cell that was flagged as containing a change, it may be part of the same change. This may occur, for example, for an intruder, that is large enough to be present in more than one occupancy grid. Of course, this test may vary depending on, for example, the granularity of the occupancy grid, accuracy of the laser scans, and size of the objects of concern. If decision block 840 evaluates true, operation block 842 clusters this presently evaluated change with other change occurrences that may be adjacent to this change. Then control will transfer to operation block 848.

If decision block 840 evaluates false, the presently evaluated change is likely due to a new change from a different object. As a result, operation block 844 increments a change occurrence counter to indicate that there may be an additional change in the occupancy grid.

Operation block 848 records the current change occurrences and change clusters whether from an existing cluster or a new cluster, then control transfers to decision block 850.

Decision block 850 tests to see if the change occurrence counter is still below a predetermined threshold. If there are a large number of changes, the changes may be due to inaccuracies in the robot's current pose estimate. For example, if the pose estimate indicates that the robot has turned two degrees to the left, but in reality, the robot has turned five degrees to the left, there may be a large number of differences between the laser-return occupancy grid and the occupancy grid map. These large differences may be caused by the inaccuracies in the pose estimate, which would cause inaccuracies in the conversion of the laser scans to the laser-return occupancy grid. In other words, skew in the alignment of the laser scan onto the occupancy grid map due to errors in the robot's pose estimation, from rotation or translation, may cause a large number of differences. If this is the case, control transfers to operation block 880 to update the position abstraction in an attempt to get a more accurate pose estimate. After receiving a new pose estimate from the position abstraction, the ROCA process begins again at decision block 810.

If decision block 850 evaluates true or decision block 860 was entered from decision block 830, decision block 860 tests to see if there are more data points in the laser scan to process. If so, control transfers back to decision block 830 to process the next element in the laser scan array.

If decision block 850 evaluates false, all the data in the laser scan array has been processed and decision block 870 again tests to see if the change occurrence counter is still below a predetermined threshold. As discussed earlier, if the change occurrence counter is not below the predetermined threshold, operation block 880 updates the position abstraction in an attempt to get a more accurate pose estimate, the ROCA process begins again at decision block 810.

If decision block 870 evaluates true, then processing for this laser scan is complete and operation block 890 updates a change vector and information regarding change occurrences and change clusters is made available to other robot attributes, robot behaviors, and cognitive conduct modules.

By way of example and not limitation, the ROCA results may be sent to the user interface, used by a tracking behavior, and combinations thereof. For example, ROCA results may be used with additional geometric calculations to pan a visual camera, a thermal camera, or combination thereof to fixate on one or more of the identified changes. Similarly, a manipulator, such as, for example, a weapon may be panned to acquire a target identified as one of the changes. If the detected change is moving, tracking position updates may arrive in near real time (the actual rate may depend on the speed and latency of the communication channel), allowing various sensors to continuously track the target. If desired, the robot may also continuously move to the new location identified by the change detection system to provide a mobile tracking capability.

When coupled with an operator interface, the tracked entity's movements may be indicated to an operator in near real time and visual data from a camera can be used by the operator to identify the tracked entity.

As with other behaviors, the ROCA behavior 800 operates on the global timing loop. Consequently, the ROCA behavior 800 will be re-entered and the process repeated on the next time tick.

4.4. Virtual Rail Conduct

One representative cognitive conduct module enabled by the RIK and GRA is a virtual rail system for robots. Many industrial and research applications involve moving a vehicle or target at varying speeds along a designated path. There is a need to follow physical paths repeatably either for purposes of transport, security applications or in order to accurately record and analyze information such as component wear and tear (e.g., automotive testing), sensor responsiveness (e.g., sensor characterization), or environmental data (e.g., monitoring). Such applications require both accuracy and repeatability.

Conventional practice methods have required the building of physical or actual tracks along which a vehicle can be moved. Drawbacks of such an approach include the significant limitations of the configuration of paths that may be created and the feasibility of building permanent tracks. Also, for characterization and other readily modifiable tasks, reconfiguration of physical track networks quickly becomes cost and time prohibitive.

Although it has long been known that physical tracks or rails are problematic, mobile robots have not had a means by which to maintain accurate positioning apart from such fixed-track methods. For some tasks, absolute positioning can be achieved by various instrumented solutions such as visual, laser-based tracking systems or radio frequency positioning systems that triangulate distance based on beacons placed in the environment. Each of these systems is costly to implement; in fact, the cost for purchasing and installing such a positioning system is often more than the total cost of the robot itself.

Moreover, the utility of visual or laser tracking systems is limited by occlusions within the environment. For example, RF beacons are only appropriate for environments where the beacons can be fixed in a static, known location. The physical properties of a remote sensing environment are constantly changing. In fact, walls are often shifted within the building to model different operational environments. Accordingly, absolute positioning is sometimes less feasible, impractical and frequently impossible to implement. Therefore, there is a need to provide a method and system for configuring a virtual track or rail system for use by a robot.

The present invention includes various embodiments including a robot system configured to follow pre-planned routes forming a "virtual rail" or "virtual track" and may include defined speeds for traversing various segments of the pre-planned routes. One application of a virtual rail system includes the repeated testing of a sensor or system to characterize the device. Due to the accuracy and repeatability of the virtual rail system, sensors and systems may be tested with data collected that conforms to a "sufficient comparable data" standard. Such a data collection standard requires acceptance of data only when consistent and comparable data is generated in response to repeatable tests carried out under the same conditions. For example, the virtual rail system may be used in a laboratory, research facility, or manufacturing environment to characterize a vast number of sensors. Accordingly, characterization tests that may previously have required a significant amount of time for execution may now be characterized in a fraction of the time.

Sensor characterization is only one example of a specific application. Other applications include automated mail carts and other delivery systems, security and surveillance systems, manufacturing and monitoring systems. In particular, the technology is useful for parts handling, as well as replacement of current railed robotic systems especially within the manufacturing and defense industries.

Figure 19:
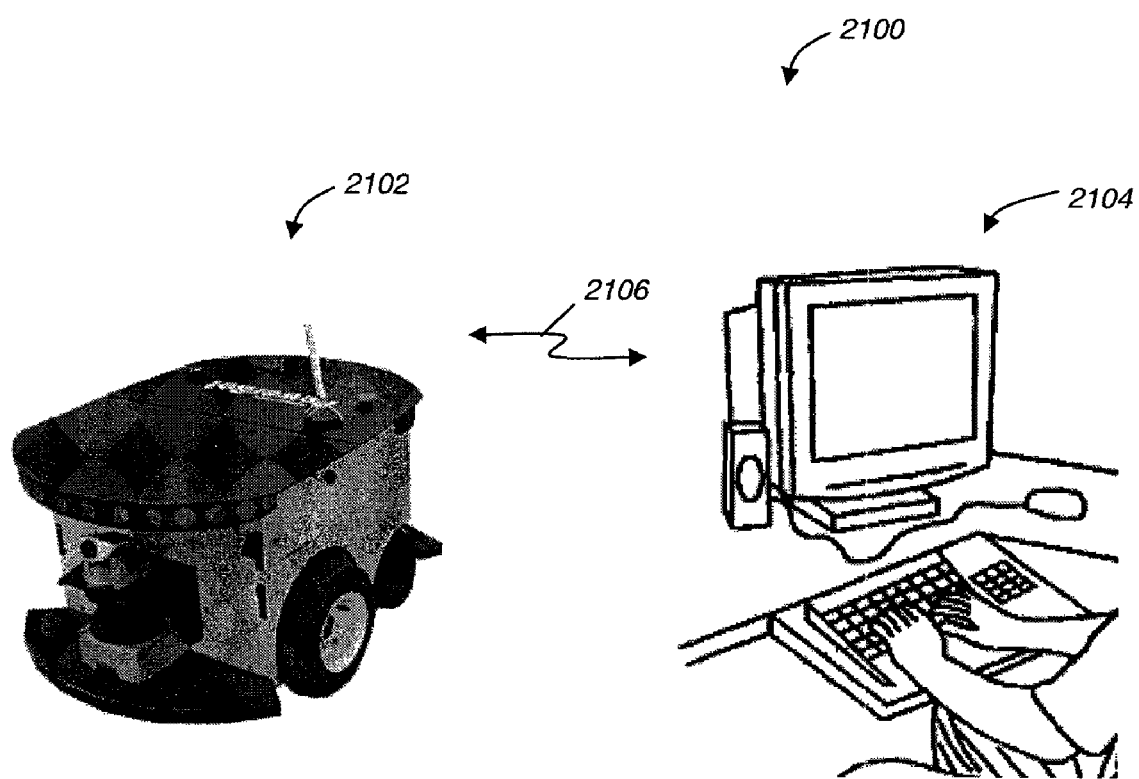
FIG. 19 is a block diagram of a robot system for implementing a virtual track for a robot, in accordance with an embodiment of the present invention.

FIG. 19 is a block diagram of a robot system for implementing a virtual track for a robot, in accordance with an embodiment of the present invention. A robot system 2100 includes a robot 2102 and a control generation system 2104. In robot system 2100, a user interfaces with control generation system 2104 to implement a virtual track for tracing or following by robot 2102. Robot 2102 is responsive to programming commands generated by control generation system 2104 and further conveys feedback and sensor information to control generation system 2104 over communication interface 2106. A user through a user interface of control generation system 2104 designates a desired path comprised of one or more representative path segments. In the various embodiments of the present invention, robot 2102 is configured or programmed to follow a virtual track or a virtual rail similar in resulting operation to a robot following a fixed track or physical rail. In the various embodiments of the present invention, however, the shortcomings of a fixed physical rail configuration are overcome by enabling the formation of a virtual track or rail system without the appreciated physical and economical limitations associated therewith.

Figure 20:
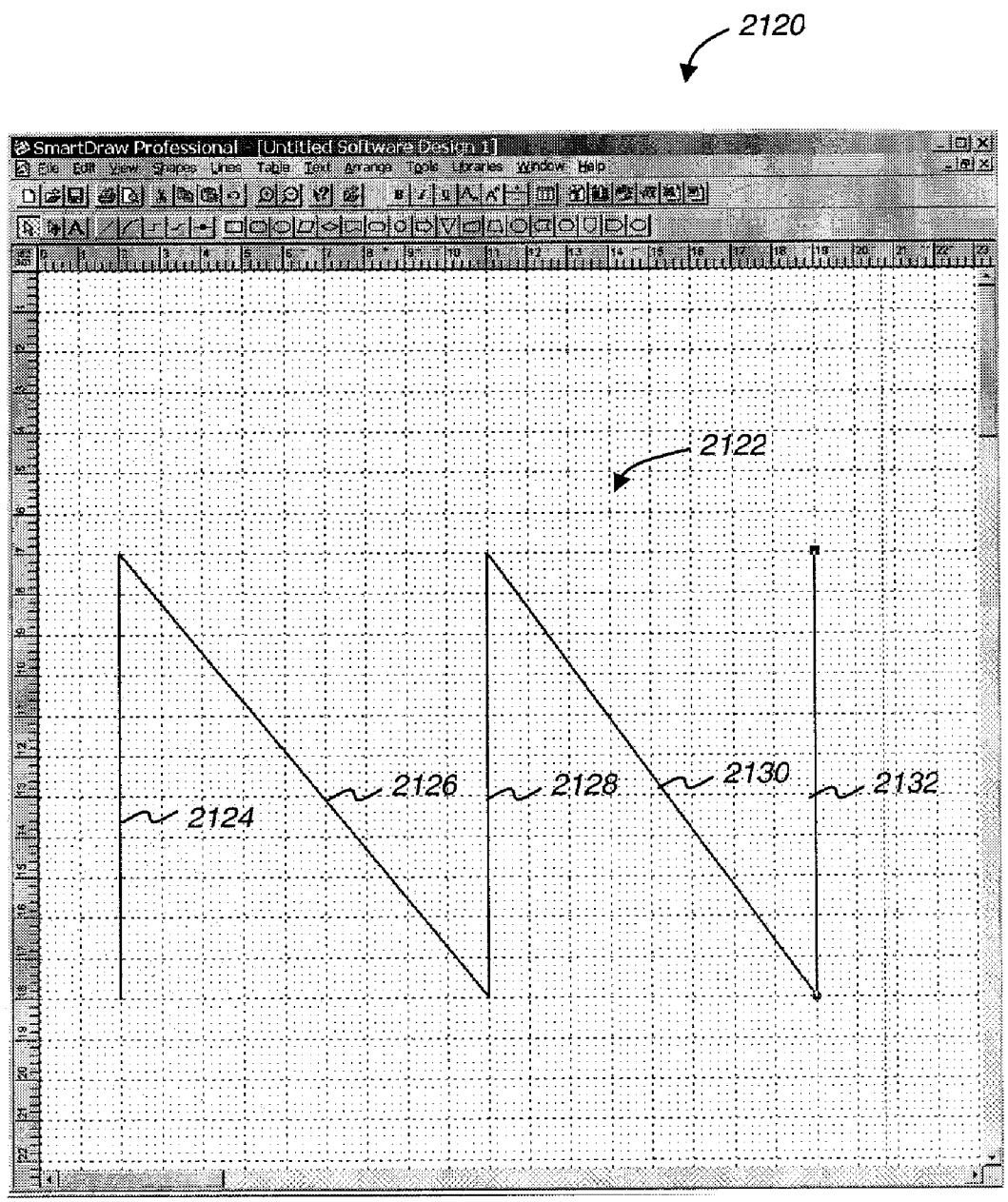
FIG. 20 illustrates a user interface for designating a desired path representative of a virtual track for a robot, in accordance with an embodiment of the present invention.

FIG. 20 illustrates a user interface for generating a desired path representative of a virtual track or virtual rail, in accordance with an embodiment of the present invention. A user interface 2120 operating on a conventional computer or other hosting interface provides an environment wherein a user may configure and readily reconfigure a virtual track or rail configuration for execution and following by a robot.

The user interface 2120 provides an environment for the generation of a desired path comprised of at least one segment representative of the virtual track for the robot. The user interface 2120 may take the form of a Computer Aided Design (CAD) program for the formation of the desired path. The desired path comprised of one or more segments representative of the virtual track for the robot may take the form of lines, arcs or any of a number of design shapes known by those of ordinary skill in the art, and are collectively referred to herein as "segments." By way of example, a desired path 2122 includes a plurality of line segments 2124-2132 with line segment 2132 illustrated as being selected. Line segments 2124-2132 may be generated using any of a number of commercially available CAD systems that may generate file formats that are readily convertible and parsable. By way of example and not limitation, the CAD file format may be directly saved or converted into a file format such as Drawing Exchange Format (.dxf).

Figure 21:
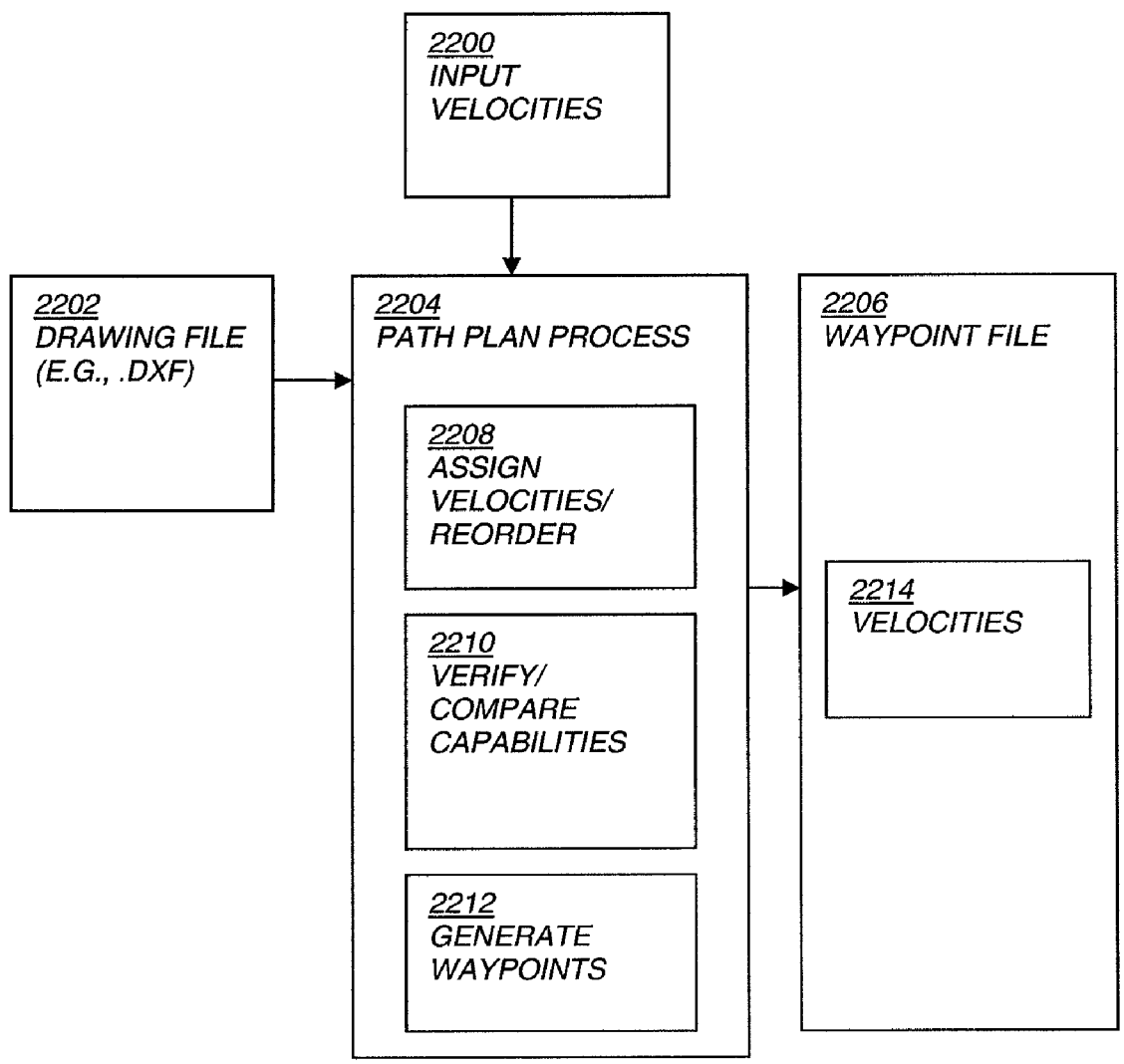
FIG. 21 is a process diagram for configuring the desired path into a waypoint file for execution by a robot, in accordance with an embodiment of the present invention.

FIG. 21 is a process diagram for configuring the desired path into a waypoint file for implementing a virtual track or rail and for execution by a robot, in accordance with an embodiment of the present invention. A virtual track or rail is specified in the form of a desired path 2122 (FIG. 20) including at least one segment representative of the virtual track as input through the user interface 2120 (FIG. 20). The graphical input of the desired path is converted or stored in a form that is capable of further processing or manipulation by the control generation system 2104 (FIG. 19), which generates programming commands destined for execution by robot 2102 (FIG. 19). By way of example and not limitation, the stored format for the desired path of the one or more segments representative of the virtual track may be a drawing file 2202. The format of drawing file 2202, among others, includes file formats (e.g., .dxf) configured to represent various line segments, arcs and other drawing elements as expressed by a user through a graphical user interface 2120 (FIG. 20).

A path plan process 2204 receives the CAD-generated drawing file 2202 and processes the one or more segments of the desired path into a waypoint file 2206 that includes instructions that are capable of being executed by robot 2102 (FIG. 19). The processing of drawing file 2202 includes the assignment process 2208 of input velocities 2200 to the segments or vertices of the desired path segments or elements. A verification process 2210 analyzes the desired input velocities 2200 by comparing the velocities with the mobility capabilities of robot 2102 (FIG. 19). Discrepancies or incompatibilities between the desired path and input velocities as compared with the execution capabilities of robot 2102 are reported and/or resolved.

Path plan process 2204 further includes a waypoint generation process 2212 for generating waypoint file 2206 that precipitates from the original drawing file 2202 undergoing assignment process 2208, followed by verification process 2210 for determining the compatibilities of the desired path and the robot capabilities. Waypoint file 2206 includes a listing of waypoints as well as any modified velocities 2214 which may be different than the originally specified input velocities 2200.

Figure 22:
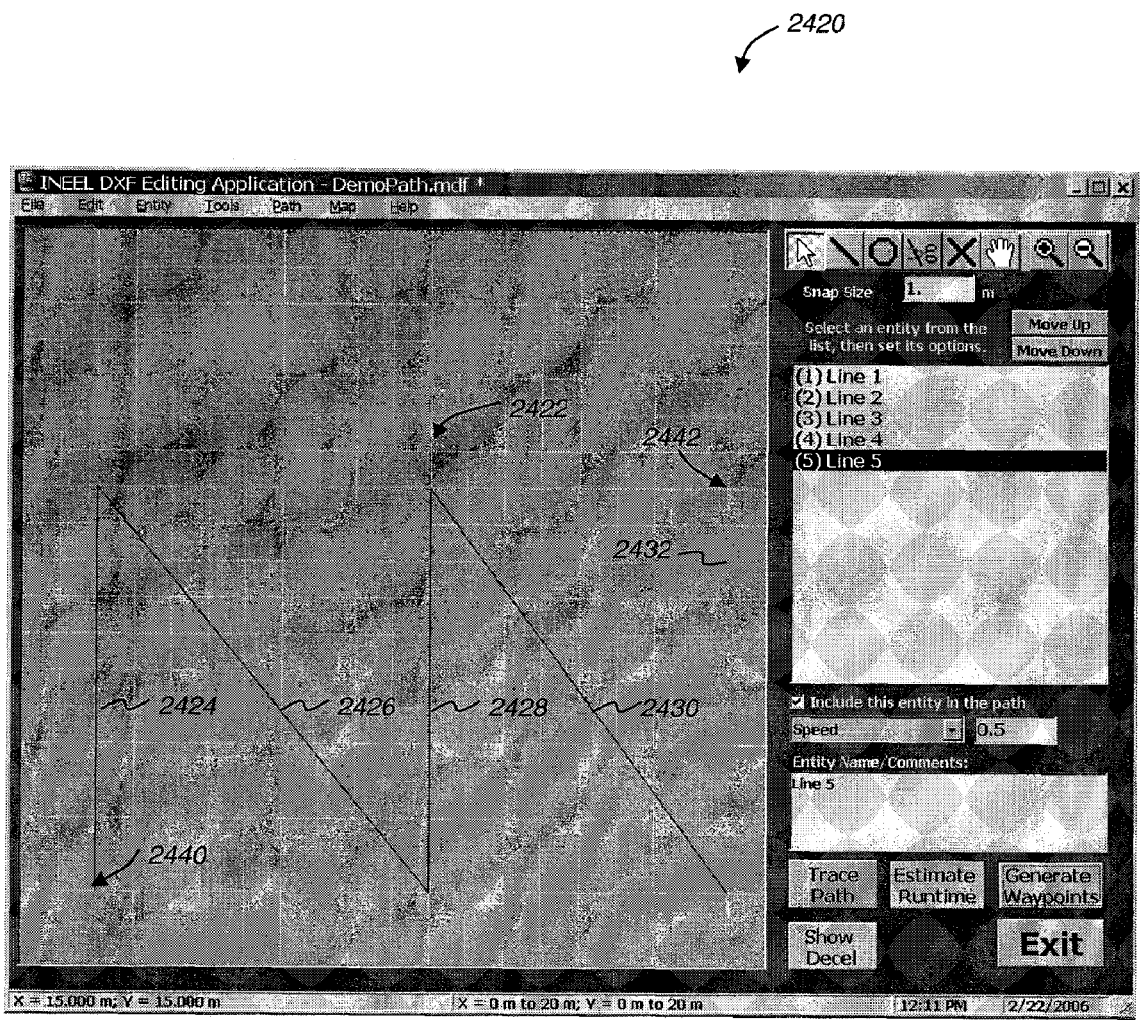
FIG. 22 illustrates a user interface for further processing the desired path into a program for execution by a robot, in accordance with an embodiment of the present invention.

FIG. 22 illustrates a user interface for further processing the desired path into a program for execution by a robot, in accordance with an embodiment of the present invention. A path plan process user interface 2420 provides an environment for the rendering of a previously defined drawing file 2202 (FIG. 21) and further enables the generation of a waypoint file 2206 (FIG. 21) through the assignment of start and end points 2440, 2442 to the desired path 2422 as well as the association of velocities with such paths. The desired path 2422, comprised of one or more segments 2424-2432 representative of the virtual track for the robot, thereafter includes assigned motion qualities and characteristics including start and end points 2440, 2442 to the desired path 2442 as well as assigned input velocities 2200 (FIG. 21) or speeds that should be executed by robot 2102.

As stated, the one or more line segments 2424-2432 with the assigned motion qualities is compared or verified through verification process 2210 (FIG. 21) with the performance capabilities of a specific robot 2102, which compares the requested desired path with mobility limitations and capabilities of robot 2102. In one embodiment of the present invention, an algorithm analyzes the path including traversal of the segments at various speeds, including velocity transitions between line and arc segments and determines the turn gain to insure minimal oscillations during traversal of the line segments. Furthermore, the algorithm is capable of carving smooth arcs by adjusting the turn gain based on an analysis of the arc shape and the commanded forward velocity. This algorithm provides the ability to arbitrate between waypoint following and motor schema control as speed and point types change.

After resolution of any inconsistencies or incompatibilities, a waypoint file 2206 (FIG. 21) is generated by path plan process 2204 with waypoint file 2206 (FIG. 21) being transferred over communication interface 2106 (FIG. 19) to robot 2102 (FIG. 19) for execution. Robot 2102, executing the various waypoints and specified velocities 2214 (FIG. 21) associated therewith, traces out or follows a virtual track or virtual rail as specified and/or modified by a user through the control generation system 2104 (FIG. 19).

The user interface 2420 for controlling path plan process 2204 (FIG. 21) enables a user to generate commands in the form of waypoint file 2206 (FIG. 21) for execution by robot 2102, which results in the formation of a virtual rail or track that is followed or traced by robot 2102. The virtual track or rail may be created from an abstraction or may be generated with reference to an available map or other boundary designations of the operating environment. Furthermore, accurate positioning of the robot 2102 (FIG. 19) may be maintained by application of Markov localization techniques that may combat problems such as odometry drift. Generation of waypoint file 2206 (FIG. 21) allows a robot 2102 (FIG. 19), given accurate position data, to traverse a trace of arcs and lines at various speeds. The various embodiments of the present invention may utilize various mapping or localization techniques including positioning systems such as indoor GPS, outdoor GPS and DGPS, a theodolite system as well as others that may be devised in the future.

As stated in FIG. 22, desired path 2422 includes a plurality of line segments 2424-2432. Through the use of the user interface 2420 start point 2440 and end point 2442 may be selected with each individual line segment 2424-2432 being individually selected thereby allowing the association of a velocity therewith. By way of example, line segment 2432 is illustrated as being selected with a representative speed of 0.5 meters per second being associated therewith. The path plan process 2204 (FIG. 21) through user interface 2420 uses the properties of each segment within drawing file 2202 (FIG. 21) to spatially locate each segment (e.g., line or arc) and then creates a default path based on the initial order of segments found in the drawing file 2202.

Path plan process 2204 (FIG. 21), through user interface 2420, can be used to manipulate various properties of the initial desired path 2422. For example, when segment 2432 is selected, the segment is highlighted in the user interface 2420. Once a segment is highlighted, its properties are displayed and can be edited, if desired. The order of segments can be changed, for example, either by using the "Move Up" and "Move Down" buttons or by selecting and dragging a segment to its new position. Each segment can be included or excluded, for example, from the path by appropriately marking the "Include this entity in the path" checkbox. This allows additional features that are not part of the path to be included in the drawing file without the requirement that they be a part of the virtual track or rail. Additional input boxes may be provided to set the initial speed, the final speed or constant acceleration, and provide for comments for each segment.

Once motion characteristics, such as velocity, have been associated with each of the line segments 2424-2432, other processing may be performed such as an estimation of run time as well as verification of velocity transitions 2210 (FIG. 21). Once velocities have been associated therewith and verification of compatibility with the capabilities of the target robot have been performed, a waypoint file 2206 (FIG. 21) may be generated by activating generate waypoint process 2212 (FIG. 21) within the user interface 2420.

Figure 23:
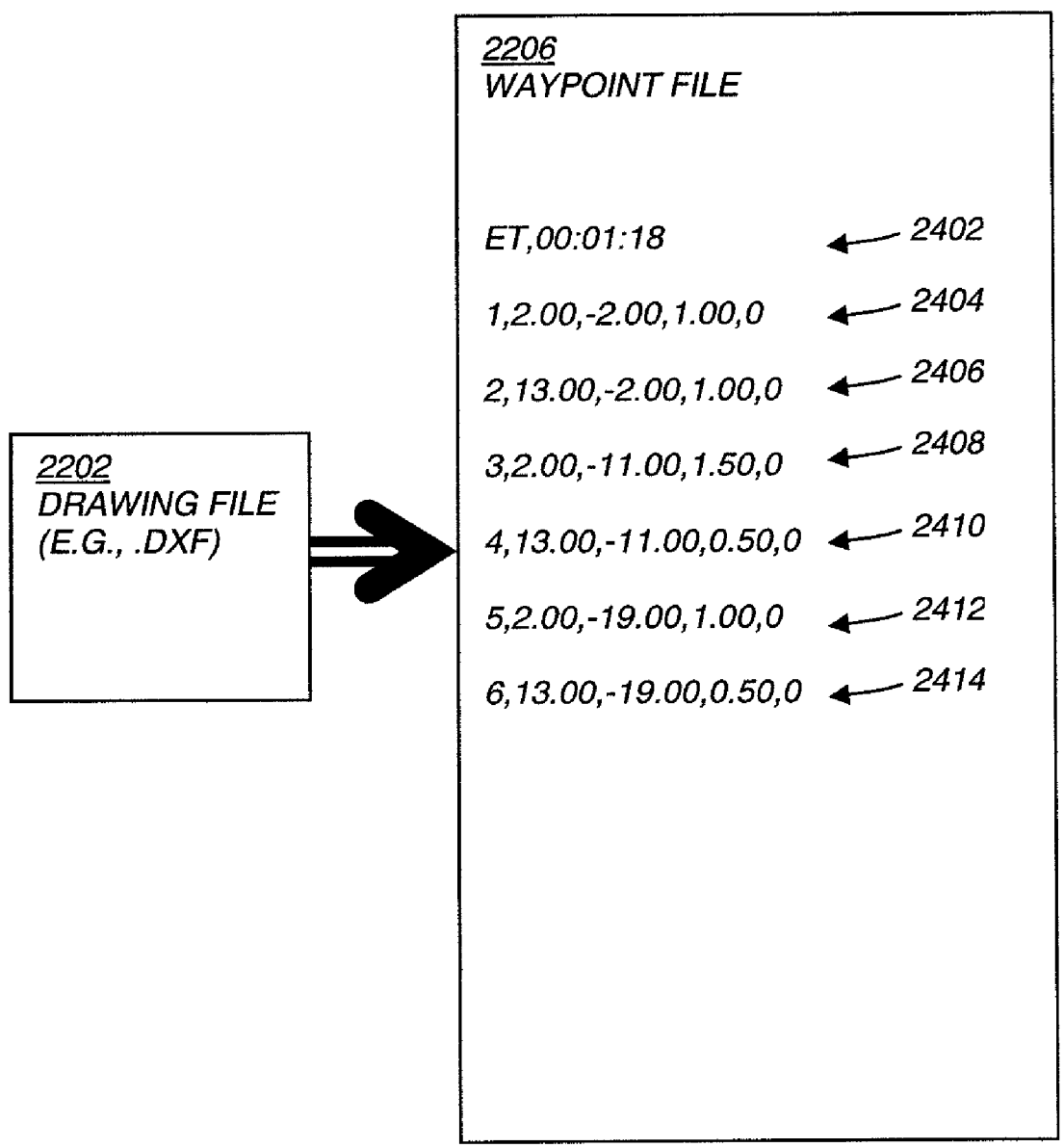
FIG. 23 is a diagram illustrating transformation from a drawing file to a program or waypoint file, in accordance with an embodiment of the present invention.

FIG. 23 is a diagram illustrating transformation according to path plan process 2204 (FIG. 21) from a drawing file to a waypoint file, in accordance with an embodiment of the present invention. A drawing file 2202 as received and generated in a user interface 2120 is transformed as stated above, with respect to FIG. 21, from a drawing file 2202 to a waypoint file 2206 according to path plan process 2204 (FIG. 21). As stated, drawing file 2202 is a limited expression of graphical segments and must be augmented through path plan process 2204 to include, among other things, motion characteristics such as velocities as well as execution ordering of the segments. Additionally, for the generation of waypoint file 2206, the information in drawing file 2202 also undergoes verifications to determine if input velocities 2200 (FIG. 21) are within the capabilities of the robot.

By way of example and not limitation, waypoint file 2206 assumes one or more formats, an example of which is illustrated with respect to FIG. 23. Waypoint file 2206 may include an estimated traversal time 2402 identifying a summation of the traversal times of each segment of the virtual track. By way of example, waypoint file 2206 includes a listing of ordered vertices identifying the waypoints 2404-2414 for traversal by the robot 2102 (FIG. 19). Each waypoint 2404-2414 includes a waypoint number indexed according to order as previously described, X and Y coordinate values, a velocity value, and an arc continuation flag for associating a set of waypoints for short line segments that comprise an arc traversal.

Figure 24:
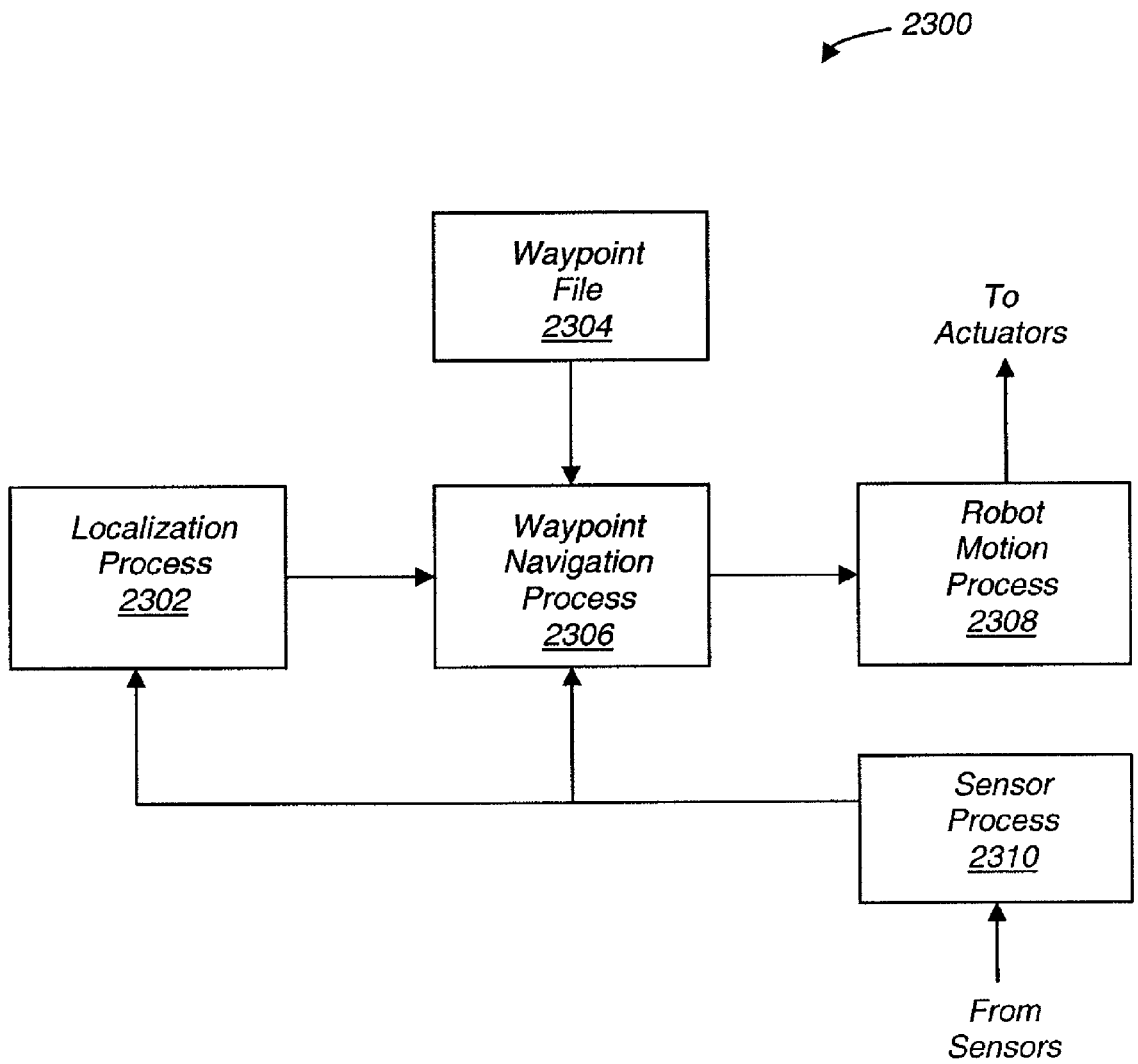
FIG. 24 is a process diagram of a control process of a robot, in accordance with an embodiment of the present invention.

FIG. 24 is a functional block diagram of a control process of a robot, in accordance with an embodiment of the present invention. Robot control process 2300 executes a waypoint file to trace-out or follow a virtual track or rail first defined and processed within the control generation system 2104 (FIG. 19). Robot control process 2300 includes a localization process 2302 wherein the robot processes environmental parameters including physical boundaries to determine a present frame of reference for use in alignment or referencing the virtual track or rail. Localization is a continuous process that the robot uses to determine its present location with reference to its internal map. For example, when the robot first starts executing a waypoint file 2304, the robot's start point is the origin (0,0) with positive X in the forward direction for referencing the internal map. As the robot moves around, the robot locates items in the operating environment and then places those items in the robot's internal map. As the robot continues to move, the robot may encounter familiar features with an expectation that the recognized features are located in the same relative position. However, if the features have moved relative to where the robot believes the features should be, then the robot assumes that the robot may not be in the right place on the internal map. The continual correction of the robot's position in the internal map may be described as "localization."

The localization process of the robot allows the robot to accurately and repeatedly trace the waypoints forming the virtual rail or track. The navigation process 2306 responds to the localization process 2302 and sensor data from sensor process 2310 to generate controls to the robot motion process 2308. Additionally, the robot uses sensor data from sensor process 2310 to determine surrounding features. The robot control process 2300 does not need to necessarily identify the composition or identity of the features, but only the fact that they are part of the environment that forms boundaries for the robot. Robot 2102 may utilize one or more sensors for providing feedback to the localization process. Sensors may include wheel measuring devices, laser sensors, ultrasonic sensors, and the like.

Waypoint navigation process 2306 generates commands or control signals to a robot motion process 2308. Robot motion process 2308 generates controls to actuators for generating motion, rotation, etc., as well as velocities associated therewith. Waypoint navigation process 2306 further receives from sensor process 2310 sensor information in the form of feedback for determining when traversal of one or more segments of the virtual rail has been accomplished. Sensor process 2310 may also provide information to waypoint navigation process 2306 in the form of changes to environmental parameters which enables waypoint navigation process 2306 to protect or guard against unforeseen changes to the environment. Additional details with respect to waypoint navigation are described below with respect to FIGS. 26-28.

Figure 25:
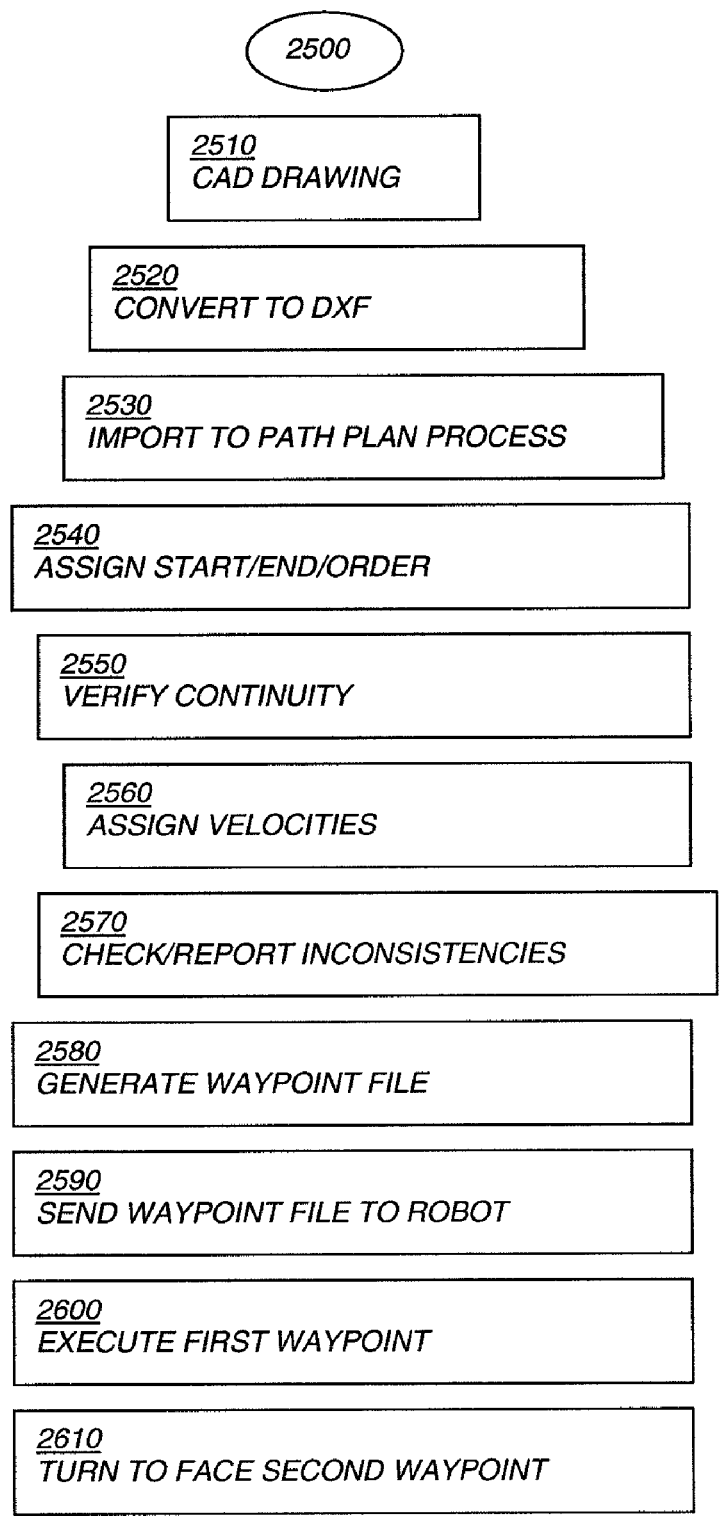
FIG. 25 is a flowchart of a method for implementing a virtual track for a robot, in accordance with an embodiment of the present invention.

FIG. 25 is a flow chart 2500 of a method for implementing a virtual track for a robot, in accordance with an embodiment of the present invention. An execution of a robot traversing a virtual rail is initiated by a user developing a desired path for the robot to follow using a drawing package to generate 2510 a drawing file.

As stated, a drawing file or other illustration of a desired path is generated 2510 and includes at least one segment representative of the virtual track to be configured for the virtual track, which the robot will traverse. Generation of a desired path results in the creation of a specific file format representing the illustrated segments of the desired path. The file format, in one embodiment of the present invention, is converted 2520 into a standardized file format, an example of which is the .dxf format. Generation 2510 and converting 2520 steps may be accomplished through the use of one or more applications, which are made usable through a user interface, such as user interface 2120 (FIG. 20).

Through path plan process 2204 (FIG. 21) and as further illustrated with respect to a user interface 2420 (FIG. 22), the drawing file 2202 (FIG. 23) is imported 2530 and start points 2440 (FIG. 22), end points 2442 (FIG. 22) and segment ordering may be assigned 2540 to the various segments of the desired path 2422 (FIG. 22). Through verification process 2210 (FIG. 21), continuity may be checked or verified 2550 and input velocities 2200 (FIG. 21) may be assigned 2560 to the various segments 2424-2432 (FIG. 22) of the desired path 2422 (FIG. 22). Further checking and reporting 2570 of inconsistencies or incompatibilities may also be performed.

Once the desired path 2422 has been illustrated and start and end points 2440, 2442, as well as velocities have been associated therewith, as well as a successful completion of verification processes, a waypoint list 2206 (FIG. 23) is generated 2580 and stored in a waypoint file. Upon completion of the generation of waypoint file 2206 (FIG. 21) by control generation system 2104 (FIG. 19), the waypoint file 2206 is sent 2590 via a communication interface 2106 (FIG. 19) to a robot 2102 (FIG. 19). Thereafter, robot 2102 may execute 2600 a first waypoint from waypoint file 2206 and subsequently execute 2610 a second and subsequent waypoint using waypoint navigation process 2306 (FIG. 24).

4.5. Waypoint Following Behavior

Figure 26:
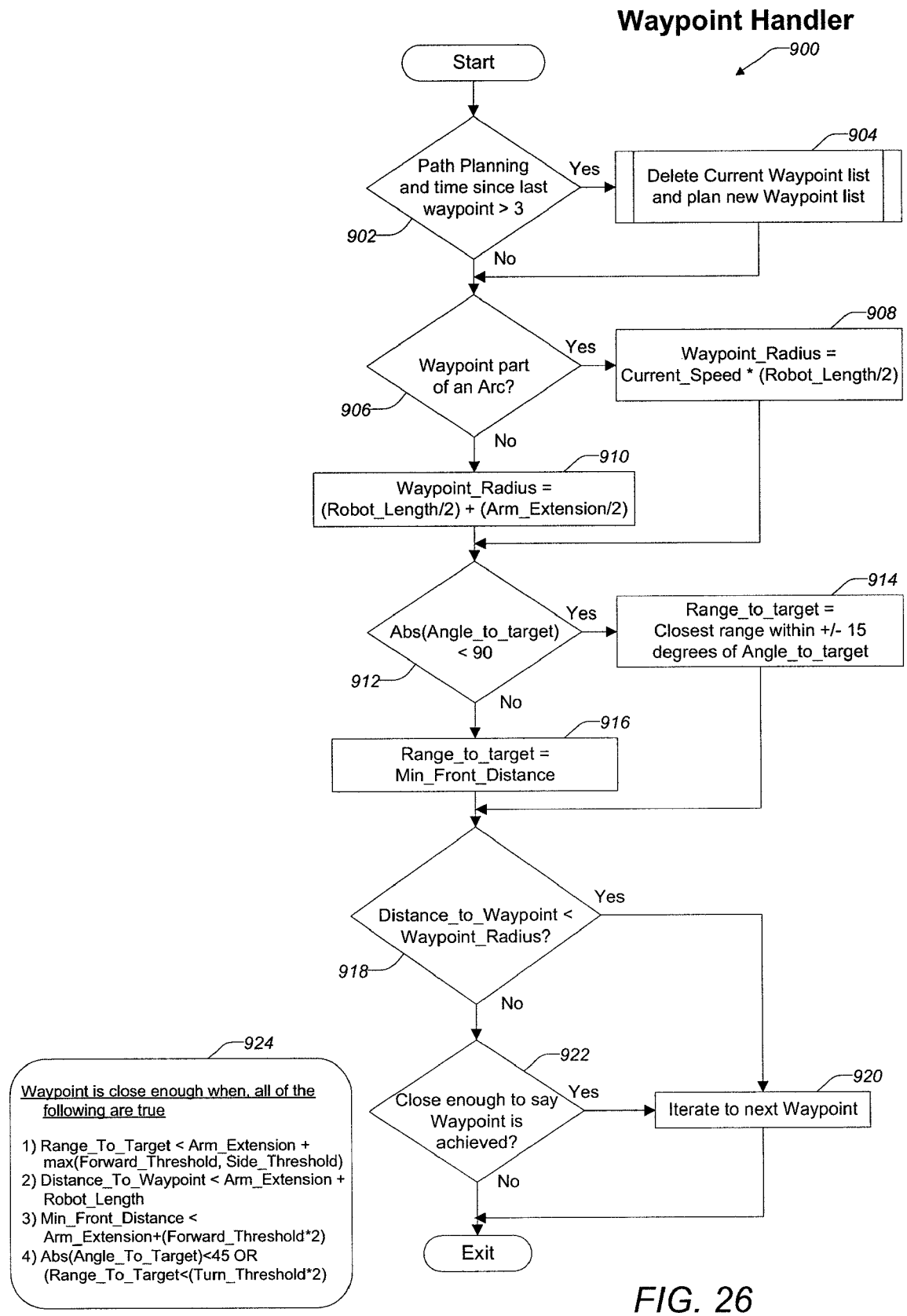
FIG. 26 is a software flow diagram illustrating components of an algorithm for handling a waypoint follow behavior.
Figure 27:
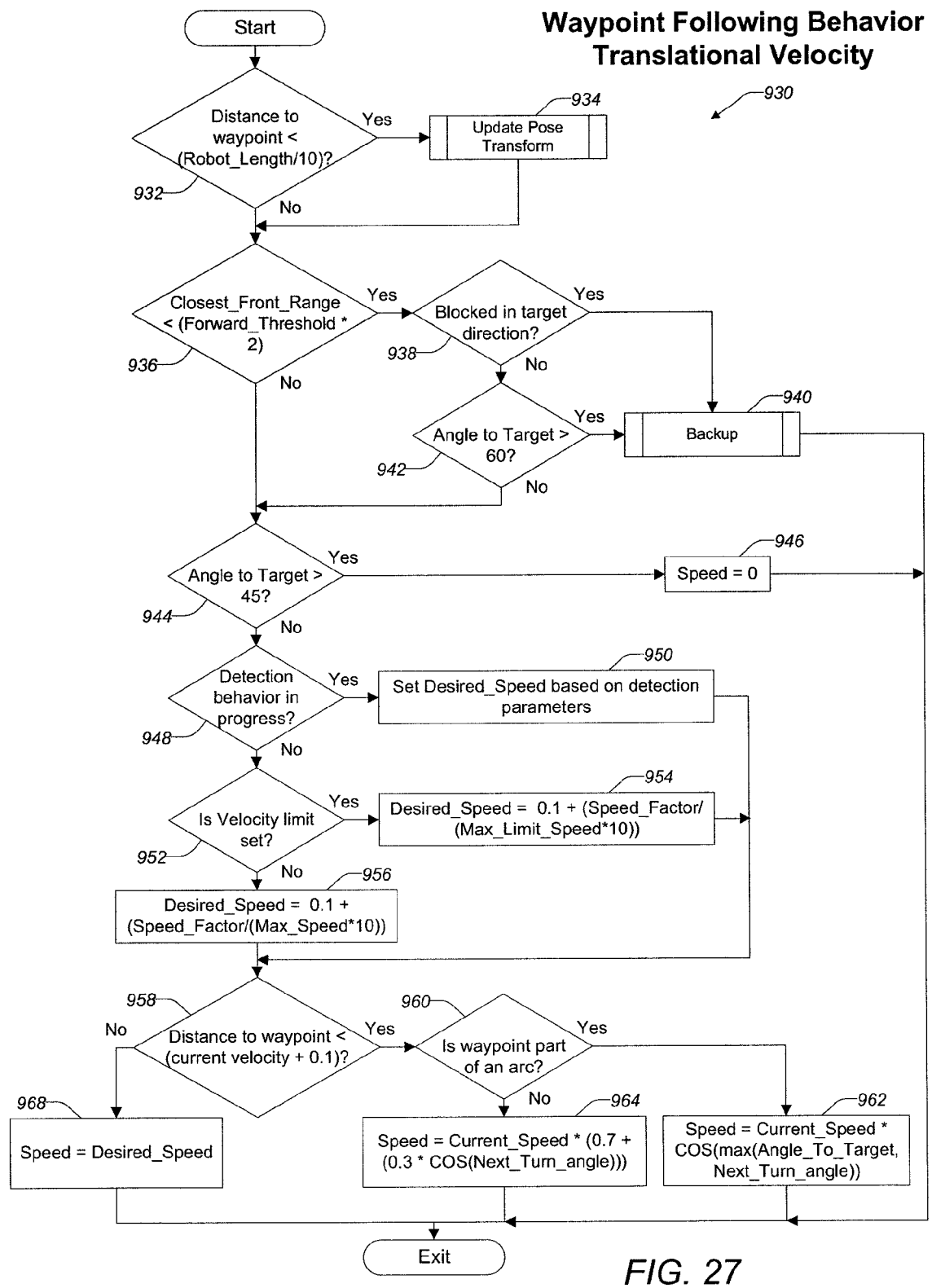
FIG. 27 is a software flow diagram illustrating components of an algorithm for performing translational portions of the waypoint follow behavior.
Figure 28:
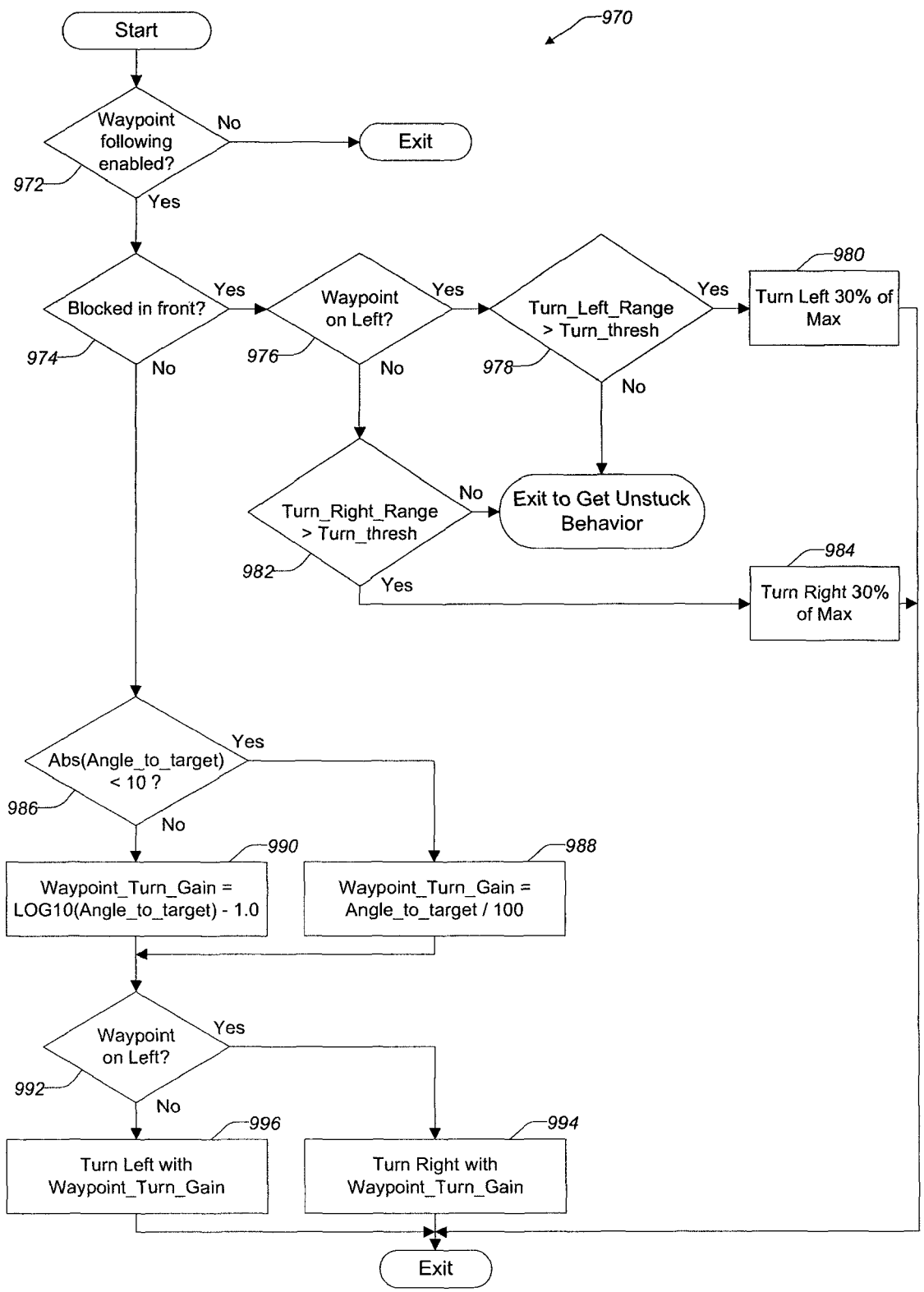
FIG. 28 is a software flow diagram illustrating components of an algorithm for performing rotational portions of the waypoint follow behavior.

FIGS. 26, 27, and 28 are software flow diagrams illustrating representative algorithms for performing waypoint following according to embodiments of the present invention. The waypoints may come from an algorithm such as the virtual robot rail system described above, interaction with an operator, interaction with other robots, internally generated, or combinations thereof. FIG. 26 illustrates components of a handler algorithm for handling transitions between waypoints, FIG. 28 illustrates handling of translational velocities during waypoint following, and FIG. 27 illustrates handling of rotational velocities during waypoint following.

The waypoint handler 900, illustrated in FIG. 26, starts with decision block 902 to test whether path planning is active and the time since the achieving the last waypoint is greater than a threshold. In the representative embodiment of FIG. 26, the threshold is set at three seconds. If sufficient progress has not been made toward a waypoint within the threshold, there may be a barrier blocking the robot's progress toward the waypoint. For example, perhaps a door was closed that the waypoint planning had assumed was open, or perhaps a new obstacle was placed in the environment such that the robot cannot find a way around the obstacle to achieve the next waypoint. In these types of circumstances, it may be appropriate to plan a new path with a new waypoint list. Thus, if path planning is active and the threshold is exceeded, operation block 904 performs a routine to delete the current waypoint list and plan a new waypoint list, then control transfers to decision block 906.

If decision block 902 evaluates false, or operation block 904 completes, decision block 906 tests to see if the current waypoint is defined as part of an arc. If the current waypoint is part of an arc, operation block 908 sets a variable named Waypoint_Radius as the current speed times one-half of the robot's length. This Waypoint_Radius variable is used later as a test threshold when determining how close the robot is to the waypoint. If the current waypoint is not part of an arc, operation block 910 sets Waypoint_Radius to one-half the robot's length plus one-half the length of the arm extension. Thus, the waypoint radius is defined as the physical extent of the robot from the robot's center.

With the Waypoint_Radius variable set, decision block 912 tests to see if the angle to the target waypoint is currently less than 90 degrees to the left or right. If so, operation block 914 sets the range to the target as the closest range within plus or minus 15 degrees of the current angle to the target. If the waypoint is not less than 90 degrees away, operation block 916 sets the range to target Min_Front_Distance, which, as explained earlier, is the range to the nearest object within plus or minus 90 degrees of the robot's forward direction. The current angle to the target defines the angle towards the target relative to straight ahead. However, Range_To_Target defines a range (i.e., distance) from the robot to an obstacle in the direction of the waypoint.

After setting the Range_To_Target variable, decision block 918 tests to see if the distance to the current waypoint is less than the waypoint radius defined previously. If so, the waypoint is considered to be achieved, so operation block 920 iterates to the next waypoint in the waypoint list, and the process exits.

If decision block 918 evaluates false, a more specific test is performed to see if the waypoint has been achieved. In some instances, it may not be possible to actually place the center of the robot over the waypoint. For example, the waypoint may have been placed too close to a wall, or perhaps even behind the wall. However, if the robot can get close enough, it may be sufficient to say the waypoint has been achieved. Thus, if decision block 922 evaluates true, operation block 920 iterates to the next waypoint in the waypoint list, and the process exits. However, if decision block 922 evaluates false the process exits and continues on with the current waypoint.

A representative evaluation of a test for close enough to a waypoint is illustrated in block 924. Of course, those of ordinary skill in the art will recognize that other parameters, distances, and decisions may be made within the scope of the present invention to define whether a waypoint has been achieved. In block 924, the first test checks to see if the Range_to_Target variable is less than the arm extension plus the larger of a forward threshold or a side threshold. If not, there may still be room to move forward or rotate toward the waypoint, so the process may exit and continue on with the current waypoint. Otherwise, the second test checks to see if the distance to the waypoint is less than the sum of the arm extension and the robot length. If not, there may still be room to move forward or rotate toward the waypoint, so the process may exit and continue on with the current waypoint. Otherwise, the third test checks to see if the distance to the closest object on the front side of the robot (i.e., Min_Front_Distance) is less than the arm extension plus twice the forward threshold. If not, there may still be room to move forward or rotate toward the waypoint, so the process may exit and continue on with the current waypoint. Otherwise, the final check tests to see if the angle to the target is less than 45 degrees or the range to the nearest obstacle is less than the turn threshold. If not, there may still be room to move or rotate toward the waypoint, so the process may exit and continue on with the current waypoint. Otherwise, operation block 920 iterates to the next waypoint in the waypoint list, and the process exits.

FIG. 27 is a software flow diagram illustrating components of an algorithm for adjusting translational velocity 930 during the waypoint follow behavior. First, operation block 932 tests to see if the distance to the next waypoint is less than one tenth of the robot's length. If so, operation block 934 performs an update of the robot's current pose to be certain that the pose is precise relative to the waypoint location.

If operation block 932 evaluates false, or after the pose is updated, decision block 936 tests to see if the range to the closest object in front is less than twice a predefined threshold. If not, control transfers to decision block 944. However, if the range to the closest object in front is less than twice a predefined threshold, the robot may be approaching close to an obstacle, so decision block 938 tests to see if the robot is blocked in the direction of the target. If so, operation block 940 performs a backup procedure and the process exits. If the robot is not blocked in the target direction, decision block 942 tests to see if the angle to the target is greater than 60 degrees. If so, the robot may not be able to achieve the target without backing up, so operation block 940 performs a backup procedure and the process exits. If the angle to the target is not greater than 60 degrees, a backup procedure may not be needed and control transfers to decision block 944.

Decision block 944 tests to see if the angle to the target is greater than 45 degrees. If so, operation block 946 sets the translational speed to zero enabling the robot to stop making forward progress while it rotates to face more directly toward the target. After setting the speed to zero, the process exits.

If the angle to the target is not greater than 45 degrees, new translational velocity determination continues by decision block 948 testing to see if a detection behavior is in progress. As stated earlier when describing the obstacle avoidance behavior, a detection behavior may be a behavior where the robot is using a sensor in an attempt to find something. For example, the countermine conduct is a detection behavior that is searching for landmines. In these types of detection behaviors, it may be desirable to approach much closer to objects, or to approach objects with a much slower speed to allow time for the detection function to operate. Thus, if a detection behavior is active, operation block 950 sets a desired speed variable based on detection parameters that may be important. By way of example and not limitation, in the case of the countermine conduct this desired speed may be set as: Desired_Speed=Max_passover_rate−(Scan_amplitude/Scan_Speed). In this countermine conduct example, the Max_passover_rate may indicate a maximum desired speed for passing over the landmine. This speed may be reduced by other factors. For example, the (Scan_amplitude/Scan_Speed) term reduces the desired speed based on a factor of how fast the mine sensor sweeps an area. Thus, the Scan_amplitude term defines a term of the extent of the scan sweep and the Scan_Speed defines the rate at which the scan happens. For example, with a large Scan_amplitude and a small Scan_Speed, the Desired_Speed will be reduced significantly relative to the Max_passover_rate to generate a slow speed for performing the scan. While countermine conduct is used as an example of a detection behavior, those of ordinary skill in the art will recognize that embodiments of the present invention may include a wide variety of detection behaviors, such as, for example, radiation detection, chemical detection, and the like.

If a detection behavior is not in progress, decision block 952 tests to see if a velocity limit is set. In some embodiments of the invention, it may be possible for the operator to set a velocity limit that the robot should not exceed, even if the robot believes it may be able to safely go faster. For example, if the operator is performing a detailed visual search, the robot may be performing autonomous navigation, while the operator is controlling a camera. The operator may wish to keep the robot going slow to have time to perform the visual search.

If a velocity limit is set, operation block 954 sets the desired speed variable relative to the velocity limit. The equation illustrated in operation block 954 is a representative equation that may be used. The 0.1 term is a term used to ensure that the robot continues to make very slow progress, which may be useful to many of the robot attributes, behaviors, and conduct. In this equation, the Speed_Factor term is a number from one to ten, which may be set by other software modules, for example the guarded motion behavior 500 (FIG. 13), to indicate a relative speed at which the robot should proceed. Thus, the desired speed is set as a fractional amount of the Max_Limit_Speed.

If a velocity limit is not set, operation block 956 sets the desired speed variable relative to the maximum speed set for the robot (i.e., Max_Speed) with an equation similar to that for operation block 614 (FIG. 15) except Max_Speed is used rather than Max_Limit_Speed.

After the Desired_Speed variable is set by block 950, 954, or 956, decision block 958 determines if the distance to the current waypoint is less than the current velocity plus a small safety factor. If not, operation block 968 sets the new translational speed for the robot to the Desired_Speed variable and the process exits. However, if the current waypoint is getting close, as determined by decision block 958 evaluating true, decision block 960 determines if the current waypoint is part of an arc. If so, operation block 962 sets the translational speed such that the robot can smoothly traverse the arc. Thus, operation block 962 is a representative equation that sets the new translational speed as a function of the larger of either the angle to the target, or the turn angle to the next waypoint. In other words, the translation velocity will be reduced by setting the new speed to the current speed multiplied by a fractional change factor. This fractional change factor may be defined as the cosine of the larger of either the angle to the target, or the turn angle to the next waypoint.

If the current waypoint is not part of an arc, it may still be desirable to slow the robot's translational speed down in preparation for turning toward the next waypoint. Thus, operation block 964 is a representative equation for setting the new translational speed for the robot by multiplying the current speed by a different fractional change factor. This fractional change factor may be set as about (0.7+(0.3*COS (Next_Turn_Angle)). In other words, the new speed will be set somewhere between 70% and 100% of the current speed based on the angle towards the next waypoint. If the angle is small, for example zero degrees, there may be no need to slow down and the new speed can be set at 100% of the current speed. Conversely, if the angle is large, for example 90 degrees, it may be desirable to slow down significantly in preparation for a turn to the new waypoint. Thus, the new translational velocity is set at 70% of the current speed. Of course, the next time through the global timing loop presents another chance to adjust the translational speed if the angle to the next waypoint is still large.

This sets the translational speed based on the severity of the turn that will be negotiated to achieve the next waypoint.

After setting the current speed, from operation block 968, 964, or 962, the translational velocity 930 process ends.

FIG. 28 is a software flow diagram illustrating components of an algorithm for performing rotational velocity adjustments 970 of the waypoint follow behavior. First, decision block 972, checks to see if waypoint following is enabled. If not, the process exits, because rotational velocity changes will be handled by another behavior, such as, for example, the obstacle avoidance behavior.

If waypoint following is enabled, decision block 974 tests to see if the robot is blocked in front. If not, rotational velocity determination can continue at decision block 986. However if the robot is blocked in front, decision block 976 determines whether the current waypoint is to the left of the robot. If so, decision block 978 tests the area to the left of the robot where the robot may want to turn toward and find the range to the nearest object in that area. If the range is larger than a turning threshold, as tested by decision block 982, there is room to turn, so operation block 980 sets the rotational velocity to the left at 30% of a predefined maximum rotational velocity. After setting the rotational velocity, the process exits.

If the waypoint is not on the left, decision block 982 tests the area to the right of the robot where the robot may want to turn toward and find the range to the nearest object in that area. If the range is larger than a turning threshold, as tested by decision block 982, there is room to turn, so operation block 984 sets the rotational velocity to the right at 30% of a predefined maximum rotational velocity. After setting the rotational velocity, the process exits.

If the robot is blocked in front and there is not room to turn (i.e., either decision block 978 or 982 evaluates false), then the process exits to a get-unstuck behavior in an effort to find a way to get around the obstacle in front so that the robot can continue to pursue the current waypoint.

If the robot is not blocked in front, decision block 986 tests to see if the angle to the waypoint target is less than ten degrees. If so, the robot is close to pointed in the correct direction and only minor corrections may be useful. Thus, in a representative method for determining an appropriate change to the rotational velocity, operation block 988 sets a Waypoint_Turn_Gain as the angle to the target divided by 100. Conversely, if the waypoint target is equal to or greater than ten degrees, a larger correction to the rotational velocity may be appropriate to get the robot pointed toward the current waypoint. Thus, in a representative method for determining an appropriate change to the rotational velocity, operation block 990 sets a Waypoint_Turn_Gain as the base 10 logarithm of the angle to the target minus one. As a result, the larger the angle to the waypoint target, the larger the value will be for the Waypoint_Turn_Gain.

With the Waypoint_Turn_Gain set, decision block 992 tests to see if the waypoint is on the left. If so, operation block 994 sets the turn velocity to the left by multiplying the current turn velocity by the Waypoint_Turn_Gain, and the process exits. If the waypoint is not on the left, operation block 996 sets the turn velocity to the right by multiplying the current turn velocity by the Waypoint_Turn_Gain, and the process exits.

As with other behaviors, the waypoint algorithms 900, 930, and 970, in FIGS. 26, 27, and 28, respectively operate on the global timing loop. Consequently, the decision of whether a waypoint has been achieved to move on to the next waypoint, adjustments to the translational velocity, and adjustments to the rotational velocity, may be repeated on each time tick of the global timing loop.

4.6. Robotic Follow Conduct

Figure 29:
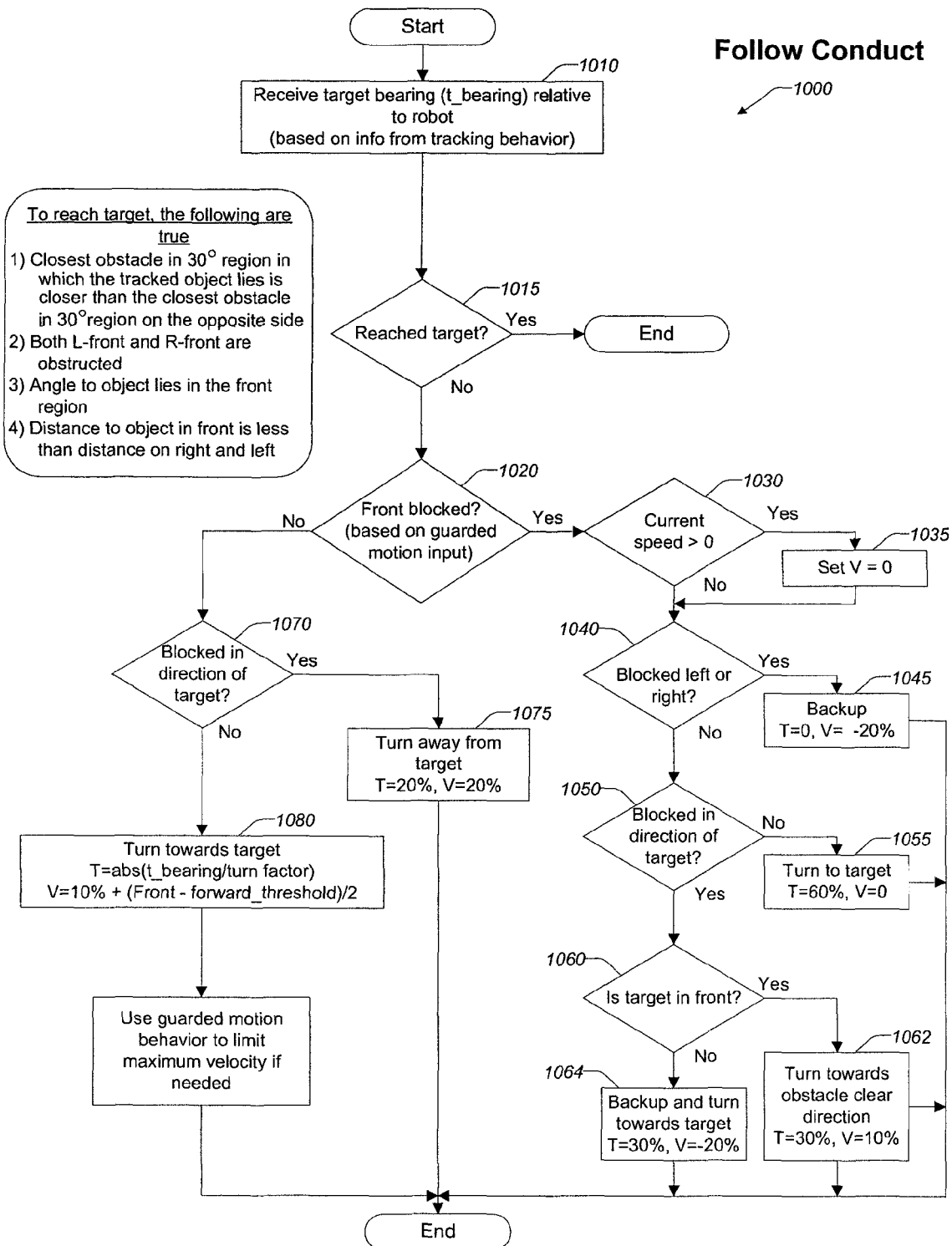
FIG. 29 is a software flow diagram illustrating components of an algorithm for performing a follow conduct.

One representative cognitive conduct module enabled by the RIK is a robotic follow capability wherein one or more robots are sent to a map location of the most recent change in the environment or directed to follow a specific moving object. FIG. 29 is a software flow diagram illustrating components of an algorithm for performing the follow conduct 1000.

This relatively autonomous conduct may be useful for a fast-moving robot with perceptors that may be used by robot attributes and robot behaviors to detect and track changes in the environment. It would be difficult for conventional robots under direct operator control to avoid obstacles, track where the robot is going, and track the object of pursuit at the same time. However, with the relatively autonomous conduct and collaborative tasking enabled by the RIK, a high-speed chase may be possible.

The RIK may include a tracking behavior that allows the robot to track and follow an object specified by the operator with the camera or other tracking sensors, such as thermal, infrared, sonar, and laser. Consequently, the tracking behavior is not limited to visual tracking, but can be used with any tracking system including a thermal imaging system for tracking human heat signatures.

In visual tracking, for example, the operator may specify an object to be tracked within the operator's video display by selecting a pursuit button on the interface and then manipulating the camera view so that the object to be tracked is within a bounding box. The camera can then track the object based on a combination of, for example, edge detection, motion tracking, and color blob tracking. Furthermore, the camera can track the motion of the target independently from the motion of the robot, which allows the robot to follow the optimal path around obstacles even if this path at first may take the robot in a direction different from the direction of the target.

Thus, the robotic follow conduct 1000 effectively blends robot behaviors, such as, for example, tracking, obstacle avoidance, reactive path planning, and pursuit behaviors. To begin the follow conduct 1000, operation block 1010 illustrates that the conduct queries or receives information regarding the present bearing to a target. This present bearing may be generated by a tracking behavior, such as, for example, the ROCA behavior discussed above or from an updated map location from the operator or other robot. In addition, the bearing may be converted to a robot relative coordinate system, if needed. Both the tracking behavior and follow conduct 1000 operate on the global timing loop. As a result, the follow conduct 1000 will be re-entered each timing tick and be able to receive an updated bearing to the target, from the tracking behavior or other defined location, each timing tick.

Decision block 1015 tests to see if the robot has reached the target. If so, the follow conduct 1000 exits. If not, the follow conduct 1000 transitions to decision block 1020. In this representative embodiment, reaching the target is defined as: 1) the closest obstacle in a 30° region in which the tracked object lies is closer than the closest obstacle in a 30° region on the opposite side; 2) both L-front and R-front are obstructed; 3) the angle to the object lies in the front region; and 4) the distance to the object in front is less than the distance on the right and left.

Decision block 1020 tests to see if the front is blocked. If so, control transfers to operation block 1030 to attempt to get around the obstacle. If not, control transfers to decision block 1070. The front blocked decision may be based, for example, on a flag from the guarded motion behavior discussed previously.

Decision block 1030 begins a process of attempting to get around a perceived obstacle. To begin this process, decision block 1030 checks the current speed. If the speed is not greater than zero, control transfers to decision block 1040. If the speed is greater than zero, operation block 1035 sets the speed to zero before continuing with decision block 1040.

Decision block 1040 tests to see if the robot is blocked on the left or right. If not, control transfers to decision block 1050. If the robot is blocked on the left or right, the robot may not have an area sufficient to make a turn, so operation block 1045 sets the robot to begin backing up with an angular velocity of zero and a linear velocity that is 20% of the presently specified maximum, then the follow conduct 1000 exits.

Decision block 1050 tests to see if the robot is blocked in the direction of the target. If so, control transfers to decision block 1060. If the robot is not blocked in the direction of the target, operation block 1055 sets the robot to turn toward the target with a linear velocity of zero and an angular velocity that is 60% of the presently specified maximum, then the follow conduct 1000 exits.

Decision block 1060 tests to see if the target is positioned substantially in front of the target. If so, the target is in front of the robot, but the robot is also blocked by an obstacle. Thus, operation block 1062 attempts to move forward slowly but also turn around the obstacle by setting the linear velocity to 10% of the presently specified maximum and the angular velocity to 60% of the presently specified maximum and away from the obstacle. Then, the follow conduct 1000 exits.

If decision block 1060 evaluates false, then the direction directly in front of the robot is blocked, and the direction toward the target is blocked. Thus, operation block 1064 attempts to find a clear path to the target by setting the linear velocity to −20% of the presently specified maximum (i.e., backing up) and the angular velocity to 30% of the presently specified maximum and in the direction of the target. Then, the follow conduct 1000 exits.

Returning to decision block 1020, if decision block 1020 evaluates false, then decision block 1070 begins a process of attempting to progress toward the target since the front is not blocked. Thus, decision block 1070 tests to see if the robot is blocked in the direction of the target. If so, operation block 1075 attempts to move forward while gradually turning away from the target in an effort to try to find a clear path to the target by setting the linear velocity to 20% of the presently specified maximum and the angular velocity to 20% of the presently specified maximum. Then, the follow conduct 1000 exits.

If decision block 1070 evaluates false, then the target is not in front of the robot and the robot is free to move forward. Thus, operation block 1080 attempts to move forward and turn toward the target. In this representative embodiment, the robot is set with an angular velocity toward the target that is determined by the current bearing toward the target divided by a predetermined turn factor. Consequently, the speed at which the robot attempts to turn directly toward the target may be adjusted by the turn factor. In addition, the robot is set to move forward at a safe speed, which may be set as 10% of the maximum, to ensure the robot keeps moving, plus a safe speed adjustment. The safe speed adjustment may be defined as (Front-forward_threshold)/2. Wherein "Front" defines the distance to the nearest object in the vicinity of directly in front as defined by the range attribute discussed earlier, and "forward_threshold" defines a distance to which the robot may be relatively certain that objects are outside of its time horizon. Thus, the robot makes fast, but safe, forward progress while turning toward the target, and the speed may be adjusted on the next time tick based on new event horizon information.

As with other robot behaviors and cognitive conduct, the follow conduct 1000 operates on the global timing loop. Consequently, the ROCA behavior 800 will be re-entered and the process repeated on the next time tick.

4.7. Countermine Conduct

Figure 30A:
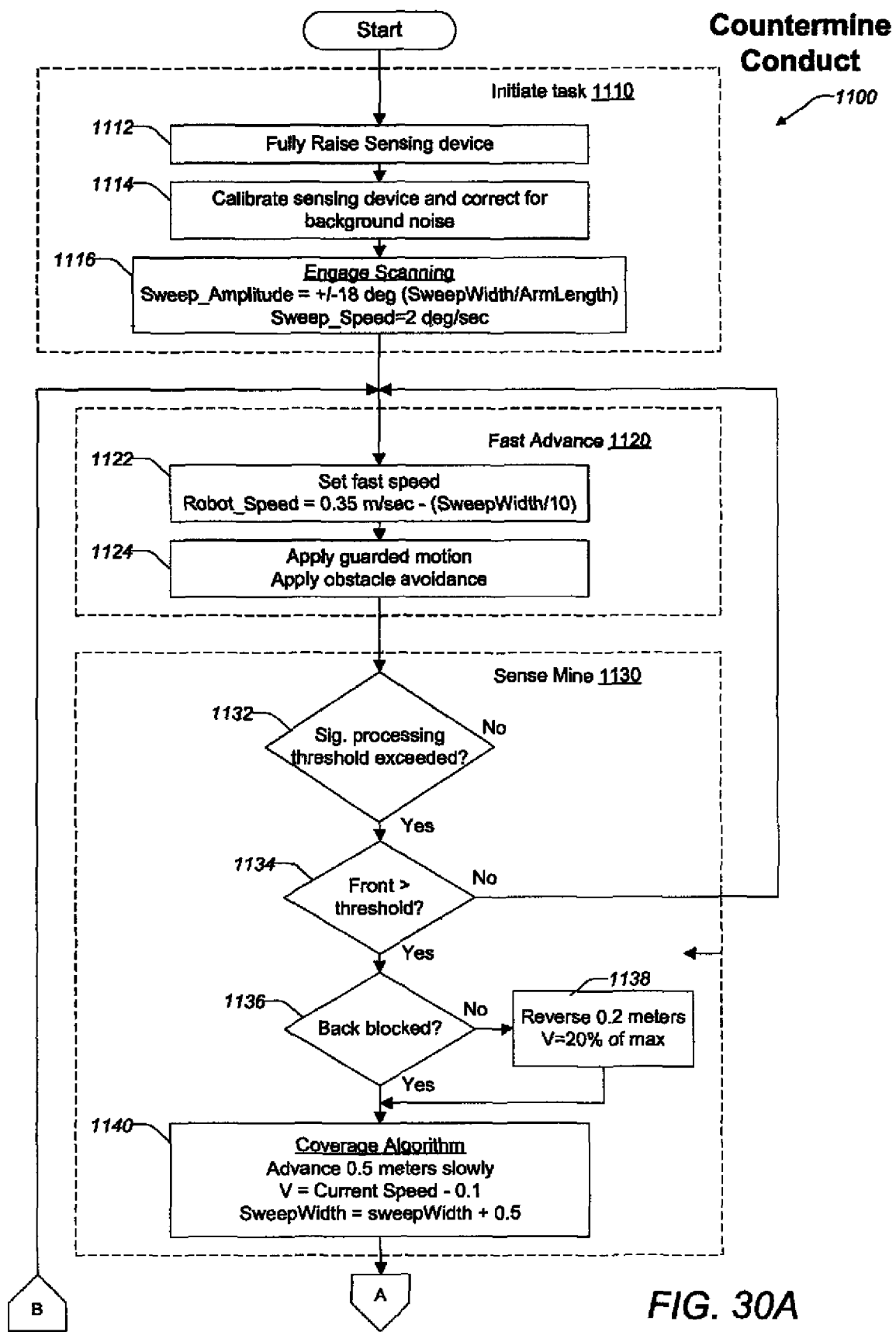
FIGS. 30A and 30B are a software flow diagram illustrating components of an algorithm for performing a countermine conduct.
Figure 30B:
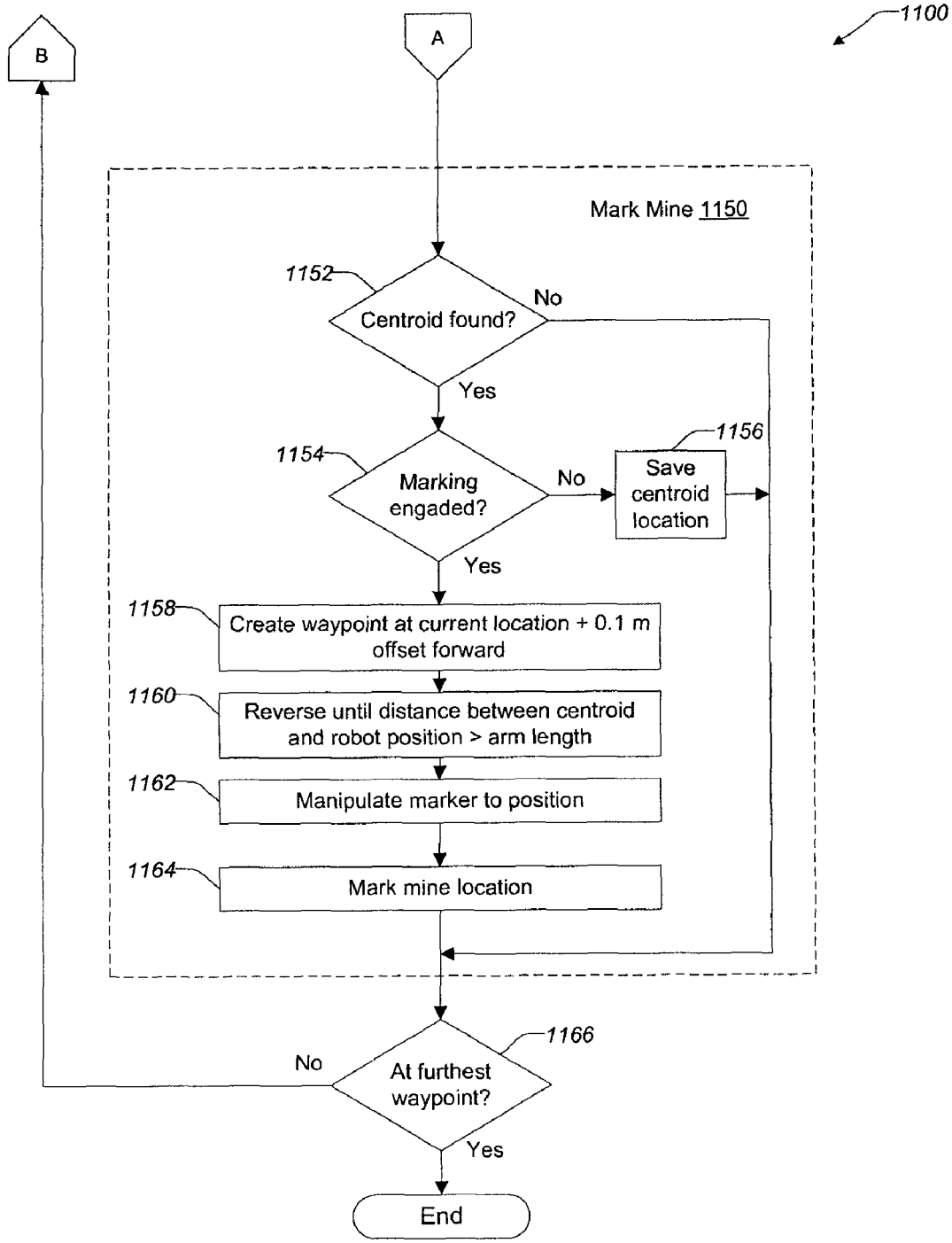

One representative cognitive conduct module enabled by the RIK is a countermine process. FIGS. 30A and 30B are software flow diagrams illustrating components of a countermine conduct module. Landmines are a constant danger to soldiers during conflict and to civilians long after conflicts cease, causing thousands of deaths and tens of thousands of injuries every year. Human minesweeping to find and remove mines is a dangerous and tedious job. Mine-detecting robots may be better equipped and expendable if things go wrong. The countermine conduct 1100 in FIGS. 30A and 30B illustrates a relatively autonomous conduct that may be useful for finding and marking landmines based on a predetermined path. The predetermined path may be defined as a series of waypoints, or may be simply defined as a straight path between the robot's present position and an end point. For example, the series of waypoints may be defined on a map to follow a road or to create broad coverage of a large area. Those of ordinary skill in the art will recognize that FIGS. 30A and 30B illustrate a high level decision and action process. Details of many of the behaviors, such as some movements of manipulators and details of what comprises the sensing of a mine may not be described in detail. Furthermore, FIGS. 30A and 30B and the description herein may express details of geometry and function related to a specific robot implementation for explanation purposes. Embodiments of the present invention are not intended to be limited to these specific implementation details.

To begin the countermine conduct 1100, an initiate task 1110 is performed. Generally, this initiate task 1110 may be performed at the beginning of a countermine sweep and would thus be performed once, outside of the global timing loop.

The initiate task 1110 may include operation block 1112 to fully raise a sensing device, which may be configured for sensing landmines and may be positioned on a manipulator for placement near the ground and for generating a sweeping motion of the mine sensor in a region around the robot. Operation block 1114 calibrates the sensing device and, for example, corrects for background noise, if needed. Operation block 1116 then positions the sensing device for operation and defines sensing parameters. As an example, the representative embodiment of FIG. 30A illustrates setting a sweep amplitude, and a sweep speed for the mine sensor.

After the initiate task 1110, the countermine conduct 1100 begins a fast advance 1120 process by setting a relatively fast speed toward the first waypoint in operation block 1122. The fast advance speed may depend on many factors, such as, for example, the motion capabilities of the robot, the sweeping characteristics of the manipulator, and the sensing characteristics of the mine sensor. Generally, the robot's fast advance speed may be set relative to the sweep coverage of the manipulator to ensure sufficient coverage of the area being swept. For example, in this specific embodiment operation block 1120 sets the robot's speed to about 0.35 msec− (SweepWidth/10). Thus, operation block 1120 actually determines the maximum advance rate based on scan width and scan speed to ensure 100% coverage. After setting the maximum advance rate, operation block 1124, enables the guarded motion and obstacle avoidance. One result of the fast advance process 1120 is that the maximum advance rate serves as an upper bound of allowable velocities for the guarded motion and obstacle avoidance behaviors, as explained above.

Once in the fast advance 1120 process, the countermine conduct 1100 begins a process of sensing for mines 1130. Decision block 1132 tests to see if a signal processing threshold has been exceeded. This signal processing threshold may be set at a predetermined level indicating a potential that a mine has been sensed in the vicinity of the mine sensor. Obviously, this predetermined threshold may be a function of factors such as, for example, expected mine types, mine sensor characteristics, robot speed, and manipulator speed. If the signal processing threshold is not exceeded, control returns to operation block 1122 to continue the fast advance 1120 process.

If the signal processing threshold is exceeded, the process tests to see if there is enough room at the present location to conduct a detailed search for the mine. Thus, decision block 1134 tests to see if the front range parameter is larger than a predetermined threshold. By way of example and not limitation, the threshold may be set at about one meter. If decision block 1134 evaluates false, indicating that there may not be enough room for a detailed search, control transfers to operation block 1122 to continue the fast advance 1120 process. In this case, the process depends on the guarded motion and obstacle avoidance behaviors to navigate a path around the potential mine.

If the front range parameter is larger than a predetermined threshold, there may be room for a detailed search and the process continues. Decision block 1136 tests to see if the back of the robot is blocked. If so, operation block 1138 sets the robot to back up a predetermined distance (for example 0.2 meters) at a speed of, for example, 20% of a predetermined maximum. This movement enables the robot to perform a more accurate sweep by including in the scan the subsurface area that triggered the processing threshold. If the area behind the robot is not clear, the process continues without backing up.

Operation block 1140 performs a coverage algorithm in an attempt to substantially pinpoint the centroid of the possible mine location. In a representative embodiment, this coverage algorithm may include advancing a predetermined distance, for example 0.5 meters, at a relatively slow speed, and sweeping the manipulator bearing the mine sensor with a wider sweep angle and a relatively slow speed. Thus, the coverage algorithm generates a detailed scan map of the subsurface encompassing the area that would have triggered the processing threshold. The results of this detailed scan map may be used to define a centroid for a mine, if found.

After the detailed scan from the coverage algorithm of operation block 1140, decision block 1152, in FIG. 30B, begins a process to marking the mine location 1150, which may have been found by the coverage algorithm. Decision block 1152 tests to see if the centroid of a mine has been found. If not, control transfers to the end of the mine marking process 1150. A centroid of a mine may not be found because the original coarse test at decision block 1132 indicated the possibility of a mine, but the coverage algorithm at decision block 1152 could not find a mine. As a result, there is nothing to mark.

If a centroid was found, decision block 1154 tests to see if physical marking, such as, for example, painting the location on the ground, is enabled. If not, operation block 1156 saves the current location of the sensed mine, then continues to the end of the mine marking process 1150.

If marking is engaged, operation block 1158 saves the current location of the mine, for example, as a waypoint at the current location. Next, operation block 1160 corrects the robot position in preparation for marking the location. For example and not limitation, the robot may need to backup such that the distance between the centroid of the mine and the robot's current position is substantially near the arm length of the manipulator bearing the marking device.

With the robot properly positioned, operation block 1162 moves the manipulator bearing the marking device in proper position for making a mark. For example of a specific robot configuration, and not limitation, the manipulator may be positioned based on the equation:

$$\text{arm position} = \text{robot pose} - \arctan((\text{robotx} - \text{centroidx})/(\text{roboty} - \text{centroidy}))$$

With the manipulator in position, operation block 1164 marks the mine location, such as, for example, by making a spray paint mark.

After completion of the mine marking process 1150, decision block 1166 tests to see if the robot has reached the furthest waypoint in the predefined path. If so, the countermine conduct 1100 has completed its task and exits. If the further waypoint has not been reached, control returns to the fast advance process 1120 in FIG. 30A.

5. Multi-Robot Control Interface

Conventional robots lack significant inherent intelligence allowing them to operate at even the most elementary levels of autonomy. Accordingly, conventional robot "intelligence" results from a collection of programmed behaviors preventing the robot from performing damaging and hurtful actions, such as refraining from getting stuck in corners or encountering obstacles.

While robots have great potential for engaging in situations without putting humans at risk, conventional robots still lack the ability to make autonomous decisions and therefore continue to rely on continuous guidance by human operators who generally react to live video from the robot's on-board cameras. An operator's user interface with a robot has generally been limited to a real-time video link that requires a high-bandwidth communication channel and extensive human interaction and interpretation of the video information.

Most commercial robots operate on a master/slave principle where a human operator controls the movement of the robot from a remote location in response to information from robot-based sensors such as video and GPS. Such an interface often requires more than one operator per robot to navigate around obstacles and achieve a goal and such an approach generally requires highly practiced and skilled operators to reliably direct the robot. Additionally, the requisite concentration needed for controlling the robot may also detract an operator from achieving the overall mission goals. Accordingly, even an elementary search and rescue task using a robot has typically required more than one operator to monitor and control the robot. As robots become more commonplace, requiring an abundance of human interaction becomes inefficient and costly, as well as error prone. Therefore, there is a need to provide a usable and extendable user interface between a user or operator and a plurality of robots.

Embodiments of the present invention provide methods and apparatuses for monitoring and tasking multiple robots. In the following description, processes, circuits and functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

The various embodiments of the present invention are drawn to an interface that supports multiple levels of robot initiative and human intervention, which may also provide an increased deployment ratio of robots to operators. Additionally, exchange of information between a robot and an operator may be at least partially advantageously processed prior to presentation to the operator, thereby allowing the operator to interact at a higher task level. Further improvements are also provided through tasking multiple robots and decomposing high-level user tasking into specific operational behaviors for one or more robots.

Figure 31:
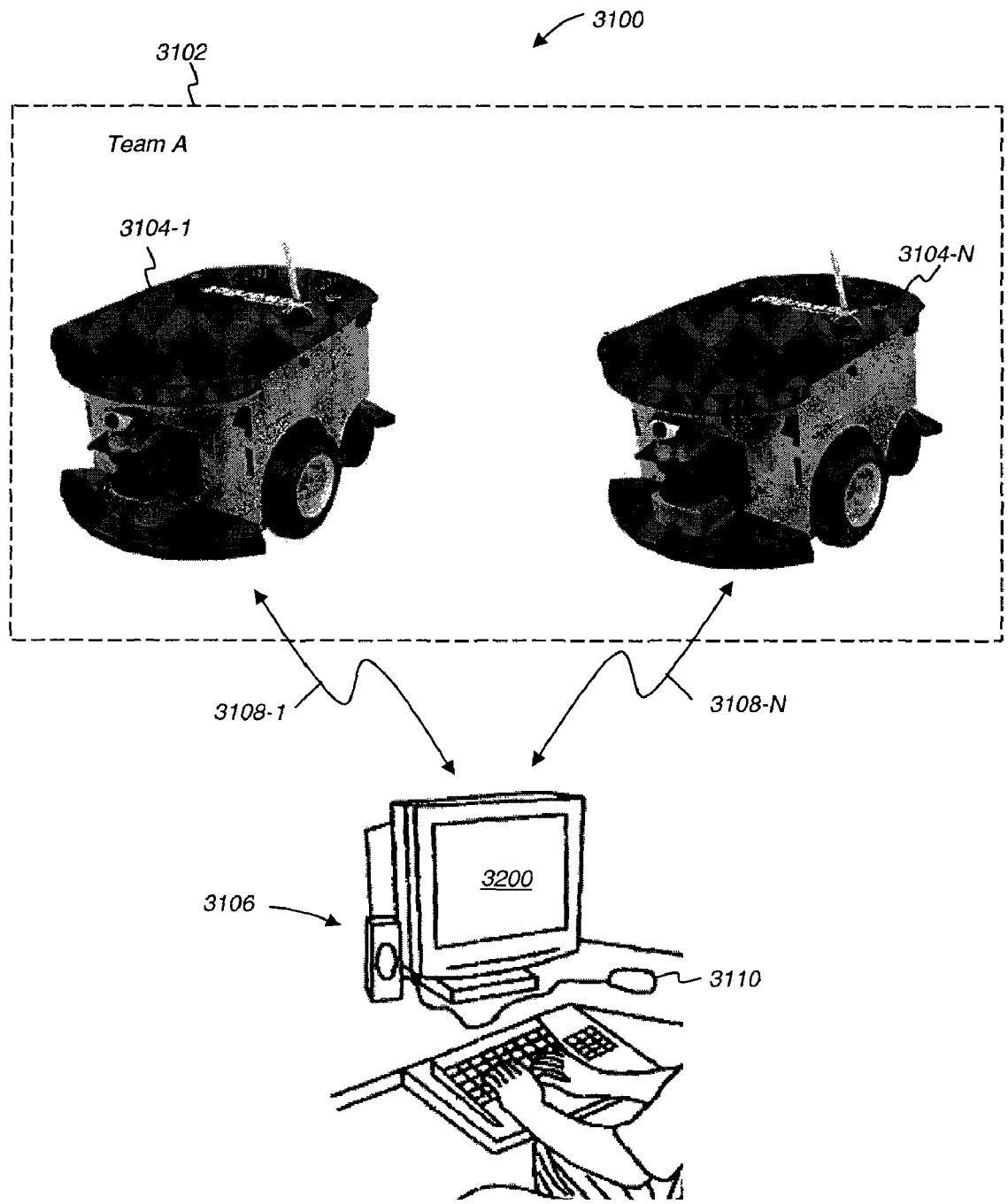
FIG. 31 is a block diagram of a robot system, in accordance with an embodiment of the present invention.

FIG. 31 is a block diagram of a multi-robot system including a multi-robot user interface, in accordance with an embodiment of the present invention. A multi-robot system 3100 includes a team 3102 of robots 3104 including a plurality of robots 3104-1, 3104-N. Multi-robot system 3100 further includes a user interface system 3106 configured to communicate with the team 3102 of robots 3104 over respective communication interfaces 3108-1, 3108-N.

By way of example and not limitation, the user interface system 3106, including input devices such as a mouse 3110 or joystick, enables effective monitoring and tasking of team 3102 of robots 3104. Interaction between robots 3104 and user interface system 3106 is in accordance with a communication methodology that allows information from the robots 3104 to be efficiently decomposed into essential abstractions that are sent over communication interfaces 3108 on a "need-to-know" basis. The user interface system 3106 parses the received messages from robots 3104 and reconstitutes the information into a display that is meaningful to the user.

Figure 32:
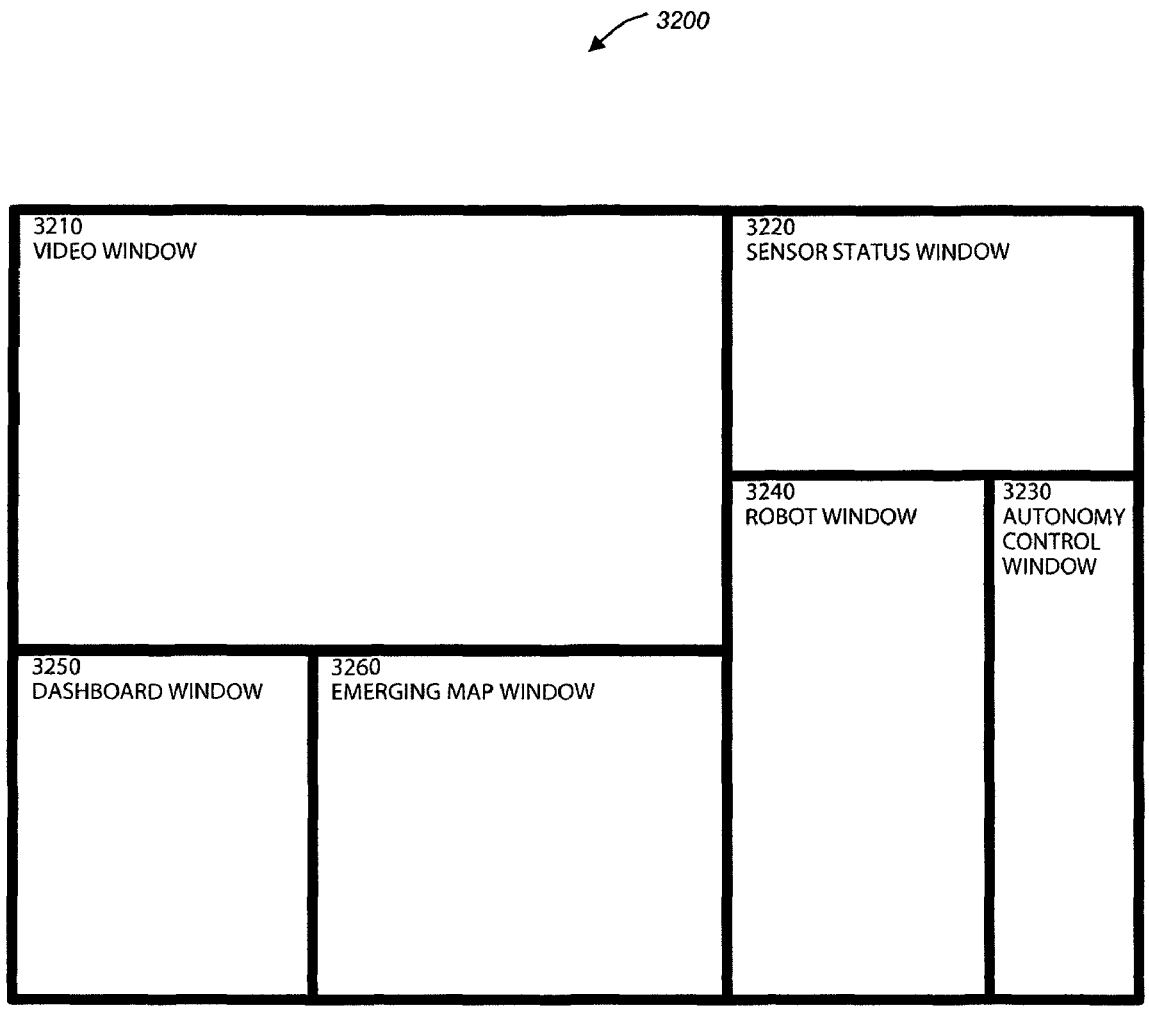
FIG. 32 illustrates a multi-robot user interface for operator interaction, in accordance with an embodiment of the present invention.

In one embodiment of the present invention, user interface system 3106 further includes a user interface 3200 as illustrated with respect to FIG. 32. User interface 3200 is configured as a "cognitive collaborative workspace" which is configured as a semantic map overlaid with iconographic representations that can be added and annotated by human operators as well as by robots 3104. The cognitive collaborative nature of user interface 3200 includes a three-dimensional (3D) representation that supports a shared understanding of the task and environment. User interface 3200 provides an efficient means for monitoring and tasking the robots 3104 and provides a means for shared understanding between the operator and the team 3102 of robots 3104. Furthermore, user interface 3200 may reduce human navigational error, reduce human workload, increase performance and decrease communication bandwidth when compared to a baseline teleoperation using a conventional robot user interface.

In contrast to the static interfaces generally employed for control of mobile robots, user interface system 3106 adapts automatically to support different modes of operator involvement. The environment representation displayed by the user interface 3200 is able to scale to different perspectives. Likewise, the user support and tasking tools automatically configure to meet the cognitive/information needs of the operator as autonomy levels change.

A functional aspect of the user interface 3200 is the cognitive, collaborative workspace, which is a real-time semantic map constructed collaboratively by human and machines, that serves as the basis for a spectrum of mutual human-robot interactions including tasking, situation awareness, human-assisted perception and collaborative environmental "understanding." The workspace represents a fusion of a wide variety of sensing from disparate modalities and from multiple robots.

Another functional aspect of the user interface 3200 is the ability to decompose high-level user tasking into specific robot behaviors. User interface system 3106 may include capabilities for several autonomous behaviors including area search, path planning, route following and patrol. For each of these waypoint-based behaviors, the user interface system 3106 may include algorithms that decide how to break up the specified path or region into a list of waypoints that can be sent to each robot.

The collaborative workspace provided by the user interface 3200 provides a scalable representation that fuses information from many sensors, robots and operators into a single coherent picture. Collaborative construction of an emerging map enhances each individual team robot's understanding of the environment and provides a shared semantic lexicon for communication.

User interface 3200 may support a variety of hardware configurations for both information display and control inputs. The user interface 3200 may be adapted to the needs of a single operator/single robot team as well as to multi-operator/multiple robot teams with applications varying from repetitive tasks in known environments to multi-agent investigations of unknown environments.

With reference to FIG. 31, control inputs to the robot can come from the keyboard, mouse actions, touch screen, or joysticks. Controls based on, for example, the joystick are dynamically configurable. Any joystick device that the computer system will recognize can be configured to work in the user interface 3200.

By way of example and not limitation, an illustrative embodiment of user interface 3200 is illustrated with respect to FIG. 32. Display of information from the robot can be made on one or more monitors attached to the user interface system

3106 (FIG. 31). The user interface 3200 contains several windows for each robot on the team. These windows may include: a video window 3210, a sensor status window 3220, an autonomy control window 3230, a robot window 3240 and a dashboard window 3250. Each of these windows is maintained, but not necessarily displayed, for each robot currently communicating with the system. As new robots announce themselves to the user interface system 3106, then a set of windows for that specific robot is added. In addition, a multi-robot common window also referred to herein as an emerging map window 3260 is displayed, which contains the emerging position map and is common to all robots on the team. The illustrative embodiment of the user interface 3200 includes a single display containing, for example, five windows 3210, 3220, 3230, 3240, 3250 and a common emerging map window 3260 as illustrated with respect to FIGS. 33-38.

Figure 33:
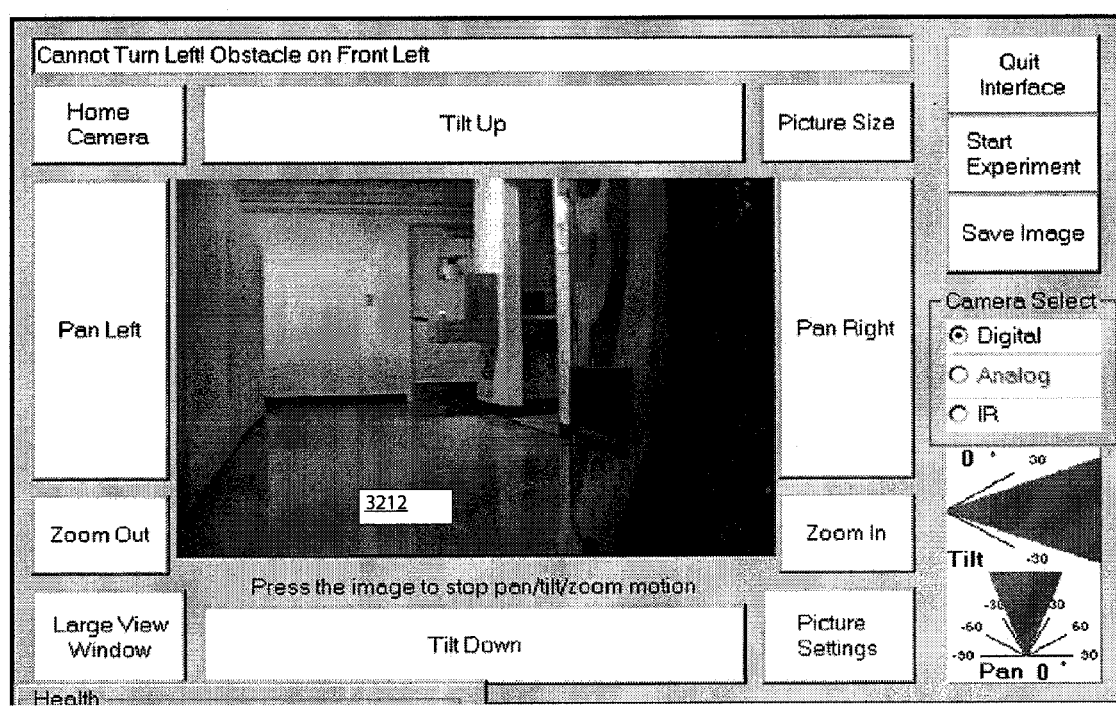
FIG. 33 illustrates a video window of the multi-robot user interface, in accordance with an embodiment of the present invention.

FIG. 33 illustrates a video window 3210 of user interface 3200, in accordance with an embodiment of the present invention. Video window 3210 illustrates a video feed 3212 from the robot 3104 as well as controls for pan, tilt, and zoom. Frame size, frame rate, and compression settings can be accessed from a subwindow therein and provide a means for the user to dynamically configure the video to support changing operator needs.

Figure 34:
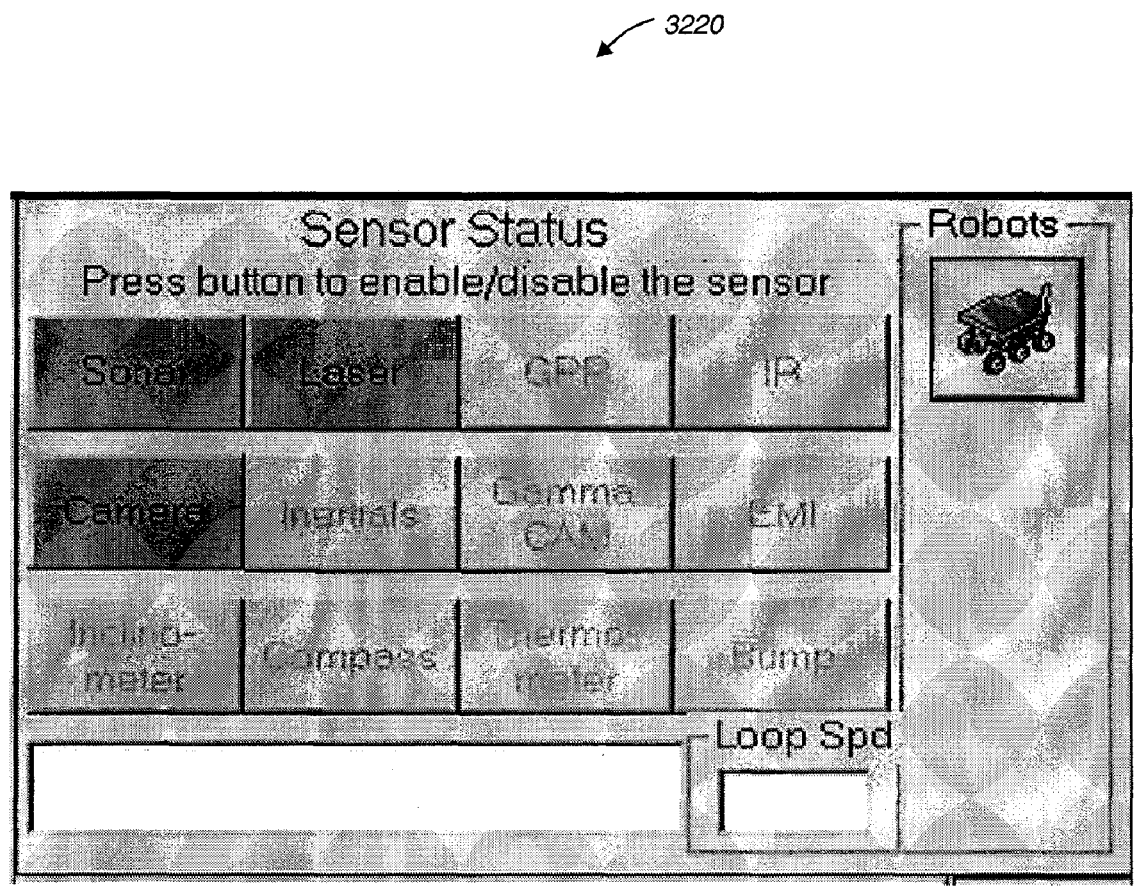
FIG. 34 illustrates a sensor status window of the multi-robot user interface, in accordance with an embodiment of the present invention.

FIG. 34 illustrates a sensor status window 3220 of user interface 3200, in accordance with an embodiment of the present invention. Sensor status window 3220 includes status indicators and controls that allow the operator to monitor and configure the robot's sensor suite as needed, which permits the operator to know at all times which sensors are available, which sensors are suspect, and which are off-line. In addition, the controls allow the user to actually remove the data from each sensor from the processing/behavior refresh and monitoring loop. For example, the operator, through the user interface 3200, may decide to turn off the laser range finder if dust in the environment is interfering with the range readings.

Figure 35:
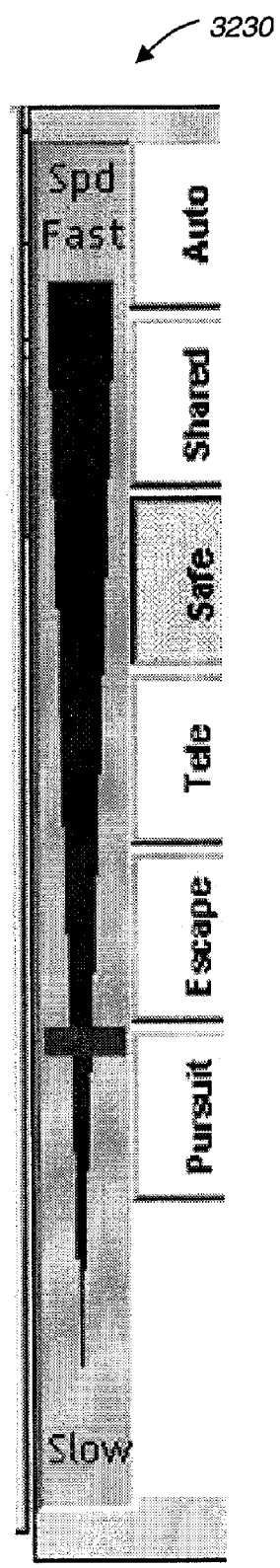
FIG. 35 illustrates an autonomy control window of the multi-robot user interface, in accordance with an embodiment of the present invention.

FIG. 35 illustrates an autonomy control window 3230 of user interface 3200, in accordance with an embodiment of the present invention. Autonomy control window 3230 includes a plurality of selectable controls for specifying a degree of robot autonomy.

Additionally, in autonomy control window 3230, the user can select between different levels of robot autonomy. Multiple levels of autonomy provide the user with an ability to coordinate a variety of reactive and deliberative robot behaviors. Examples of varying levels of autonomy include telemode, safe mode, shared mode collaborative tasking mode, and autonomous mode as described above with reference to FIGS. 10A and 10B.

User interface 3200 permits the operator or user to switch between all four modes of autonomy as the task constraints, human needs and robot capabilities change. For instance, the telemode can be useful to push open a door or shift a chair out of the way, whereas the autonomous mode is especially useful if human workload intensifies or in an area where communications to and from the robot are sporadic. As the robot assumes a more active role by moving up to higher levels of autonomy, the operator can essentially "ride shotgun" and turn his or her attention to the crucial tasks at hand—locating victims, hazards, dangerous materials; following suspects; measuring radiation and/or contaminant levels—without worrying about moment-to-moment navigation decisions or communications gaps.

Figure 36:
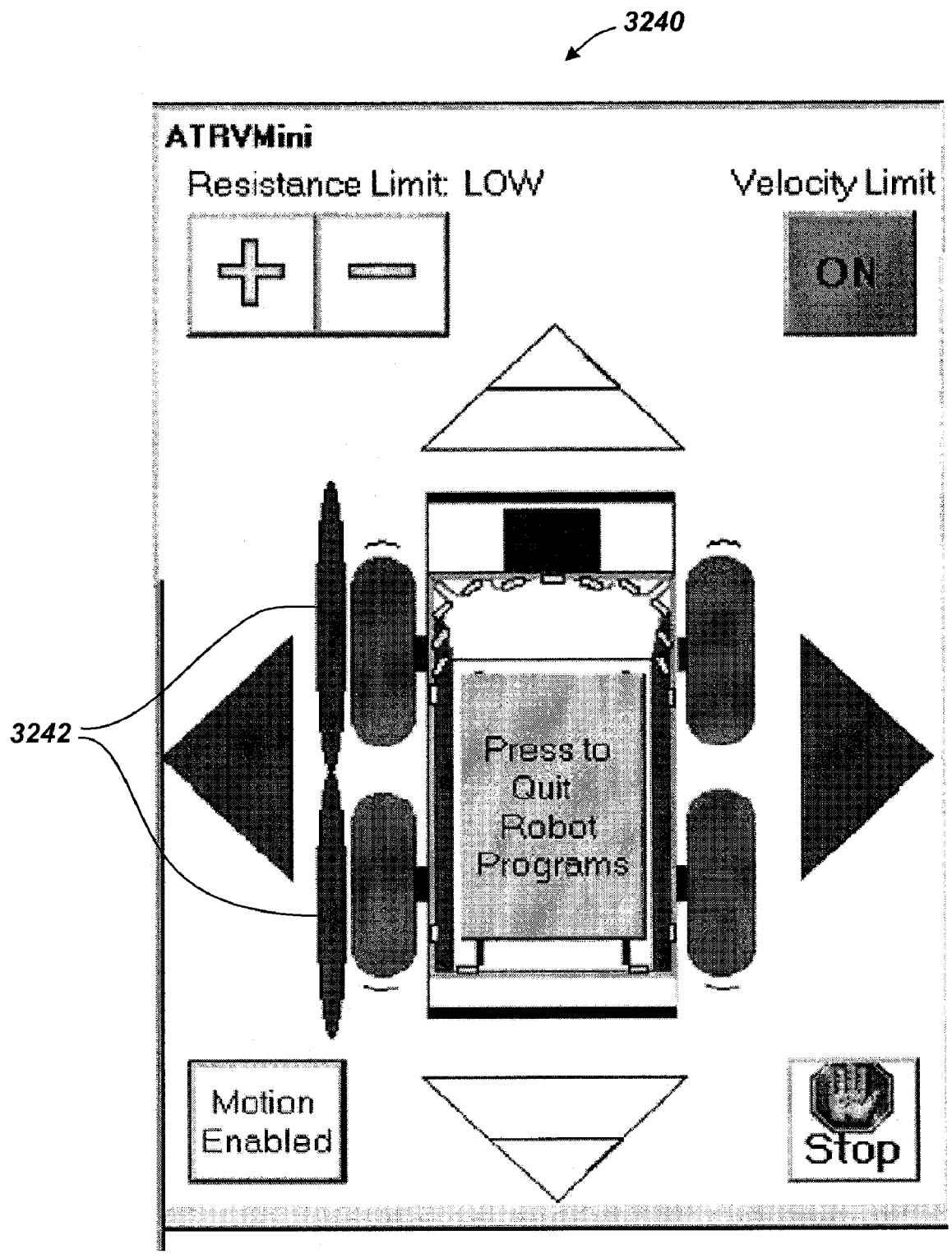
FIG. 36 illustrates a robot window of the multi-robot user interface, in accordance with an embodiment of the present invention.

FIG. 36 illustrates a robot window 3240 of user interface 3200, in accordance with an embodiment of the present invention. Robot window 3240 pertains to movement within the local environment and provides indications of direction and speed of robot motion, obstructions, resistance to motion, and feedback from contact sensors. Robot window 3240 indicates illustrative blockage indicators 3242 indicative of impeded motion in a given direction next to the iconographic representation of the robot wheels indicating that movement right and left is not possible because of an object too close to the left side wheels. These blockage indicators 3242 allow the operator to understand why the robot 3104 has overridden a movement command. Since the visual indications can sometimes be overlooked, a force feedback joystick may also be implemented to resist movement in the blocked direction. The joystick may vibrate if the user continues to command movement in a direction already indicated as blocked.

Figure 37:
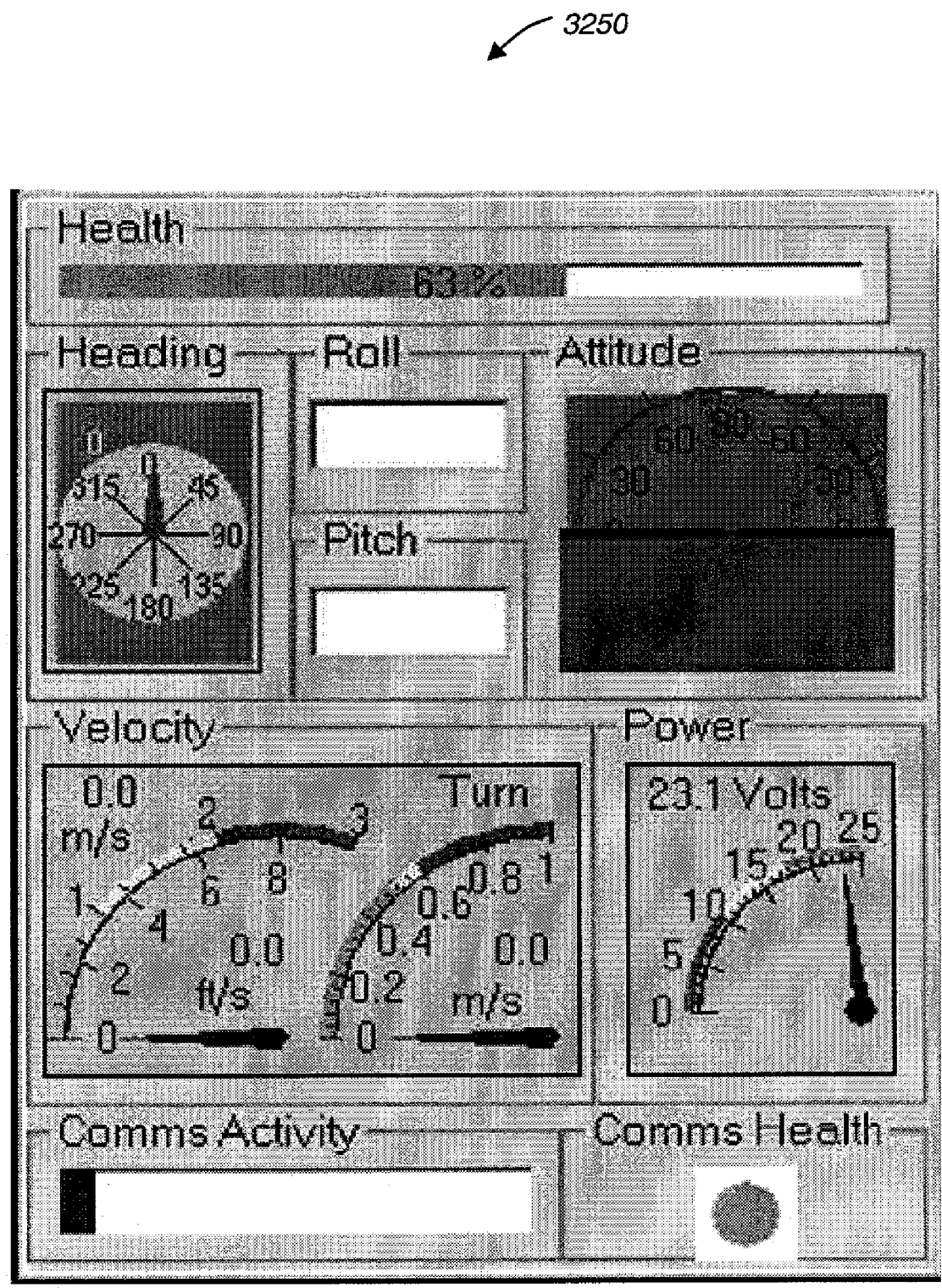
FIG. 37 illustrates an emerging map window of the multi-robot user interface, in accordance with an embodiment of the present invention.

FIG. 37 illustrates a dashboard window 3250 of the multi-robot user interface 3200, in accordance with an embodiment of the present invention. As illustrated, dashboard window 3250 contains information about the robot's operational status such as communication activity, power and feedback regarding the robot's pitch and roll. When driving the robot directly, operators may give directional commands using the joystick. Dashboard window 3250 further includes a number of dials and indicators showing battery power level, speed, heading, pitch/roll, system health, and communications health.

Figure 38:
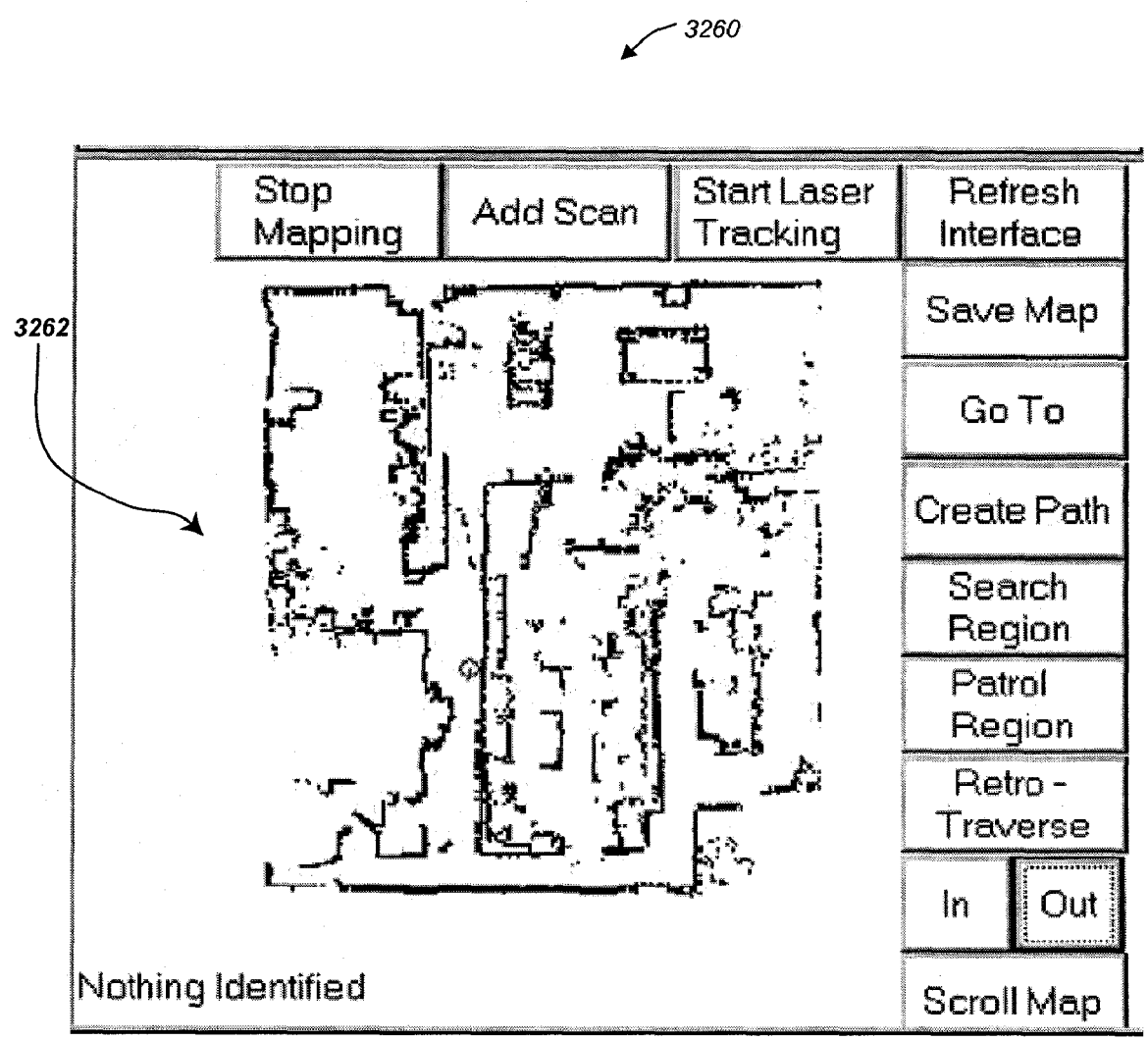
FIG. 38 illustrates a dashboard window of the multi-robot user interface, in accordance with an embodiment of the present invention.

FIG. 38 illustrates an emerging map window 3260 of the multi-robot user interface 3200, in accordance with an embodiment of the present invention. As illustrated, the multi-robot common window or emerging map window 3260 provides an emerging map 3262 of the environment and allows the operator to initiate a number of waypoint-based autonomous behaviors such as search region and follow path. In emerging map window 3260, controls are also present that enable an operator to zoom the map in and out. Unlike competitive products that require transmission of live video images from the robot to the operator for control, the user interface system 3106 (FIG. 31) creates a 3D, computer-game-style representation of the real world constructed on-the-fly that promotes situation awareness and efficient tasking. Data for the dynamic representation is gathered using scanning lasers, sonar and infrared sensors that create a clear picture of the environment even when the location is dark or obscured by smoke or dust.

The emerging map 3262 is displayed in user interface 3200 and illustrates not only walls and obstacles but also other things that are significant to the operator. The operator can insert items—people, hazardous objects, etc., from a pull-down menu or still images captured from the robot video—to establish what was seen and where. In this way, the representation is a collaborative workspace that supports virtual and real elements supplied by both the robot and the operator. The emerging map 3262 also maintains the size relationships of the actual environment, helping the operator to understand the relative position of the robot in the real world. The operator may change the zoom, pitch and yaw of the emerging map 3262 to get other perspectives, including a top-down view of the entire environment—showing walls, obstacles, hallways and other topographical features.

The multi-robot user interface system 3106 (FIG. 31) is configured to recognize when communications are received from a new robot and instantiates a new set of robot-centric control windows to allow individual tasking of that robot. Likewise, the user interface 3200 automatically displays and disseminates whatever information is relevant to the collaborative workspace (i.e., information to be shared such as various map entities and environmental features it may have discovered).

For the human team members, the current cognitive collaborative workspace, as illustrated with respect to user interface 3200, provides point-and-click user validation and iconographic insertion of map entities. An operator can verify or remove entities, which have been autonomously added and can add new entities. The user interface 3200 also allows the workspace perspective to be focused on a single robot in which case it will track a selected robot and transform the data in various interface windows to be relevant to that robot. By choosing to "free" the perspective, the user gains the ability to traverse the environment with third-person perspective and monitor the task and environment as a whole. The multi-robot user interface 3200 may decide which windows to show/hide based on the level of autonomy and the choice of focus.

Figure 39:
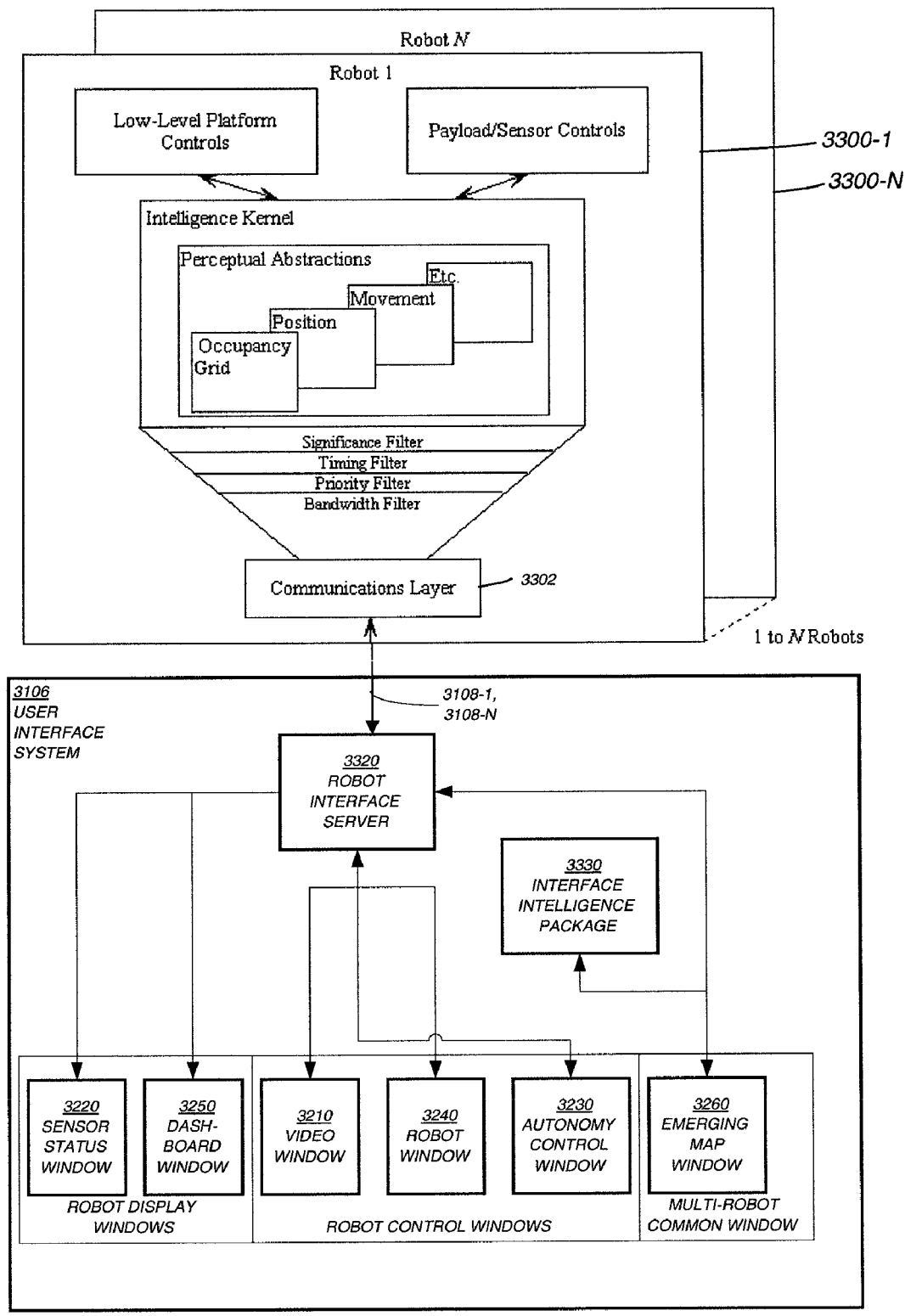
FIG. 39 illustrates control processes within the robots and user interface system, in accordance with an embodiment of the present invention.

FIG. 39 is a diagram of control processes within the robots and user interface system 3106, in accordance with an embodiment of the present invention. FIG. 39 illustrates multiple robot processes 3300-1, 3300-N of robots 3104-1, 3104-N (FIG. 31) in the field being controlled by an operator at user interface system 3106. The robot processes 3300-1, 3300-N pass data about their state and the environment around them to an operator at user interface system 3106. The operator sends commands and queries to the robot processes 3300-1, 3300-N to direct the operation of robots 3104-1, 3104-N.

Robot processes 3300-1, 3300-N illustrate a distillation of the process of taking low level data and converting it to perceptual abstractions that are more easily grasped by an operator. These abstractions are packaged in data packets according to a message protocol and then filtered for transmission to user interface system 3106. This protocol is composed of message packets that contain information on the type of data being passed, the robot that generated the message, the data itself, and control characters for the packet. Each robot in the field has a unique identifier that is contained in each data packet it generates. All robots use the same communication interface 3108-1, 3108-N to the user interface system 3106. This abstraction and transmission method allows long distance radio communications at a low bandwidth over a single channel for multiple robots, rather than requiring several channels of high bandwidth and close proximity as would be required for passing raw data for analysis, as in most other robot control systems.

Regarding the user interface system 3106, data packets from the robots in the field enter the user interface system 3106 and are deblocked and extracted to information usable by the user interface 3200 (FIG. 32). This data can go directly to the various windows 3210, 3220, 3230, 3240, 3250, 3260, or the data can go through an interface intelligence package 3330, which can provide further enhancement or abstractions of the data that are meaningful to the operator. The various embodiments of the present invention contemplate at least two types of windows for each individual robot, display windows and control windows. Display windows show data in logical layouts and allow the operator to monitor the robot. The presentation of data in windows 3210, 3220, 3230, 3240, 3250, 3260 may be partitioned into four types of windows, individual robot display windows (e.g., sensor status window 3220, dashboard window 3250), individual robot control windows (e.g., video window 3210, robot window 3240, autonomy control window 3230), and map and tasking control windows (e.g., emerging map window 3260).

The map and tasking control windows show a more global representation and contain all the robots together. They provide both display of data and the control of robot function. The mapping and tasking control windows can also provide higher level control to perform specific tasks, such as area search, intruder detection, mine detection, and waypoint and path generation. In order to provide the higher level tasking, the map and tasking control windows rely on the interface intelligence package 3330.

Control messages from the user interface system 3106 follow a similar path to the robots as the data abstractions follow from the robots to the user interface system 3106. Command messages from the control windows (e.g., video window 3210, robot window 3240, autonomy control window 3230) are assembled in data packets, which may include the same structure (e.g., message type, robot to whom the packet is directed, the data itself, and the packet control characters) as the packets from the robots. The packets to the robots may be generated from the various control windows or the interface intelligence package 3330. The messages are packaged and sent through the robot interface server 3320 and sent to the robots over the communication interface 3108-1, 3108-N and then deblocked in the robot communication layer 3302 and acted on by the appropriate robot.

The user interface system 3106 does not make assumptions on the robots' states but utilizes acknowledgement of sent commands. For example, if the operator requests the robot to go to a specific point (e.g., setting a waypoint), the user interface system 3106 waits for the robot to send back the waypoint before displaying the waypoint in the various windows on user interface 3200. By enforcing an acknowledgement, the actual robot state is always presented, rather than an assumed state of the robot. However, the robot does not require the detection or interaction with a user interface system 3106 in order to preserve safety and complete a requested task while also protecting itself from erroneous operator maneuvers or directives. The robots may also constantly broadcast their states over the communication interface thereby allowing the user interface system 3106 to obtain current robot status. Since each robot is constantly broadcasting its data, and all data packets have unique robot identifiers, the appearance of new robots in the message stream automatically generates the appearance of the robot in the user interface system 3106.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method for implementing a virtual track for a robot, comprising:
  on a computer remote from the robot:
    operating a graphical user interface by a user for:
      generating a desired path comprised of a plurality of segments representative of the virtual track for the robot;
      assigning start and end points to the desired path; and
      associating velocities with each of the plurality of segments of the desired path;
    analyzing the desired path to determine velocity transitions between at least some of the plurality of segments and to determine a turn gain of the robot during transition between the at least some of the plurality of segments as the robot traverses the virtual track;
    generating a waypoint file including positions along the virtual track as represented by the desired path, the velocities of each of the plurality of segments and the turn gain between the at least some of the plurality of segments; and sending the waypoint file to the robot for traversing the virtual track along the positions from the start point to the end point; and on the robot:

repeating on each iteration through an event timing loop, the acts of:

defining an event horizon comprising a distance from the robot that is proportional to a current velocity of the robot;

detecting a range to an obstacle near the robot; and testing for an event horizon intrusion by determining if the range to the obstacle is within the event horizon;

performing a localization process to determine a present frame of reference for use in alignment of the robot to the virtual track; and adjusting the desired path of the robot by:

determining that the range to the obstacle within the event horizon represents a blockage on the desired path to a next waypoint; and avoiding the blockage and pointing at the next waypoint by:

adjusting a translational velocity of the robot;

adjusting a rotational velocity of the robot; and backing up the robot if there is insufficient room to turn the robot.

2. The method of claim 1, further comprising ordering the plurality of segments in order of a selected sequential traverse along the desired path.

3. The method of claim 2, further comprising checking traversal continuity of the selected sequential traverse of the plurality of segments.

4. The method of claim 1, further comprising:

comparing the velocities associated with each of the plurality of segments with mobility capabilities of the robot; and modifying one or more of the velocities to one or more reduced velocities when the one or more velocities exceeds the mobility capabilities of the robot.

5. The method of claim 4, further comprising reporting the one or more reduced velocities for prospective revision to the desired path.

6. The method of claim 1, wherein generating the desired path comprises drawing the desired path in a first format and converting the desired path to text-editable format.

7. The method of claim 6, wherein the text-editable format is a .dxf format.

8. A system for generating robot programming instructions for implementing a virtual track, comprising:

a remote computer for:

operating a graphical user interface configured to generate a desired path comprised of a plurality of segments representative of the virtual track for a robot; and performing a path plan process configured to:

enable a user to assign start and end points to the desired path and to associate velocities with each of the plurality of segments of the desired path;

analyze the desired path to determine velocity transitions between at least some of the plurality of segments and to determine a turn gain of the robot during transition between the at least some of the plurality of segments as the robot traverses the virtual track; and generate a waypoint file including positions along the virtual track as represented by the desired path, the velocities of each of the plurality of segments and the turn gain between the at least some of the plurality of segments; and a mobile robot platform configured for:

repeating on each iteration through an event timing loop, the acts of:

defining an event horizon comprising a distance from the robot that is proportional to a current velocity of the robot;

detecting a range to an obstacle near the robot; and testing for an event horizon intrusion by determining if the range to the obstacle is within the event horizon;

performing a localization process to determine a present frame of reference for use in alignment of the mobile robot platform to the virtual track; and adjusting the desired path of the robot by:

determining that the range to the obstacle within the event horizon represents a blockage on the desired path to a next waypoint; and avoiding the blockage and pointing at the next waypoint by:

adjusting a translational velocity of the robot;

adjusting a rotational velocity of the robot; and backing up the robot if there is insufficient room to turn the robot.

9. The system of claim 8, wherein the path plan process is further configured to send the waypoint file to the robot for traversing the virtual track along the positions from the start point to the end point.

10. The system of claim 9, wherein the path plan process is further configured to order the plurality of segments in order of a selected sequential traverse along the desired path.

11. The system of claim 10, wherein the path plan process is further configured to check traversal continuity of the selected sequential traverse of the plurality of segments.

12. The system of claim 9, wherein the path plan process is further configured to generate the desired path comprising drawing the desired path in a first format and converting the desired path to text-editable format.

13. The system of claim 12, wherein the text-editable format is .dxf format.

14. The system of claim 9, wherein the path plan process is further configured to:

compare the velocities associated with each of the plurality of segments with mobility capabilities of the robot; and modify one or more of the velocities to one or more reduced velocities when the one or more velocities exceeds the mobility capabilities of the robot.

15. The system of claim 14, wherein the path plan process is further configured to report the one or more reduced velocities for prospective revision to the desired path.

16. A computer-readable medium having computer-executable instructions thereon for implementing a virtual track for a robot, the computer-executable instructions for performing the acts of:

enabling a user to generate a desired path comprised of a plurality of segments representative of the virtual track for the robot;

enabling a user to assign start and end points to the desired path;

enabling a user to associate velocities with each of the plurality of segments of the desired path;

analyzing the desired path to determine velocity transitions between at least some of the plurality of segments and to determine a turn gain of the robot during transition between the at least some of the plurality of segments as the robot traverses the virtual track;
generating a waypoint file including positions along the virtual track as represented by the desired path, the velocities of each of the plurality of segments and the turn gain between the at least some of the plurality of segments;
sending the waypoint file to the robot for traversing the virtual track along the positions from the start point to the end point;
repeating on each iteration through an event timing loop on the robot, the acts of:
  defining an event horizon comprising a distance from the robot that is proportional to a current velocity of the robot;
  detecting a range to an obstacle near the robot; and
  testing for an event horizon intrusion by determining if the range to the obstacle is within the event horizon;
performing a localization process on the robot to determine a present frame of reference for use in alignment of the robot to the virtual track; and
adjusting the desired path of the robot by:
  determining that the range to the obstacle within the event horizon represents a blockage on the desired path to a next waypoint;
  adjusting a translational velocity of the robot;
  adjusting a rotational velocity of the robot; and
  backing up the robot if there is insufficient room to turn the robot.

17. The computer-readable medium of claim 16, further comprising computer-executable instructions for ordering the plurality of segments in order of a selected sequential traverse along the desired path.

18. The computer-readable medium of claim 17, further comprising computer-executable instructions for checking traversal continuity of the selected sequential traverse of the plurality of segments.

19. The computer-readable medium of claim 16, further comprising computer-executable instructions for:
  comparing the velocities associated with each of the plurality of segments with mobility capabilities of the robot; and
  modifying one or more of the velocities to one or more reduced velocities when the one or more velocities exceeds the mobility capabilities of the robot.

20. The computer-readable medium of claim 19, further comprising computer-executable instructions for reporting the one or more reduced velocities for prospective revision to the desired path.

21. The computer-readable medium of claim 16, wherein the computer-executable instructions for generating the desired path comprises computer-executable instructions for drawing the desired path in a first format and converting the desired path to text-editable format.

22. The computer-readable medium of claim 21, wherein the text-editable format is a .dxf format.

* * * * *

UNITED STATES PATENT AND TRADEMARK OFFICE
CERTIFICATE OF CORRECTION

PATENT NO. : 7,974,738 B2  
APPLICATION NO. : 11/428621  
DATED : July 5, 2011  
INVENTOR(S) : David J. Bruemmer, Douglas A. Few and Miles C. Walton Page 1 of 1

It is certified that error appears in the above-identified patent and that said Letters Patent is hereby corrected as shown below:

In the specification:
    COLUMN 32, LINE 34, change "R_LEFT_" to --L_LEFT_--  
    COLUMN 42, LINE 19, change "FIG. 28" to --FIG. 27--  
    COLUMN 42, LINE 20, change "FIG. 27" to --FIG. 28--

Signed and Sealed this  
Twenty-eighth Day of July, 2015

Michelle K. Lee  
*Director of the United States Patent and Trademark Office*